(12) United States Patent
Sasai et al.

(10) Patent No.: US 10,123,054 B2
(45) Date of Patent: *Nov. 6, 2018

(54) IMAGE CODING METHOD AND IMAGE CODING DEVICE FOR PARTITIONING AN IMAGE INTO PROCESSING UNITS AND CODING THE PARTITIONED IMAGE TO GENERATE A CODE SEQUENCE

(71) Applicant: Sun Patent Trust, New York, NY (US)

(72) Inventors: Hisao Sasai, Osaka (JP); Takahiro Nishi, Nara (JP); Youji Shibahara, Tokyo (JP); Toshiyasu Sugio, Osaka (JP)

(73) Assignee: SUN PATENT TRUST, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/857,856

(22) Filed: Dec. 29, 2017

(65) Prior Publication Data

US 2018/0124434 A1    May 3, 2018

Related U.S. Application Data

(60) Division of application No. 15/264,749, filed on Sep. 14, 2016, now Pat. No. 9,894,389, which is a
(Continued)

(51) Int. Cl.
*H04N 19/96* (2014.01)
*H04N 19/70* (2014.01)
(Continued)

(52) U.S. Cl.
CPC .......... *H04N 19/96* (2014.11); *H04N 19/119* (2014.11); *H04N 19/147* (2014.11); *H04N 19/19* (2014.11);
(Continued)

(58) Field of Classification Search
None
See application file for complete search history.

(56) References Cited

U.S. PATENT DOCUMENTS

| 6,084,908 A | 7/2000 | Chiang |
| 6,792,163 B2 | 9/2004 | Seol |

(Continued)

FOREIGN PATENT DOCUMENTS

| CN | 1633177 | 6/2005 |
| JP | 2000-134622 | 5/2000 |

(Continued)

OTHER PUBLICATIONS

International Search Report dated Feb. 7, 2012 in International (PCT) Application No. PCT/JP2011/006807.
(Continued)

*Primary Examiner* — David J Czekaj
*Assistant Examiner* — Tyler W. Sullivan
(74) *Attorney, Agent, or Firm* — Wenderoth, Lind & Ponack, L.L.P.

(57) ABSTRACT

Provided is an image coding method that partitions an input image signal into processing units, and that codes the partitioned image to generate a code sequence. In particular, the image coding method determines a partitioning pattern for hierarchically partitioning the input image signal in order starting from a largest unit of the processing units, generates partition information indicative of the partitioning pattern, and codes partition information. The partition information includes maximum used hierarchy depth information indicative of a maximum used hierarchy depth which is a hierarchy depth of a deepest processing unit of the processing units included in the partitioning pattern.

3 Claims, 37 Drawing Sheets

Related U.S. Application Data continuation of application No. 13/817,836, filed as application No. PCT/JP2011/006807 on Dec. 5, 2011, now Pat. No. 9,838,723.

(60) Provisional application No. 61/419,965, filed on Dec. 6, 2010.

(51) Int. Cl.
| | |
|---|---|
| *H04N 19/119* | (2014.01) |
| *H04N 19/147* | (2014.01) |
| *H04N 19/61* | (2014.01) |
| *H04N 19/463* | (2014.01) |
| *H04N 19/19* | (2014.01) |
| *H04N 19/124* | (2014.01) |
| *H04N 19/17* | (2014.01) |
| *H04N 19/182* | (2014.01) |

(52) U.S. Cl.
CPC ............ *H04N 19/463* (2014.11); *H04N 19/61* (2014.11); *H04N 19/70* (2014.11); *H04N 19/124* (2014.11); *H04N 19/17* (2014.11); *H04N 19/182* (2014.11)

(56) References Cited

U.S. PATENT DOCUMENTS

| | | | |
|---|---|---|---|
| 6,851,083 | B1 | 2/2005 | Hagenauer et al. |
| 8,792,547 | B2* | 7/2014 | Min .................... H04N 19/105 |
| | | | 375/240 |
| 8,885,727 | B2 | 11/2014 | Lee |
| 8,897,369 | B2 | 11/2014 | Han |
| 9,838,723 | B2* | 12/2017 | Sasai ..................... H04N 19/96 |
| 9,894,389 | B2* | 2/2018 | Sasai ..................... H04N 19/96 |
| 2008/0175317 | A1 | 7/2008 | Han et al. |
| 2011/0038412 | A1 | 2/2011 | Jung et al. |
| 2011/0038413 | A1 | 2/2011 | Chen |
| 2011/0038422 | A1 | 2/2011 | Cheon |
| 2011/0096829 | A1 | 4/2011 | Han |
| 2011/0243244 | A1 | 10/2011 | Min |
| 2012/0008676 | A1 | 1/2012 | Lee |
| 2012/0082238 | A1 | 4/2012 | Panusopone |
| 2012/0173527 | A1 | 7/2012 | Thiesson |
| 2013/0028331 | A1* | 1/2013 | Min ...................... H04N 19/50 |
| | | | 375/240.24 |
| 2013/0034159 | A1 | 2/2013 | Siekmann |
| 2013/0039422 | A1 | 2/2013 | Kirchhoffer |
| 2013/0148726 | A1 | 6/2013 | Han et al. |
| 2013/0148729 | A1 | 6/2013 | Sasai |
| 2013/0148739 | A1 | 6/2013 | Lee |
| 2013/0156328 | A1 | 6/2013 | Wang |
| 2013/0182760 | A1 | 7/2013 | Sasai |

FOREIGN PATENT DOCUMENTS

| | | |
|---|---|---|
| JP | 2010-517359 | 5/2010 |
| WO | 00/41315 | 7/2000 |
| WO | 2008/088140 | 7/2008 |
| WO | 2012/005099 | 1/2012 |

OTHER PUBLICATIONS

Ken McCann et al., "Samsung's Response to the Call for Proposals on Video Compression Technology", Joint Collaborative Team on Video Coding (JCT-VC) of ITU-T SG16 WP3 and ISO/IEC JTC1/SC29/WG11, JCTVC-A124, 1st Meeting: Dresden, DE, Apr. 15-23, 2010.

Thomas Davies, "BBC's Response to the Call for Proposals on Video Compression Technology", Joint Collaborative Team on Video Coding (JCT-VC) of ITU-T SG16 WP3 and ISO/IEC JTC1/SC29/WG11, JCTVC-A125, 1st Meeting: Dresden, DE, Apr. 15-23, 2010.

"Test Model under Consideration", Joint Collaborative Team on Video Coding (JCT-VC) of ITU-T SG16 WP3 and ISO/IEC JTC1/SC29/WG11, JCTVC-A205 (draft007), 1st Meeting: Dresden, DE, Apr. 15-23, 2010 (Date Saved: Jul. 18, 2010).

ISO/IEC 14496-10 (MPEG-4 Part10: Advanced Video Coding), Oct. 1, 2004.

Extended European Search Report dated Jul. 4, 2014 in European Application No. 11846191.2.

JCT-VC: "Test Model under Consideration", Joint Collaborative Team on Video Coding (JCT-VC) of ITU-T SG16 WP3 and ISO/IEC JTC1/SC29/WG11, JCTVC-A205, 1st meeting: Dresden, DE, Apr. 15-23, 2010, XP030007586.

Bumshik Lee et al: "Hierarchical Variable-sized Block Transforms", Joint Collaborative Team on Video Coding (JCT-VC) of ITU-T SG16 WP3 and ISO/IEC JTC1/SC29/WG11, JCTVC-B050, 2nd meeting: Geneva, CH, Jul. 21-28, 2010, XP030007630.

Office Action and Search Report dated Dec. 31, 2015 in Chinese Application No. 201180038021.7, with partial English translation.

Fraunhofer Society, "HM Software Manual—High Efficiency Video Coding (HEVC)," (https://www.google.com/url?sa=t&rct=j&q=&esrc=s&source=web&cd=1&cad=rja&uact=8&ved=0ahUKEwim19DJx6LMAhWJ1B4KHRdLAOQQFggfMAA&url=https%3A%2F%2Fhevc.hhi.fraunhofer.de%2Ftrac%2Fhevc%2Fexport%2FHEAD %2Ftrunk%2Fdoc%2Fsoftware-manual.tex &usg=AFQjCNEdjt8t6z1STFVjHfLVXJVFdjr1DA)).

Bossen, Frank, "Common test conditions and software reference configurations," JCT-VC of ITU-T SG16 WP3 and ISO/IEC JTC1/SC29/WG11, Document JCTVC-B300, Jul. 21-28, 2010, pp. 1-12.

Office Action dated Nov. 10, 2016 in U.S. Appl. No. 13/817,836.

Office Action dated Jul. 18, 2018 in Indian Patent Application No. 1405/CHENP/2013, with English-language translation.

\* cited by examiner

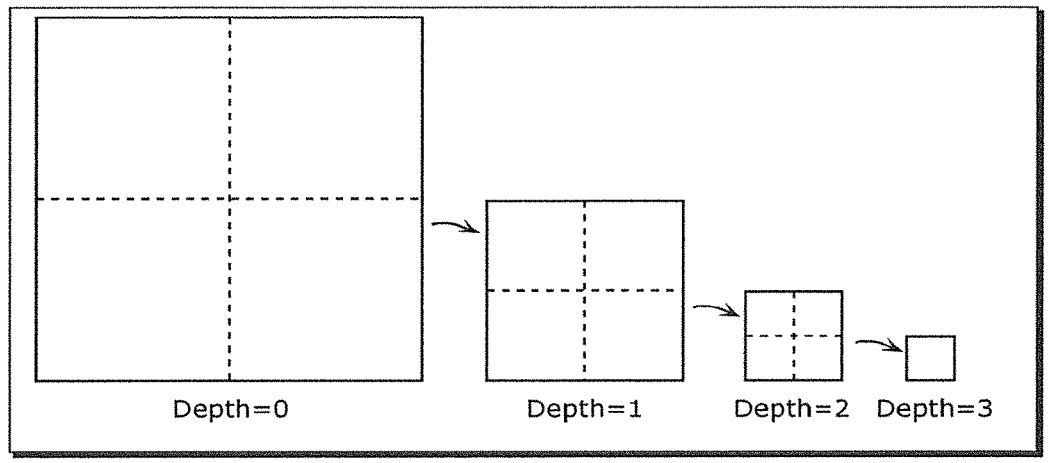

FIG. 3A
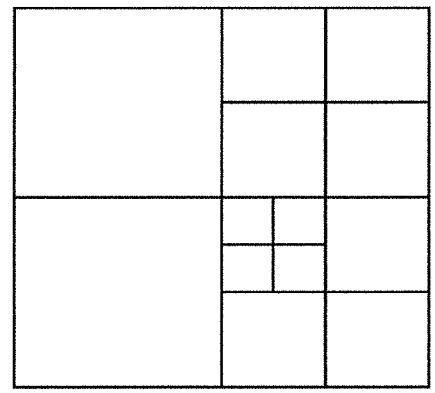
FIG. 3B
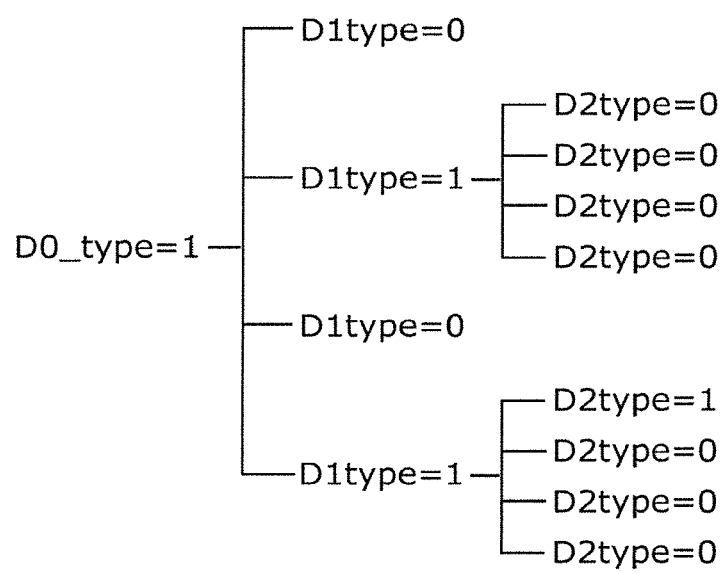
FIG. 3C
130
| block size | type |
|---|---|
| 64x64 | 1 |
| 32x32 | 0101 |
| 16x16 | 0000 1000 |

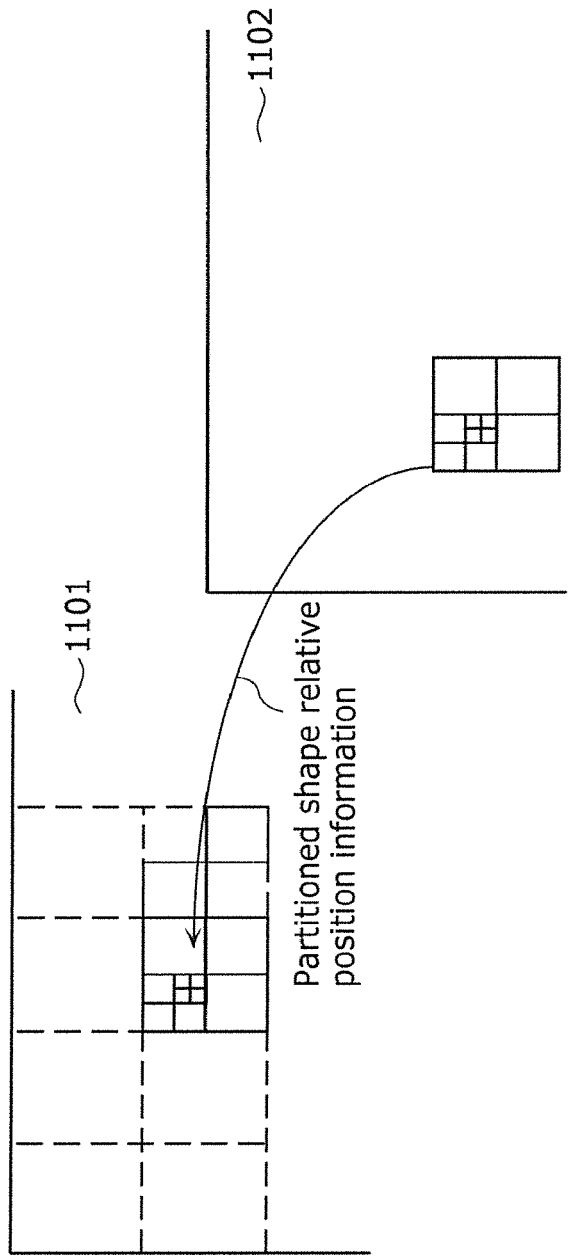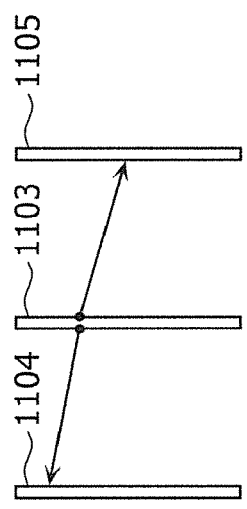

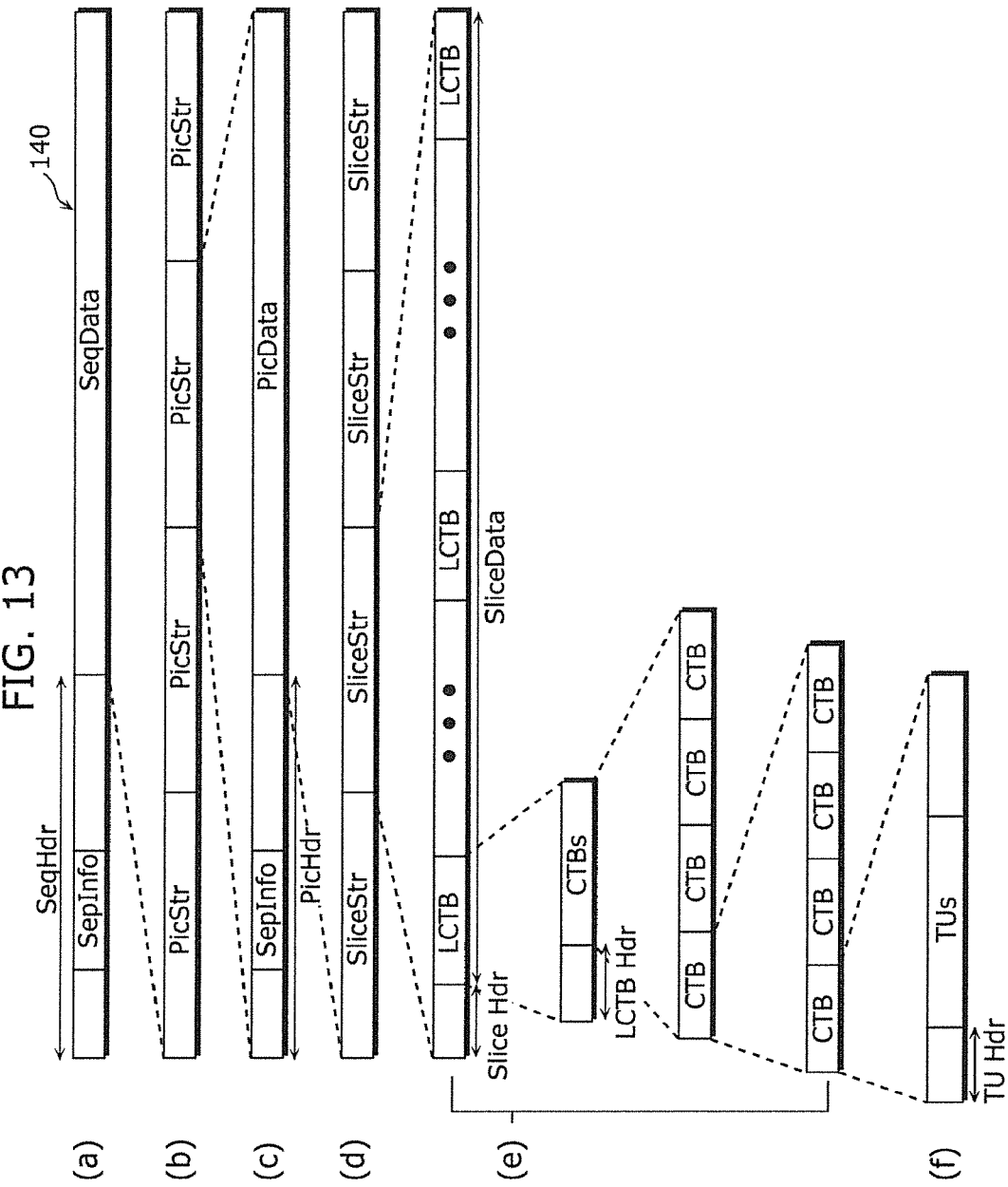

FIG. 22

| |
|---|
| Video stream (PID=0x1011 Primary video) |
| Audio stream (PID=0x1100) |
| Audio stream (PID=0x1101) |
| Presentation graphics stream (PID=0x1200) |
| Presentation graphics stream (PID=0x1201) |
| Interactive graphics stream (PID=0x1400) |
| Video stream (PID=0x1B00 Secondary video) |
| Video stream (PID=0x1B01 Secondary video) |

FIG. 25
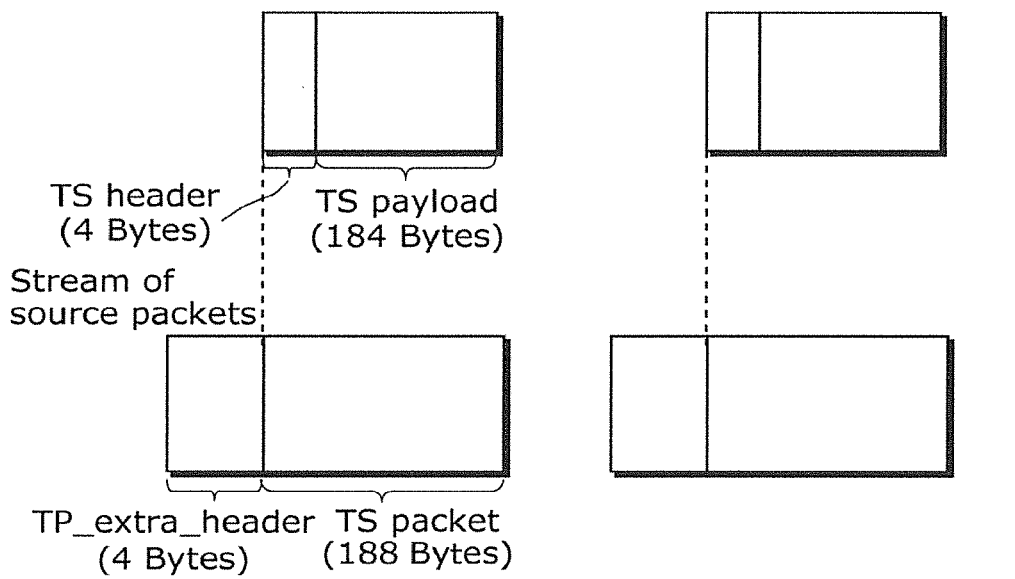
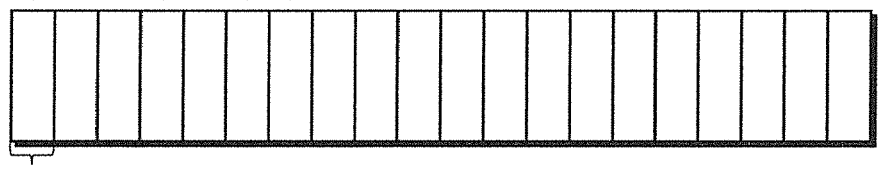

Data structure of PMT

FIG. 33

| Corresponding standard | Driving frequency |
|---|---|
| MPEG4.AVC | 500 MHz |
| MPEG-2 | 350 MHz |
| ⋮ | ⋮ | ex900 ex1000

IMAGE CODING METHOD AND IMAGE CODING DEVICE FOR PARTITIONING AN IMAGE INTO PROCESSING UNITS AND CODING THE PARTITIONED IMAGE TO GENERATE A CODE SEQUENCE

TECHNICAL FIELD

The present invention relates to image coding methods, image decoding methods, image coding devices, and image decoding devices, and, in particular, to an image coding method and an image decoding method for compression coding a video signal, using motion compensation.

BACKGROUND ART

In conventional image coding methods represented by ITU-T standard referred to as H.26x and ISO/IEC standard referred to as MPEG-x, a screen is partitioned into predetermined units, and coded in the partition units. For example, H.264/MPEG-4 AVC (see NPL 1, for example) processes the screen (picture) in horizontal 16 pixels×vertical 16 pixels units which are referred to as macroblocks. For the motion compensation, the macroblock is partitioned into rectangular blocks (horizontal 4 pixels×vertical 4 pixels, minimum), and the motion compensation is performed using a motion vector different for each of the partitioned blocks.

CITATION LIST

Non Patent Literature

[NPL 1] ISO/IEC 14496-10 "MPEG-4 Part 10 Advanced Video Coding"

SUMMARY OF INVENTION

Technical Problem

In the above conventional methods, however, two types of information: information indicative of macroblock type; and information indicative of sub-macroblock type are transmitted as information related to the partition in the macroblock to transmit a partitioned shape. Herein, the information indicative of macroblock type indicates that a macroblock size is any of, for example, horizontal 16 pixels×vertical 16 pixels, horizontal 16 pixels×vertical 8 pixels, horizontal 8 pixels×vertical 16 pixels, and horizontal 8 pixels×vertical 8 pixels. The information indicative of sub-macroblock type indicates that when the macroblock type is horizontal 8 pixels×vertical 8 pixels, a sub-macroblock size is any of horizontal 8 pixels×vertical 8 pixels, horizontal 8 pixels×vertical 4 pixels, horizontal 4 pixels×vertical 8 pixels, and horizontal 4 pixels×vertical 4 pixels.

In the method of transmitting the partition information as described above, an increased number of block-size types requires hierarchically sending the partitioned shapes. Thus, a problem arises that the partition information cannot be transmitted efficiently.

The present invention solves the above problem and has an object to provide a video coding method or a video decoding method which can efficiently encode or decode the partition information when the screen is partitioned into various blocks and encoding and decoding the blocks.

Solution to Problem

To achieve the above object, an image coding method according to one embodiment of the present invention is image coding method for partitioning an image into processing units, and coding the partitioned image to generate a code sequence, the image coding method including: determining a partitioning pattern for hierarchically partitioning the image in order starting from a largest unit of the processing units in a hierarchical format; generating partition information indicative of the partitioning pattern; and coding the partition information; wherein the partition information includes maximum used hierarchy depth information indicative of a maximum used hierarchy depth which is a hierarchy depth of a deepest processing unit of the processing units included in the partitioning pattern.

According to the above configuration, the image coding method according to one embodiment of the present invention can reduce an amount of coding used for partitioning the screen into various blocks and coding the blocks, and thus can efficiently code the partition information.

Moreover, the partition information may further include minimum used hierarchy depth information indicative of a minimum used hierarchy depth which is a hierarchy depth of a shallowest processing unit of the processing units included in the partitioning pattern.

Moreover, when generating the partition information, the partition information which includes the minimum used hierarchy depth information may be generated when the maximum used hierarchy depth is a smallest processing unit of the processing units.

According to the above configuration, the image coding method according to one embodiment of the present invention can reduce a greater amount of coding.

Moreover, when generating the partition information, when it can be defined for each of the processing units, using the maximum used hierarchy depth, whether the processing unit is to be further partitioned, information indicative of the partitioning pattern of the processing unit may be removed from the partition information, and when coding the partition information, the partition information from which the information has been removed may be coded.

According to the above configuration, the image coding method according to one embodiment of the present invention can reduce a greater amount of coding.

Moreover, when generating the partition information, when it can be defined for each of the processing units, using the minimum used hierarchy depth, whether the processing unit is to be further partitioned, information indicative of the partitioning pattern of the processing unit may be removed from the partition information, and when coding the partition information, the partition information from which the information has been removed may be coded.

According to the above configuration, the image coding method according to one embodiment of the present invention can reduce a greater amount of coding.

Moreover, the image coding method may further include estimating a predicted partitioning pattern which is a predicted value of a partitioning pattern of a current processing unit, using a partitioning pattern of a coded processing unit, wherein when determining the partitioning pattern, the partitioning pattern of the current processing unit may be determined using the predicted partitioning pattern.

According to the above configuration, the image coding method according to one embodiment of the present invention can reduce a greater amount of coding.

Moreover, the image coding method may further include calculating a difference between the partitioning pattern and the predicted partitioning pattern, wherein when coding the partition information, the partition information which includes the difference may be coded.

According to the above configuration, the image coding method according to one embodiment of the present invention can reduce a greater amount of coding.

Moreover, when estimating the predicted partitioning pattern, the partitioning pattern of the current processing unit may be estimated using a partitioning pattern of a processing unit that is adjacent to the current processing unit and in a same frame as the current processing unit.

Moreover, when estimating the predicted partitioning pattern, the partitioning pattern of the current processing unit may be estimated using a partitioning pattern of a processing unit included in another temporal frame.

Moreover, an image decoding method according to one embodiment of the present invention is an image decoding method for decoding a code sequence generated by the image coding method, the image decoding method including: decoding the partition information included in the code sequence; and determining the partitioning pattern from the decoded partition information.

According to the above configuration, the image decoding method according to one embodiment of the present invention can efficiently decode the partition information.

It should be noted that the present invention can not only be implemented as such an image coding method and an image decoding method but also as an image coding device and an image decoding device having characteristic steps, as units, included in the image coding method and the image decoding method, respectively, or as a program for causing a computer to execute such characteristic steps. In addition, such a program can, of course, be distributed by being stored in a non-transitory computer-readable storage medium such as CD-ROM and via a transmission medium such as the Internet.

Furthermore, the present invention can be implemented as a semiconductor integrated circuit (LSI) which achieves a part or the whole functionality of such an image coding device and an image decoding device, or as such an image coding device and an image decoding device.

Advantageous Effects of Invention

From the foregoing, the present invention can provide the video coding method or the video decoding method which can efficiently encode or decode the partition information when the screen is partitioned into various blocks and encoding or decoding the blocks.

BRIEF DESCRIPTION OF DRAWINGS

FIG. 2A is a schematic view illustrating a block hierarchy according to the embodiment 1 of the present invention.

FIG. 2B is a schematic view showing an example of the block hierarchy according to the embodiment 1 of the present invention.

FIG. 2C is a schematic view showing an example of a block hierarchy according to the embodiment 1 of the present invention.

FIG. 3A is a schematic view showing an example of a block partitioning pattern according to the embodiment 1 of the present invention.

FIG. 3B is a schematic view showing an example of block partition information according to the embodiment 1 of the present invention.

FIG. 3C is a schematic view showing an example of the block partition information according to the embodiment 1 of the present invention.

FIG. 11A is a schematic view illustrating a prediction method in which a partition information description unit and the partition information reconstruction unit according to the embodiment 3 of the present invention use partition information on a coded frame.

FIG. 11B is a schematic view illustrating a method in which the partition information description unit and the partition information reconstruction unit according to the embodiment 3 of the present invention use partition information of a coded frame.

FIG. 13 is a schematic view showing a data structure of partition information according to an embodiment 4 of the present invention.

FIG. 22 illustrates a structure of multiplexed data.

FIG. 25 shows a structure of TS packets and source packets in the multiplexed data.

FIG. 33 shows an example of a look-up table in which video data standards are associated with driving frequencies.

DESCRIPTION OF EMBODIMENTS

Hereinafter, embodiments of the present invention will be described with reference to the accompanying drawings. It should be noted that the embodiments described below are each merely a preferred illustration of the present invention. Values, shapes, materials, components, disposition or a form of connection between the components, steps, and the order of the steps are merely illustrative, and are not intended to limit the present invention. The present invention is limited only by the scope of the appended claims. Thus, among components of the below embodiments, components not set forth in the independent claims indicating the top level concept of the present invention are not necessary to achieve the present invention but will be described as components for preferable embodiments.

Embodiment 1

Figure 1:
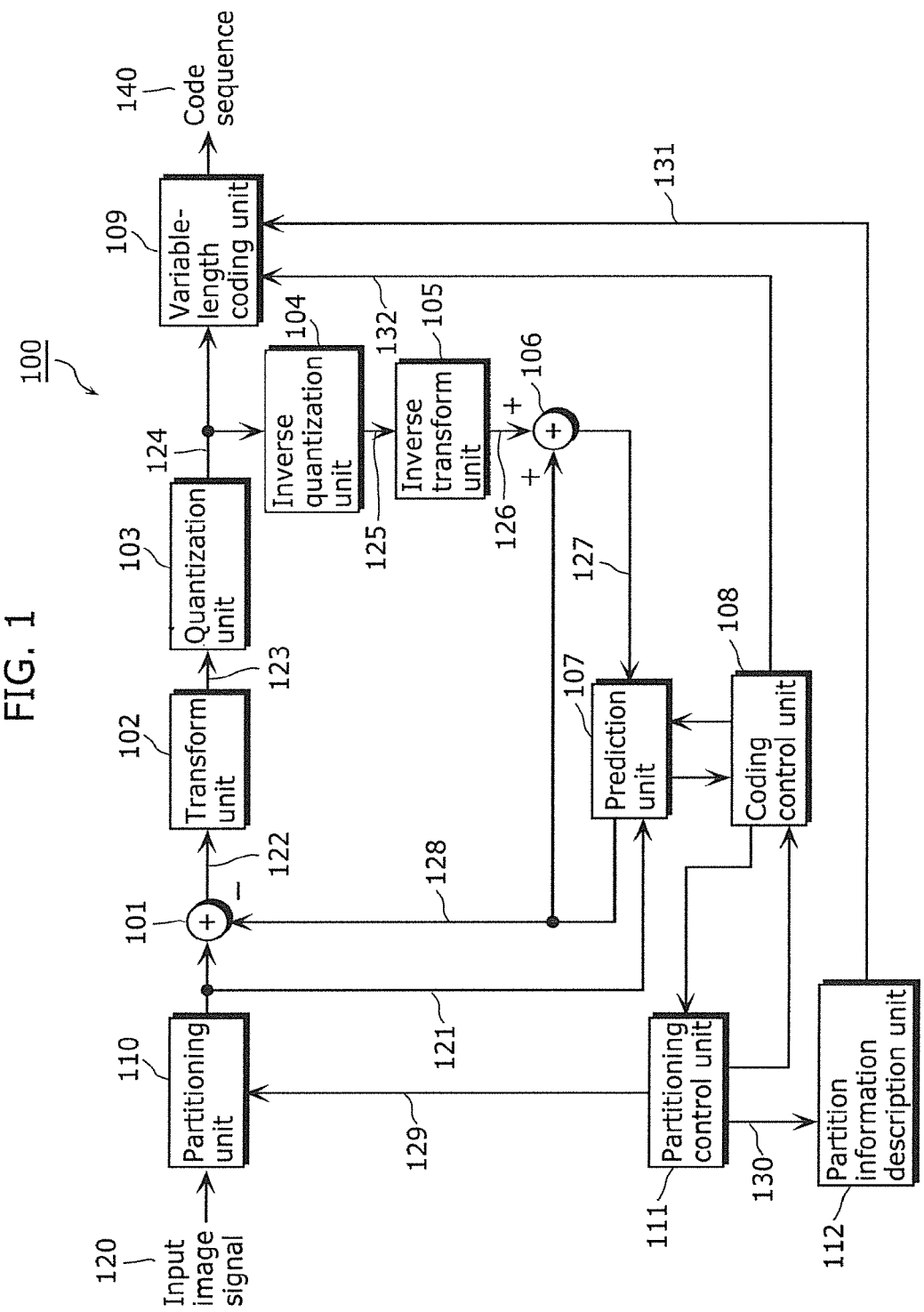
FIG. 1 is a block diagram of an image coding device according to an embodiment 1 of the present invention.

FIG. 1 is a block diagram of an image coding device 100 using an image coding method according to an embodiment 1 of the present invention. The image coding device 100 shown in FIG. 1 divides an input image signal 120 into processing units (blocks) and codes the partitioned image to generate a code sequence 140.

The image coding device 100 includes a difference unit 101, a transform unit 102, a quantization unit 103, an inverse quantization unit 104, an inverse transform unit 105, an adder 106, a prediction unit 107, a coding control unit 108, a variable-length coding unit 109, a partitioning unit 110, a partitioning control unit 111, and a partition information description unit 112. It should be noted that the partitioning unit 110 and the prediction unit 107 each may include a memory therein.

The input image signal 120 is inputted to the partitioning unit 110. The partitioning unit 110 divides the input image signal 120, based on a divide control signal 129, to generate divided image signals 121, and outputs the generated divided image signals 121 to the difference unit 101 and the prediction unit 107.

The partitioning control unit 111 determines a partitioning pattern indicating how the image is to be partitioned by the partitioning unit 110. Herein, the processing units (blocks) are in a hierarchical format, and the partitioning control unit 111 determines the partitioning pattern in which the input image signal 120 is divided hierarchically in order starting from the largest unit of the processing units.

Examples of the partitioning pattern determined by the partitioning control unit 111 will be described with reference to FIGS. 2A, 2B, and 2C and FIGS. 3A, 3B, and 3C.

As shown in FIG. 2A to FIG. 2C, the partitioning pattern determined by the partitioning control unit 111 is represented by hierarchy depth (Depth). As shown in FIG. 2A, an unpartitioned block can be represented as Depth=0, blocks obtained by partitioning the unpartitioned block into four can be represented as Depth=1, and the following blocks can be represented in the same manner. FIG. 2B shows an example of block-sizes and hierarchy depths when the largest block-size is horizontal 64 pixels×vertical 64 pixels. FIG. 2C shows an example of block-sizes and hierarchy depths when the largest block-size is horizontal 128 pixels× vertical 128 pixels.

The partitioning pattern will be described in more detail with reference to FIG. 3A to FIG. 3C.

Similarly to the case shown in FIG. 2B, FIG. 3A shows an example where the largest block-size is horizontal 64 pixels×vertical 64 pixels and the smallest block-size is horizontal 8 pixels×vertical 8 pixels. The block is partitioned by a method in which the following is specified in turn: whether the largest block-size is to be partitioned; and if so, whether blocks obtained by partitioning the largest block are to be further partitioned. The block partitioning pattern can be represented by hierarchy (Dn_type) for each hierarchy depth. Herein, it is assumed that n is a value of hierarchy depth (Depth).

FIG. 3B shows an example where the partitioning pattern shown in FIG. 3A is represented by hierarchy partition mode information. Herein, for purposes of simplicity, there are two types of the hierarchy partition mode information, including a type indicating that the block is not partitioned (Dn_type=0) and a type indicating that the block is partitioned into four (Dn_type=1). It should be noted that, hereinafter, the hierarchy depths represented by Depth=0, 1, 2, and 3 will be described as hierarchy depths 0, 1, 2, and 3, respectively.

First, the largest block is partitioned, and thus has D0_type=1. At hierarchy depth 1 (Depth=1) for the next block-size, the hierarchy partition mode information is represented as follows: in a zigzag fashion from top to bottom, unpartitioned block (D1_type=0); partitioned block (D1_type=1); unpartitioned block (D1_type=0); and partitioned block (D1_type=1). Here, the hierarchy partition mode information on the next hierarchy depth 2 (Depth=2) is unnecessary for the unpartitioned blocks. Next, the same representation is used also for hierarchy depth 2 (Depth=2) for a block-size that is further partitioned. Specifically, four blocks at hierarchy depth 2 (Depth=2) obtained by partitioning the block at the hierarchy depth 1 which is the first block that has D1_type=1 are all unpartitioned (D2_type=0). Regarding the four blocks obtained by partitioning the last block that has D1_type=1, the first block can be represented as partitioned (D2_type=1), and the remaining three blocks can be represented as unpartitioned (D2_type=0).

FIG. 3C shows an example in which the representation in FIG. 3B is simplified and collectively represented. In other words, FIG. 3C shows an example in which the hierarchy partition mode information for each block-size is collectively represented as the partition mode information (type). It should be noted that in this example, the partition mode information is, similarly to the hierarchy partition mode information, binary information one of which indicates that a block is partitioned (1) and the other of which indicates that a block is not partitioned (0). Thus, information content of the partitioning pattern shown in FIG. 3A is of 13 bits. The partitioning control unit 111 then outputs the partition information 130 indicative of the partitioning pattern as shown in FIG. 3C to the partition information description unit 112.

Next, operation of the partitioning control unit 111 to determine the partitioning pattern set forth above will be described with reference to FIG. 4.

Cost information (coding cost) required for the determination of the partitioning pattern is calculated, for example, as follows.

The partitioning unit 110 divides the input image signal 120 to a size of interest for cost calculation, to generate the divided image signals 121, and outputs the generated divided image signals 121 to the prediction unit 107.

The prediction unit 107 generates a predicted image signal 128, based on a decoded image signal 127 that has been encoded and decoded and a prediction mode acquired from the coding control unit 108. Herein, the coding control unit 108 specifies for the prediction unit 107 a prediction mode among at least one candidate prediction mode which is predetermined. Examples of the candidate prediction mode include a mode in which predicted pixels are generated by extrapolating adjacent pixels in the screen in a predetermined direction and a mode in which predicted pixels are generated using pixels having high correlation with other encoded and decoded frame.

Furthermore, the prediction unit 107 calculates coding cost which is a weighted sum of prediction information and the correlation information. Herein, the prediction information is information required for the generation of the predicted image signal 128, such as directional information for extrapolating adjacent pixels in the screen and relative position information (motion vector information) with other frame. The correlation information indicates the degree of correlation between the divided image signal 121 and the predicted image signal 128, and is, for example, a sum of absolute differences between the divided image signal 121 and the predicted image signal 128. The prediction unit 107 calculates as the coding cost, for example, a value indicated in the below (Equation 1) which is known as a cost function.

Furthermore, the prediction unit 107 calculates the coding costs, and outputs to the difference unit 101 a predicted image signal 128 that has been predicted in a prediction mode that yields a smallest coding cost of all the candidate prediction modes. The prediction unit 107 outputs the prediction mode, the prediction information, and the coding cost that are at that time to the coding control unit 108. The coding control unit 108 outputs the coding cost described above to the partitioning control unit 111, and outputs a coding control signal 132 which includes the prediction mode and the prediction information to the variable-length coding unit 109.

For example, a Lagrangian cost function 3 indicated by (Equation 1) will be used as the above RD cost function.

[Equation 1]

$$J = D + \lambda \cdot R \qquad (Eq.\ 1)$$

where R is an amount of coding which is used for coding a difference image (quantized transform coefficients information 124), the prediction mode, and the prediction information, D is an amount of coding distortion, and $\lambda$ is the Lagrange multiplier calculated according to a quantization parameter QP which is used for coding. The coding control unit 108 selects a prediction mode that yields a smallest cost function 3 as a prediction mode for use for coding.

It should be noted that substitution values may be used for values of R and D. For example, merely the prediction mode information may be used as the amount of coding R, and a sum of absolute difference between the divided image signal 121 and the predicted image signal 128 may be used as the amount of coding distortion.

Figure 4:
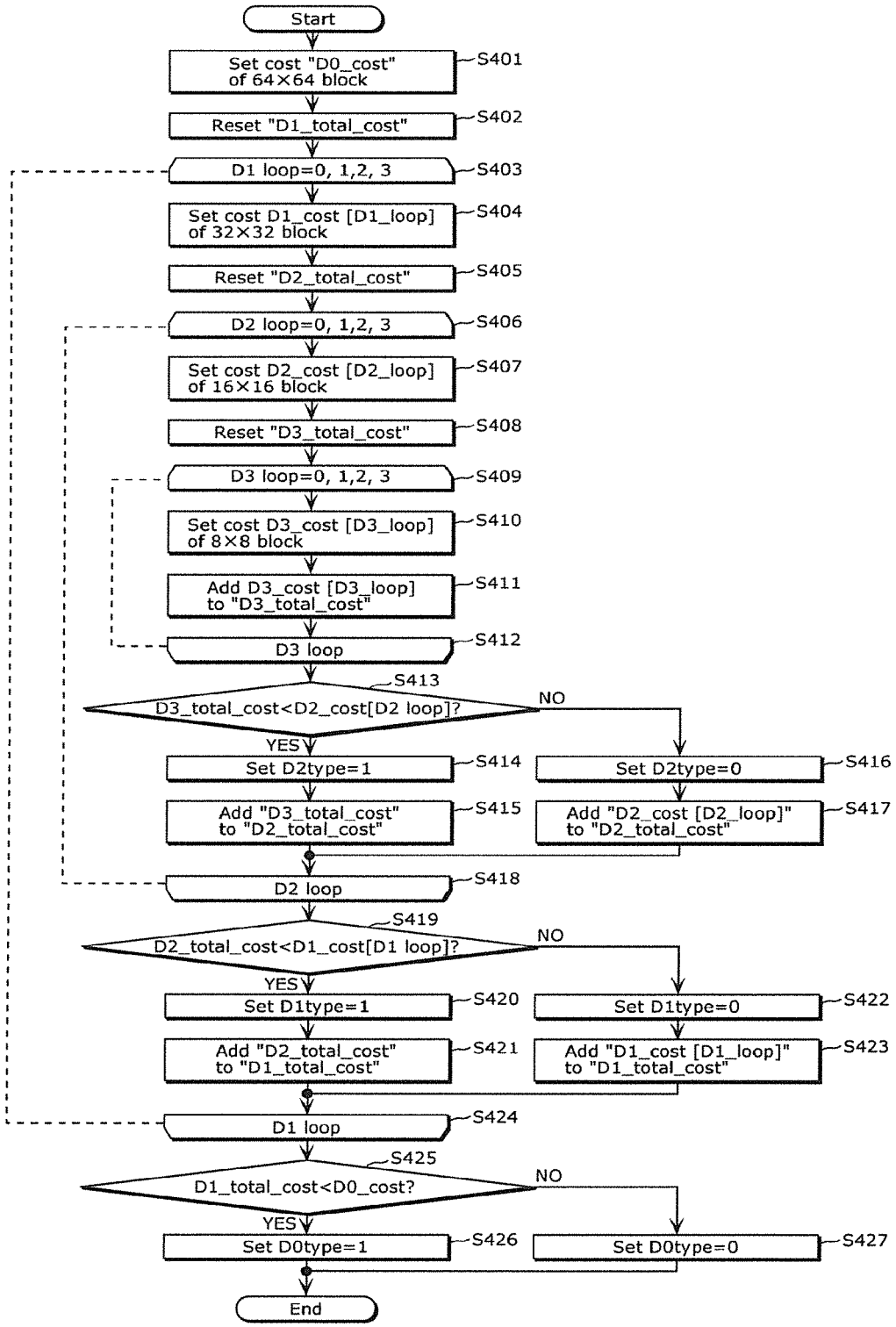
FIG. 4 is a flowchart illustrating operation of a partitioning control unit according to the embodiment 1 of the present invention.

FIG. 4 is a flowchart showing operation of the partitioning control unit 111.

Herein, for purposes of simplicity, an example is shown where the largest block-size is horizontal 64 pixels×vertical 64 pixels, the smallest block-size is horizontal 8 pixels×vertical 8 pixels, and the partition mode information indicates two types including a type indicating that a block is partitioned (1) and a type indicating that a block is not partitioned (0), as shown in FIG. 2B and FIG. 3B.

The partitioning control unit 111 acquires the coding costs of the divided image signals 121 obtained by the partitioning unit 110 dividing the input image signal 120 into horizontal 64 pixels×vertical 64 pixels blocks. The partitioning control unit 111 then sets values of the acquired coding costs as cost values (D0_cost) of horizontal 64 pixels×vertical 64 pixels blocks (hierarchy depth 0) (step S401).

Next, the partitioning control unit 111 resets (sets to 0) "D1_total_cost" indicating a total coding cost for the next hierarchy depth 1 (Depth=1) (step S402).

Next, the partitioning control unit 111 performs iteration (the processing performed between steps S403 and S424) on all four blocks (four blocks in this example) at hierarchy depth 1 (Depth=1) obtained by partitioning the horizontal 64 pixels×vertical 64 pixels block. In other words, the partitioning control unit 111 repeats the processing steps S403 to S424, sequentially setting a counter D1_loop to 0, 1, 2, and 3.

Next, the partitioning control unit 111 acquires the coding cost of a horizontal 32 pixels×vertical 32 pixels signal obtained by further partitioning the block at hierarchy depth 0. The partitioning control unit 111 then sets the acquired coding cost as a cost value (D1_cost [D1_loop]) of the horizontal 32 pixels×vertical 32 pixels block located at a position indicated by the counter D1_loop (step S404). It should be noted that processing order when the counter Dn_loop=0 to 3 may be the same when encoding and decoding. An example of the processing order includes a zigzag fashion from top to bottom.

Next, the partitioning control unit 111 resets (sets to 0) "D2_total_cost" indicating a total coding cost for the next hierarchy depth 2 (Depth=2) (step S405).

Next, the partitioning control unit 111 performs iteration (the processing performed between steps S406 and S418) on all the blocks (four blocks in this example) at hierarchy depth 2 (Depth=2) obtained by partitioning the block at the upper hierarchy depth 1 (Depth=1) in D1_loop. In other words, the partitioning control unit 111 repeats the processing steps S406 to S418, sequentially setting a counter D2_loop to 0, 1, 2, and 3.

Next, the partitioning control unit 111 acquires the coding cost of a horizontal 16 pixels×vertical 16 pixels signal obtained by further partitioning the blocks at hierarchy depth 1. The partitioning control unit 111 then sets the acquired coding cost as a cost value (D2_cost [D2_loop]) of the horizontal 16 pixels×vertical 16 pixels block located at a position indicated by the counter D2_loop (step S407).

Likewise, the partitioning control unit 111 resets (sets to 0) "D3_total_cost" indicating a total coding cost for the next hierarchy depth 3 (Depth=3) (step S408).

Next, the partitioning control unit 111 performs iteration (the processing performed between steps S409 and S412) on all the blocks (four blocks in this example) at hierarchy depth 3 (Depth=3) obtained by partitioning the blocks at the upper hierarchy depth 2 (Depth=2) in D2_loop. In other words, the partitioning control unit 111 repeats the processing steps S409 to S412, sequentially setting a counter D3_loop to 0, 1, 2, and 3.

Next, the partitioning control unit 111 acquires the coding cost of a horizontal 8 pixels×vertical 8 pixels signal obtained by further partitioning the block at hierarchy depth 2. The partitioning control unit 111 then sets the acquired coding cost as a cost value (D3_cost [D3_loop]) of the horizontal 8 pixels×vertical 8 pixels block located at a position indicated by the counter D3_loop (step S410). The partitioning control unit 111 then adds D3_cost [D3_loop] to "D3_total_cost" (step S411).

Next, if D3_loop continues, the partitioning control unit 111 increments a value of the counter D3_loop by 1 and performs the iteration. When D3_loop all terminates, the partitioning control unit 111 proceeds to the next step (step S412).

Next, the partitioning control unit 111 compares the calculated "D3_total_cost" and the calculated "D2_cost [D2_loop]" described above (step S413). When "D2_cost [D2_loop]" is greater than "D3_total_cost" (YES in step S413), the partitioned blocks have a smaller coding cost than the unpartitioned blocks. Thus, the partitioning control unit 111 sets "D2type=1" indicative of partitioned block (step S414), and adds the value of "D3_total_cost" to "D2_total_cost" (step S415).

On the other hand, when "D2_cost [D2_loop]" is smaller than "D3_total_cost" (NO in step S413), the unpartitioned blocks have a smaller coding cost than the partitioned blocks. Thus, the partitioning control unit 111 sets "D2type=0" indicative of unpartitioned block (step S416), and adds the value of "D2_cost [D2_loop]" to "D2_total_cost" (step S417).

Next, if D2_loop continues, the partitioning control unit 111 increments a value of the counter D3_loop by 1 and performs the iteration. When D2_loop all terminates, the partitioning control unit 111 proceeds to the next step (step S418).

Next, the partitioning control unit 111 compares the calculated "D2_total_cost" and the calculated "D1_cost [D1_loop]" described above (step S419). When "D1_cost [D1_loop]" is greater than "D2_total_cost" (YES in step S419), the partitioned blocks have a smaller coding cost than the unpartitioned blocks. Thus, the partitioning control unit 111 sets "D1type=1" indicative of partitioned block (step S420), and adds the value of "D2_total_cost" to "D1_total_cost" (step S421).

On the other hand, when "D1_cost [D1_loop]" is greater than "D2_total_cost" (NO in step S419), the unpartitioned blocks have a smaller coding cost than the partitioned blocks. Thus, the partitioning control unit 111 sets "D1type=0" indicative of unpartitioned block (step S422), and adds the value of "D1_cost [D1_loop]" to "D1_total_cost" (step S423).

Next, if D1_loop continues, the partitioning control unit 111 increments the value of the counter D1_loop by 1 and performs the iteration. When D1_loop all terminates, the partitioning control unit 111 proceeds to the next step (step S424).

Last, the partitioning control unit 111 compares the calculated "D1_total_cost" and the calculated "D0_cost" described above (step S425). When "D0_cost" is greater than "D1_total_cost" (YES in step S425), the partitioned blocks have a smaller coding cost than the unpartitioned blocks. Thus, the partitioning control unit 111 sets "D0type=1" indicative of partitioned block (step S426).

On the other hand, when "D0_cost" is smaller than "D1_total_cost" (NO in step S425), the unpartitioned blocks have a smaller coding cost than the partitioned blocks. Thus, the partitioning control unit 111 sets "D0type=0" indicative of unpartitioned block (step S427).

According to the above procedure, the partitioning control unit 111 can determine the partitioning pattern that yields a smallest coding cost.

It should be noted that the method for determining the partitioning pattern is by way of example, and the present invention is not limited thereto. For example, the partitioning control unit 111 may parse the divided image signal 121 obtained by the partitioning unit 110, partition a region, where the variance of the distribution of pixel values is high, of the divided image signal 121 into small blocks, and partition a region, where the pixel distribution is consistent, of the divided image signal 121 into large blocks. This allows for reduction of the circuit size of the image coding device 100.

Alternatively, as another method for determining the partitioning pattern, the partitioning control unit 111 may determine the partitioning pattern by a method determined based on a result of partitioning surrounding encoded and decoded blocks. Alternatively, as another method for determining the partitioning pattern, the partitioning control unit 111 may determine the partitioning pattern, utilizing a result of partitioning blocks in other encoded and decoded frame. Details of these methods will be described with reference to the embodiment 3.

Figure 5:
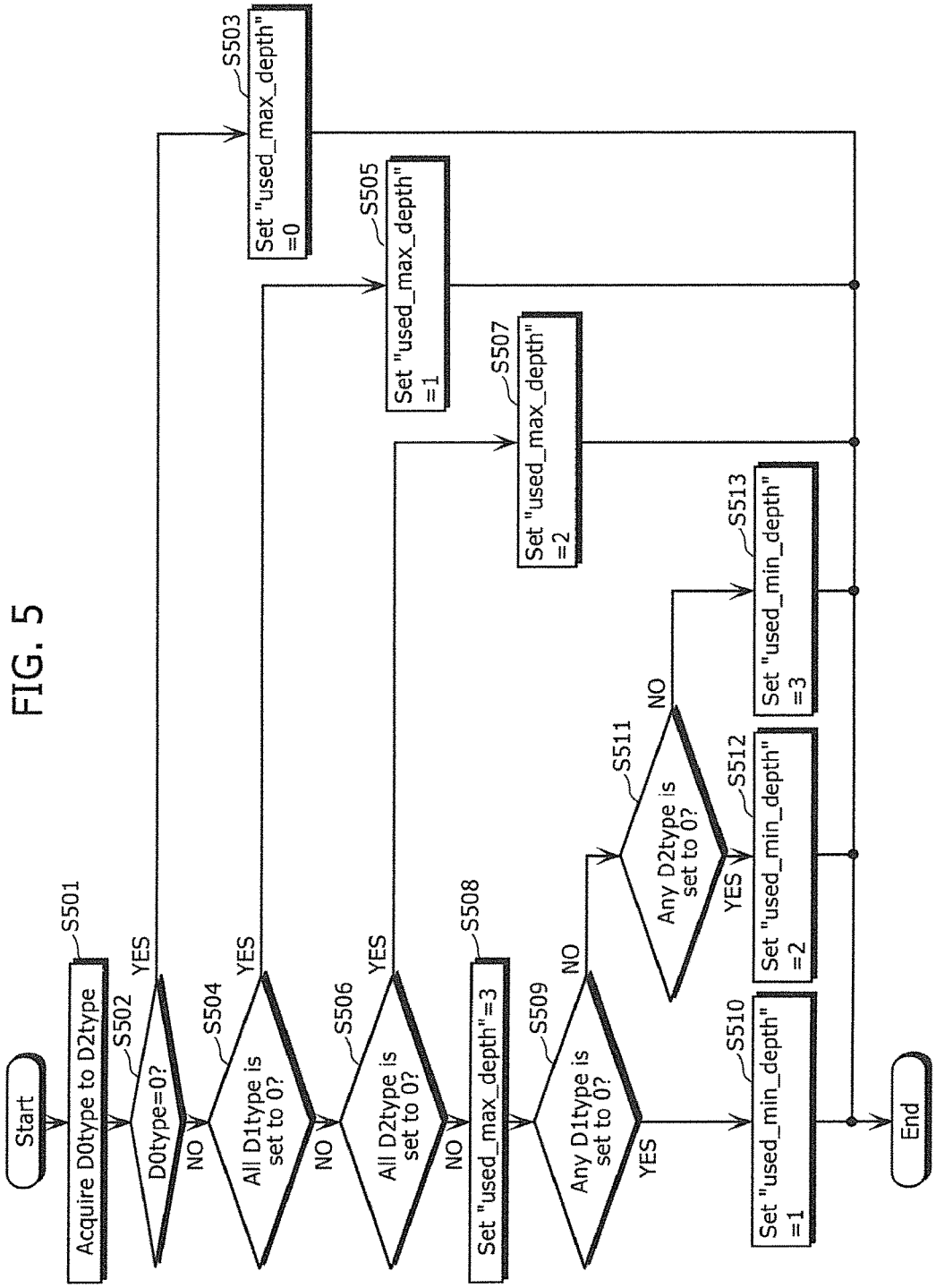
FIG. 5 is a flowchart illustrating operation of a partition information description unit according to the embodiment 1 of the present invention.

Next, a method in which the partition information description unit 112 describes partition information 131 will be described with reference to FIG. 5.

The partitioning control unit 111 outputs the partition information 130 indicative of the partitioning pattern determined by the above method to the partition information description unit 112. Herein, the partition information 130 is described by the hierarchy partition mode information or the partition mode information set forth above. The partition information description unit 112 generates, from the partition information 130, the partition information 131 to be coded by the variable-length coding unit 109.

First, the partition information description unit 112 acquires the hierarchy partition mode information (D0type to D2type) for each hierarchy depth included in the partition information 130 (step S501).

When D0type is 0 (YES in step S502), the largest block at hierarchy depth (Depth=0) is not partitioned. Thus, the partition information description unit 112 sets a variable "used_max_depth" to "0" indicative of Depth=0 (step S503). Herein, the variable "used_max_depth" is maximum used hierarchy depth information indicative of a maximum used hierarchy depth. The maximum used hierarchy depth indicates the deepest depth among hierarchy depths used in the largest block-size. In other words, the maximum used hierarchy depth is a hierarchy depth of the deepest block among partitioned blocks.

When D0type is not 0 (NO in step S502), the partition information description unit 112 next determines whether all D1type is 0 (step S504). When all D1type is 0 (YES in step S504), blocks at hierarchy depth 1 (Depth=1) are not partitioned. Thus, the partition information description unit 112 sets the variable "used_max_depth" to "1" indicative of Depth=1 (step S505).

On the other hand, when at least one D1type is not 0 (NO in step S504), next, the partition information description unit 112 determines whether all D2type is 0 (step S506). When all D2type is 0 (YES in step S506), blocks at hierarchy depth 2 (Depth=2) are not partitioned. Thus, the partition information description unit 112 sets the variable "used_max_depth" to "2" indicative of Depth=2 (step S507).

On the other hand, when at least one D2type is not 0 (NO in step S506), up to the smallest block-size is partitioned. Thus, the partition information description unit 112 sets the variable "used_max_depth" to "3" indicative of Depth=3 (step S508).

Next, the partition information description unit 112 determines whether at least one D1type is set to 0 (step S509). When at least one D1type is set to 0 (YES in step S509), which indicates that there is an unpartitioned block among blocks having a size satisfying Depth=1. Thus, the partition information description unit 112 sets a variable "used_min_depth" to "1" indicative of Depth=1 (step S510). Herein, the variable "used_min_depth" is minimum used hierarchy depth information indicative of a minimum used hierarchy depth. The minimum used hierarchy depth indicates the shallowest depth among hierarchy depths used in the largest block-size. In other words, the minimum used hierarchy depth is a hierarchy depth of the shallowest block among partitioned blocks.

On the other hand, when no D1type is set to 0 (NO in step S509), next, the partition information description unit 112 determines whether at least one D2type is set to 0 (step S511). When at least one D2type is set to 0 (YES in step S511), which indicates that there is an unpartitioned block among blocks having a size satisfying Depth=2. Thus, the partition information description unit 112 sets the variable "used_min_depth" to "2" indicative of Depth=2 (step S512).

When no D2type is set to 0 (NO in step S511), blocks having a size satisfying Depth=2 are all partitioned. Thus, the partition information description unit 112 sets the variable "used_min_depth" to "3" indicative of Depth=3 (step S513).

The partition information description unit 112 determines "used_max_depth" as described above. Moreover, the partition information description unit 112 determines "used_min_depth" only when "used_max_depth=3." Furthermore, the partition information description unit 112 determines, based on "used_max_depth" and "used_min_depth", the partition mode information 130A to be variable-length coded by the variable-length coding unit 109 among the pieces of the partition mode information included in the partition information 130. Then, the partition information description unit 112 generates the partition information 131 which includes "used_max_depth", "used_min_depth", and the determined partition mode information 130A, and outputs the generated partition information 131 to the variable-length coding unit 109.

Herein, details of a signal to be variable-length coded by the variable-length coding unit 109 will be described with reference to FIGS. 6A, 6B, and 6C.

Figure 6A:
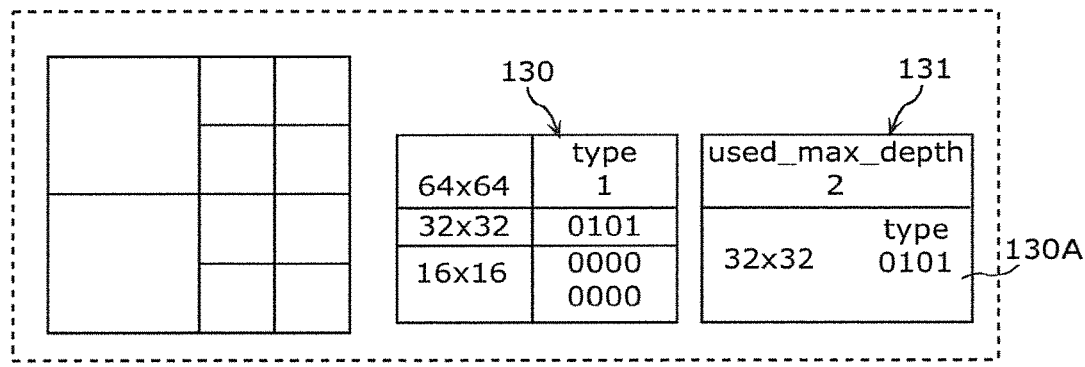
FIG. 6A is a schematic view showing an example of partitioning pattern and partition information according to the embodiment 1 of the present invention.
Figure 6B:
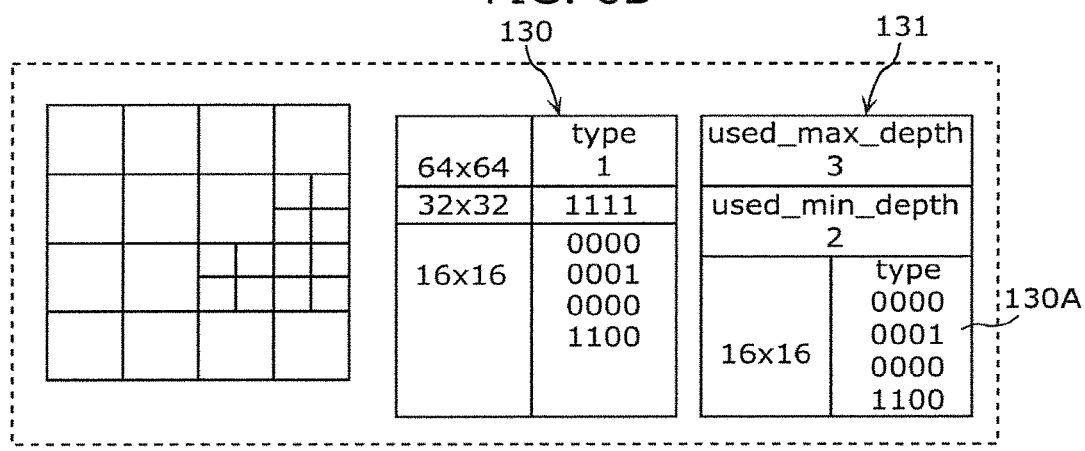
FIG. 6B is a schematic view showing an example of partitioning pattern and partition information according to the embodiment 1 of the present invention.
Figure 6C:
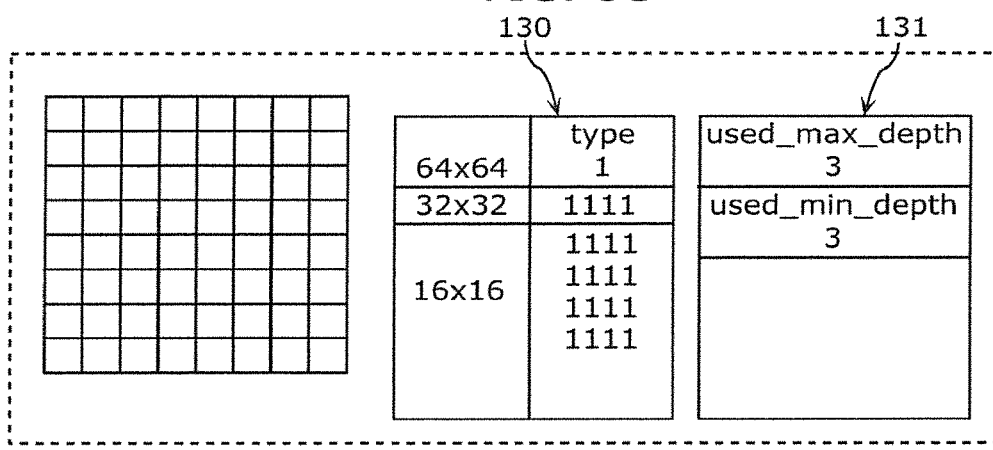
FIG. 6C is a schematic view showing an example of partitioning pattern and partition information according to the embodiment 1 of the present invention.

FIG. 6A to FIG. 6C are schematic views showing the partition information 130 and 131 on results of different block partitions.

First, the result of the block partition shown in FIG. 6A will be described. In this case, the partition information 130 includes, as the partition mode information, "1" for a 64×64 block, "0101" for 32×32 blocks, and "0000" and "0000" for 16×16 blocks obtained by partitioning the two 32×32 blocks that have "1" (partitioned blocks) as the partition mode information. The partition information description unit 112 determines "used_max_depth" in this case to be "2". In this case, since the maximum hierarchy depth as a result of the partition is 2, information "0000" and "0000" indicating that the 16×16 blocks are not partitioned is unnecessary. Thus, the partition information description unit 112 determines only the partition mode information "0101" on the 32×32 blocks as the partition mode information 130A to be coded. The variable-length coding unit 109 then variable-length codes the partition information 131 which includes "used_max_depth" and the partition mode information "0101" on the 32×32 blocks.

In this example, the partition mode information is handled as information indicative of partitioned block (1) and unpartitioned block (0), and thus the bit length of the partition information 130 is represented by 13 bits. On the other hand, by the partition information description unit 112 determining the maximum used hierarchy depth, the partition information 131 variable-length coded by the variable-length coding unit 109 includes 4 bits of the partition mode information and "used_max_depth". Herein, "used_max_depth" is fixed to 0 to 3 (up to hierarchy depth 3 in this example), and thus can be represented by 2 bits. In other words, in this case, 13 bit of information can be represented by 6 bits.

Next, the result of another block partition shown in FIG. 6B will be described. As before, the partition information 130 includes, as the partition mode information, "1" for a 64×64 block, "1111" for 32×32 blocks, and, "0000", "0001", "0000", and "1100" for 16×16 blocks obtained by partitioning four 32×32 blocks that have "1" (partitioned blocks) as the partition mode information. The partition information description unit 112 determines that "used_max_depth" is "3" and "used_min_depth" is "2" in this case. In this case, since the minimum hierarchy depth as a result of the partition is 2, the partition mode information "1111" indicating that the 32×32 blocks are partitioned is unnecessary. Thus, the partition information description unit 112 determines only four pieces of the partition mode information on the 16×16 blocks as the partition mode information 130A to be coded. Then, the variable-length coding unit 109 variable-length codes the partition information 131 which includes "used_max_depth", "used_min_depth", and the partition mode information "0000", "0001", "0000", and "1100" on the 16×16 blocks.

Considering the bit length as in FIG. 6A, the bit length of the partition information 130 is 21 bits. On the other hand, the partition information 131 variable-length coded by the variable-length coding unit 109 includes 16 bits of the partition mode information, "used_max_depth", and "used_min_depth". Herein, "used_max_depth" is, as described above, of 2 bits. The "used_min_depth" is fixed to 1 to 3, and thus can be represented by 1 bit to 2 bits. Thus, 21 bits of information can be represented by 20 bits.

Next, the result of another block partition shown in FIG. 6C will be described. As before, the partition information 130 includes, as the partition mode information, "1" for a 64×64 block, "1111" for 32×32 blocks, and "1111", "1111", "1111", and "1111" for 16×16 blocks obtained by partitioning four 32×32 blocks that have "1" (partitioned block) as the partition mode information. The partition information description unit 112 determines that "used_max_depth" is "3" and "used_min_depth" is "3" in this case. In this case, since the minimum hierarchy depth as a result of the partition is 3, the partition mode information "1111" indicating that the 32×32 blocks and the 16×16 blocks are partitioned is unnecessary. Thus, the variable-length coding unit 109 variable-length codes the partition information 131 which includes "used_max_depth" and "used_min_depth."

The bit length will be considered as in FIG. 6A and FIG. 6B. The bit length of the partition information 130 is represented by 21 bits. By the partition information description unit 112 determining the maximum used hierarchy depth and the minimum used hierarchy depth, the variable-length coded partition information 131 includes "used_max_depth" and "used_min_depth." Herein, "used_min_depth" is 2 bits and "used_min_depth" is 1 bit to 2 bits as described above. Thus, in this case, 21 bits of information can be represented by 4 bits.

It should be noted that statistical information may be used for variable-length coding to assign a frequently occurring signal with a short bit length and assign a less occurring signal with a long bit length. Also, a dynamic probalistic model such as arithmetic coding may be used for variable-length coding. In other words, it can be seen, although a reference value, that the partition information description method according to the present embodiment increases the possibility that a greater amount of coding can be reduced.

As described above, the prediction unit 107 generates the predicted image signal 128 from the decoded image signal 127 which is a coded image signal. Then, the prediction unit 107 outputs the generated predicted image signal 128 to the difference unit 101 and the adder 106.

The difference unit 101 calculates a difference between the divided image signal 121, which is a signal obtained by dividing the input image signal 120, and the predicted image signal 128 to generate a differential signal 122, and outputs the generated differential signal 122 to the transform unit 102.

The transform unit 102 transforms the differential signal 122 to generate transform coefficients 123, and outputs the generated transform coefficients 123 to the quantization unit 103.

The quantization unit 103 quantizes the transform coefficients 123 to generate the quantized transform coefficients information 124, and outputs the generated quantized transform coefficients information 124 to the variable-length coding unit 109 and the inverse quantization unit 104.

The inverse quantization unit 104 inverse quantizes the quantized transform coefficients information 124 to generate transform coefficients 125, and outputs the generated transform coefficients 125 to the inverse transform unit 105. The inverse transform unit 105 performs inverse transform on the transform coefficients 125 to generate a decoded residual image signal 126, and outputs the generated decoded residual image signal 126 to the adder 106.

The adder 106 adds the decoded residual image signal 126 and the predicted image signal 128 to generate the decoded image signal 127, and outputs the generated decoded image signal 127 to the prediction unit 107.

The variable-length coding unit 109 variable-length codes the quantized transform coefficients information 124 which is a signal to be coded, the coding control signal 132, and the partition information 131, according to signal type, to generate the code sequence 140.

It should be noted that details of the structure of the code sequence 140 in the above partition information description method will be described with reference to the embodiment 4.

Moreover, the above method for determining the partitioning pattern is by way of example and the present invention is not limited thereto. For example, a result of partitioning surrounding coded blocks may be used. Also, a result of partitioning other coded frame may be used. Details in these cases will be described with reference to the embodiment 3.

It should be noted that while in the present embodiment, the partition of the macroblock which is a coding unit has been described, the present invention is not limited thereto. For example, units on which the transform is performed by the transform unit 102 may be described in the same manner. This case will be described in detail with reference to the embodiment 4.

It should be noted that while the case has been described which uses two types including a type indicating that a block is partitioned into four blocks and a type indicating that a block is not partitioned, the present invention is not limited thereto. For example, similarly to the case of NPL 1, the present invention is applicable to cases where the block is partitioned into non-squared shapes (16 pixels×8 pixels, 8 pixels×16 pixels). Details in this case will be described with reference to the embodiment 5.

It should be noted that if the variable-length coding unit 109 described above employs arithmetic coding, probalistic models used for arithmetic coding may be switched based on shape information of the coded block and/or information on the maximum used hierarchy depth and/or information on the minimum used hierarchy depth. It can be expected that this further enhances the coding efficiency.

It should be noted that if the variable-length coding unit 109 described above employs a variable-length code table, in the bit length calculation described above, when the reduction of the partition information is great, a long bit length may be assigned to the information on the maximum used hierarchy depth and/or the minimum used hierarchy depth, and when the reduction is small, a short bit length may be assigned to the information on the maximum used hierarchy depth and/or the minimum used hierarchy depth. This can further increase an enhancement rate of the coding efficiency by the present embodiment.

It should be noted that while in the detailed description of the present embodiment, the largest block-size is horizontal 64 pixels×vertical 64 pixels and the smallest block-size is horizontal 8 pixels×vertical 8 pixels, the present invention is applicable irrespective of size.

Embodiment 2

In an embodiment 2 according to the present invention, an image decoding device 200 will be described which decodes the code sequence 140 generated by the image coding device 100 described above.

Figure 7:
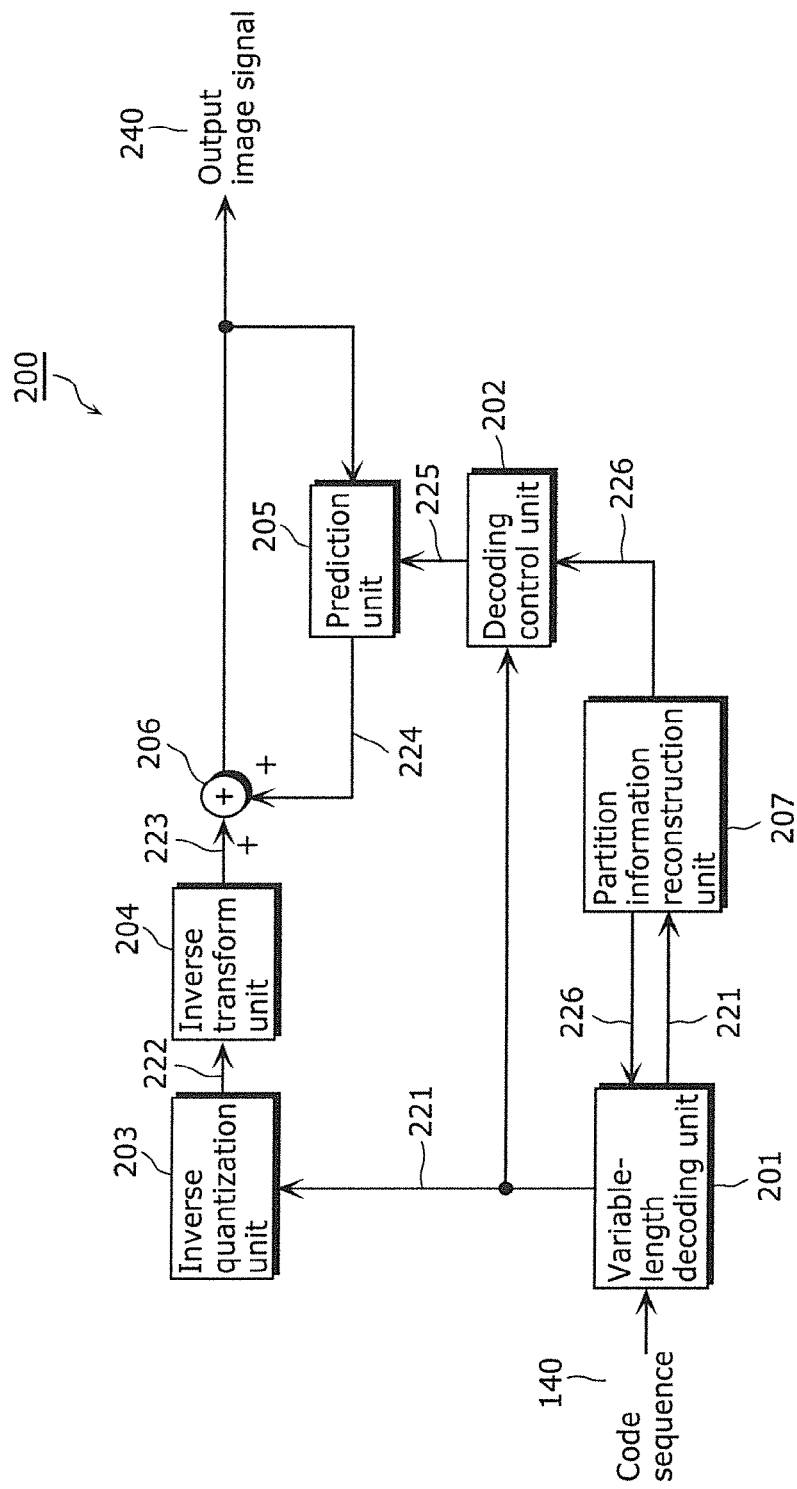
FIG. 7 is a block diagram of an image decoding device according to an embodiment 2 of the present invention.

FIG. 7 is a block diagram of the image decoding device 200 which uses a partition information reconstruction unit 207 according to the present embodiment. The image decoding device 200 shown in FIG. 7 includes a variable-length decoding unit 201, a decoding control unit 202, an inverse quantization unit 203, an inverse transform unit 204, a prediction unit 205, an adder 206, and the partition information reconstruction unit 207. It should be noted that the prediction unit 205 may include a memory therein.

The code sequence 140 is a code sequence generated by the image coding device 100 according to the embodiment of the present invention. The code sequence 140 is inputted to the variable-length decoding unit 201.

The variable-length decoding unit 201 variable-length decodes the partition information which is included in the code sequence 140. Specifically, the variable-length decoding unit 201 variable-length decodes the code sequence 140 to generate a decoded signal 221, and outputs the generated decoded signal 221 to the partition information reconstruction unit 207, the decoding control unit 202, and the inverse quantization unit 203. It should be noted that the variable-length decoding unit 201 performs the processing in partition units based on partition information 226 acquired by the partition information reconstruction unit 207.

When the decoded signal 221 is quantized transform coefficients, the inverse quantization unit 203 inverse quantizes the decoded signal 221 to generate transform coefficients 222. The inverse transform unit 204 performs inverse transform on the transform coefficients 222 to generate a decoded residual image signal 223, and outputs the generated decoded residual image signal 223 to the adder 206.

When the decoded signal 221 is predicted image generation-related information 225 indicative of prediction method, the decoding control unit 202 outputs the partition information 226 acquired by the partition information reconstruction unit 207, and the predicted image generation-related information 225 to the prediction unit 205. Herein, the predicted image generation-related information 225 corresponds to the coding control signal 132 in the image coding device 100, and includes, for example, the prediction mode and the prediction information.

The prediction unit 205 generates a predicted image signal 224 in partition units based on the partition information 226, using the decoded image signal that has been decoded (output image signal 240) and the predicted image generation-related information 225 acquired from the decoding control unit 202, and outputs the generated predicted image signal 224 to the adder 206. The adder 206 adds the decoded residual image signal 223 and the predicted image signal 224 to generate the decoded image signal (output image signal 240).

Figure 8:
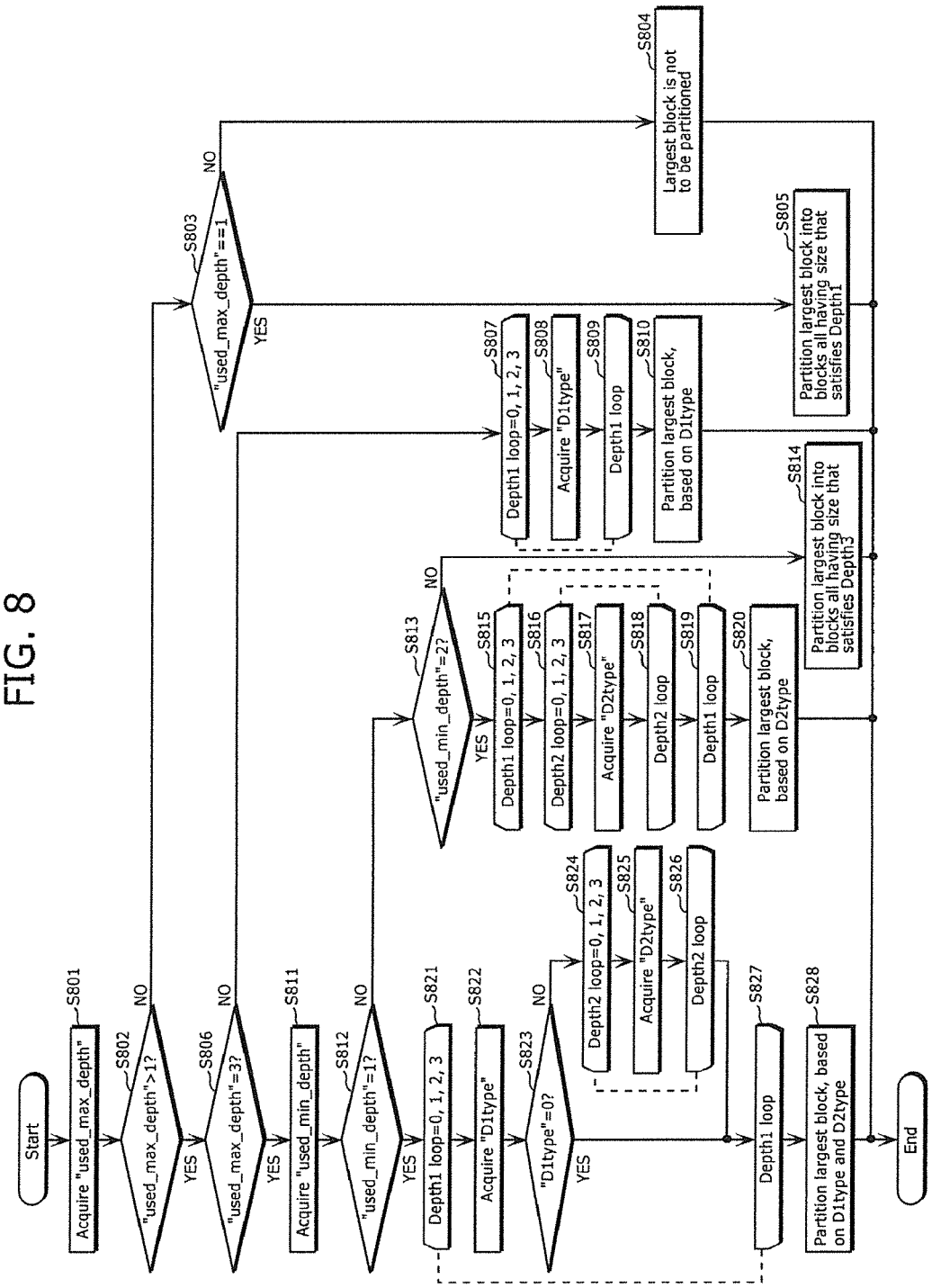
FIG. 8 is a flowchart illustrating operations of a partitioning control unit and a partition information reconstruction unit according to the embodiment 2 of the present invention.

It should be noted that when the decoded signal 221 is partition decoding information, the partition information reconstruction unit 207 reconstructs the partition information 226 from the partition decoding information to determine a partitioning pattern. Herein, the partition decoding information corresponds to the partition information 131 in the image coding device 100. The partition information 226 represents the partitioning pattern and corresponds to the partition information 130 according to the embodiment 1. Details of the processing flow will be described with reference to FIG. 8.

The partition information reconstruction unit 207 acquires the value of "used_max_depth" in the partition decoding information (step S801). When "used_max_depth" is 0 (NO in step S802 and NO in step S803), the partition information reconstruction unit 207 determines that the largest block-size is not to be partitioned (step S804). On the other hand, when "used_max_depth" is 1 (NO in step S802 and YES in step S803), the partition information reconstruction unit 207 determines that the block is to be partitioned into blocks all having a size that satisfies Depth=1 (the size of blocks obtained by partitioning the largest block into four) (step S805).

When "used_max_depth" is 2 (YES in step S802 and NO in step S806), the partition information reconstruction unit 207 acquires "D1type" of each block, changing the counter for the blocks at Depth1 in order of 0, 1, 2, and 3 (step S807 to step S809).

The partition information reconstruction unit 207 partitions the largest block, based on the acquired D1type (step S810). It should be noted that D1type is information for specifying, in order, for example, in a zigzag fashion from top to bottom, a partitioning pattern for each of four blocks obtained by partitioning the largest block. The partition information reconstruction unit 207 determines, based on D1type, whether each block obtained by partitioning the largest block is to be partitioned, to determine the partitioning pattern of the largest block.

When "used_max_depth" is 3 (YES in step S802 and YES in step S806), the partition information reconstruction unit 207 acquires "used_min_depth" (step S811).

When "used_min_depth" is 3 (NO in step S812 and NO in step S813), the partition information reconstruction unit 207 determines that the largest block is to be partitioned into blocks all having a size that satisfies Depth=3 (the size of blocks obtained by partitioning the largest block into 64) (step S814).

When "used_min_depth" is 2 (NO in step S812 and YES in step S813), the partition information reconstruction unit 207 changes a counter in order of 0, 1, 2, and 3 for the blocks at Depth1, and changes a counter in order of 0, 1, 2, and 3 for blocks at Depth2, which is a hierarchy depth one deeper than Depth1, thereby acquiring, in turn, "D2type" of each of the blocks at Depth2 (step S815 to step S819). Then, assuming that all the blocks has D1type being 1, the partition information reconstruction unit 207 partitions the largest block, based on D2type (step S820). Specifically, the partition information reconstruction unit 207 partitions the largest block into blocks all having a size that satisfies Depth=2. Then, based on D2type, the partition information reconstruction unit 207 determines whether each block is to be partitioned, thereby determining the partitioning pattern of the largest block.

When "used_min_depth" is 1 (YES in step S812), the partition information reconstruction unit 207 performs iteration (processing performed between step S821 and step S827) while changing the counter in order of 0, 1, 2, and 3 for the blocks at Depth1, to acquire "D1type" of each block at Depth1 (step S822).

It should be noted that when "D1type" is not 0 (NO in step S823), the partition information reconstruction unit 207 performs iteration (the processing performed between step S824 and step S826) while changing the counter in order of 0, 1, 2, and 3 for the blocks at Depth2, to acquire "D2type" of each block at Depth2 (step S825). Thereafter, the partition information reconstruction unit 207 advances the counter for Depth1 by 1.

On the other hand, when "D1type" is 0 (YES in step S823), the partition information reconstruction unit 207 advances the counter for Depth1 by 1 (step S827). Once all the loops terminates, the partition information reconstruction unit 207 determines the partitioning pattern of the largest block, based on D1type and D2type which are information indicating whether each of blocks corresponding to Depth1 and Depth2, respectively, for each hierarchy depth are to be partitioned (step S828).

The processing as described above allows for correctly decoding the code sequence 140 coded by the coding method according to the embodiment 1. As described above, the present invention can achieve a coding method which provides high coding efficiency, and a decoding method.

Embodiment 3

In the present embodiment, a case will be described where a partition information description unit 112 predicts the partitioning pattern.

The partition information description unit 112 uses a partitioning pattern of a coded block to estimate a predicted partitioning pattern which is a predicted value of the partitioning pattern of a block to be processed. A partitioning control unit 111 determines the partitioning pattern of the block to be processed, using the predicted partitioning pattern estimated.

It should be noted that the partition information description unit 112 may use a partitioning pattern of a block which is adjacent to the block to be processed and in the same frame as the block to be processed, to estimate the partitioning pattern of the block to be processed, or may use a partitioning pattern of a block included in other temporal frame to estimate the partitioning pattern of the block to be processed.

First, a method, which predicts a partitioning pattern of a block to be processed (hereinafter, also described as current block) from a partitioning pattern of an adjacent encoded and decoded block (hereinafter, also referred to as adjacent block), will be described with reference to FIGS. 9A, 9B, 9C, 9D, 9E, 9F, 9G, 9H, 9I, 9J, 9K, and 9L and FIG. 10. FIG. 9A to FIG. 9L are schematic views illustrating cases where the partition information of the current block is predicted from partition information of an adjacent block.

Figure 9A:
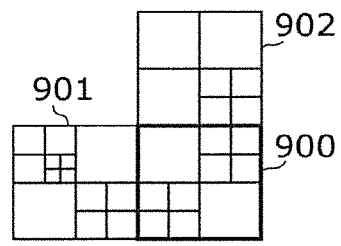
FIG. 9A is a schematic view showing an example of prediction of a partitioning pattern according to an embodiment 3 of the present invention.
Figure 9B:
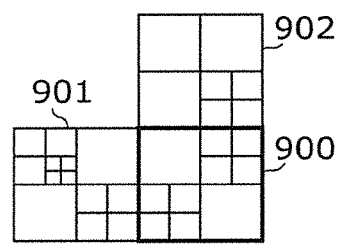
FIG. 9B is a schematic view showing an example of prediction of a partitioning pattern according to the embodiment 3 of the present invention.
Figure 9C:
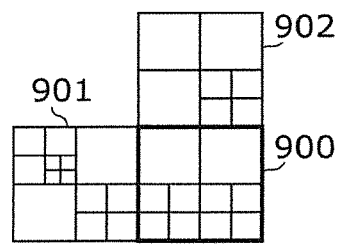
FIG. 9C is a schematic view showing an example of prediction of a partitioning pattern according to the embodiment 3 of the present invention.
Figure 9D:
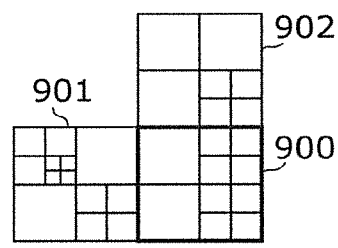
FIG. 9D is a schematic view showing an example of prediction of a partitioning pattern according to the embodiment 3 of the present invention.
Figure 9E:
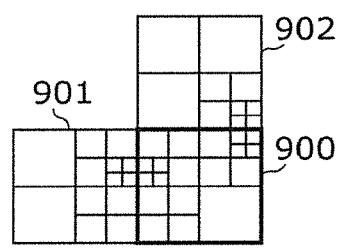
FIG. 9E is a schematic view showing an example of prediction of a partitioning pattern according to the embodiment 3 of the present invention.
Figure 9F:
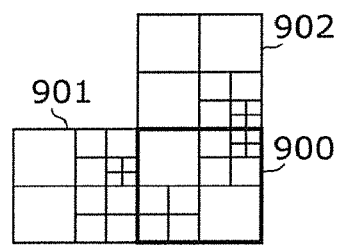
FIG. 9F is a schematic view showing an example of prediction of a partitioning pattern according to the embodiment 3 of the present invention.
Figure 9G:
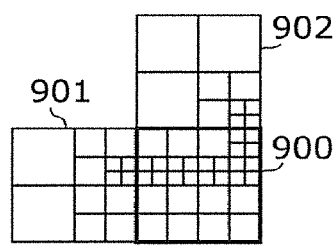
FIG. 9G is a schematic view showing an example of prediction of a partitioning pattern according to the embodiment 3 of the present invention.
Figure 9H:
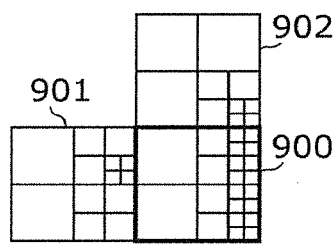
FIG. 9H is a schematic view showing an example of prediction of a partitioning pattern according to the embodiment 3 of the present invention.
Figure 9I:
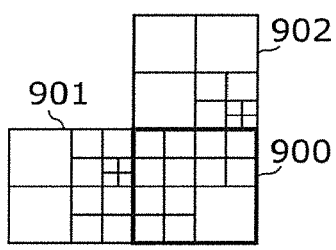
FIG. 9I is a schematic view showing an example of prediction of a partitioning pattern according to the embodiment 3 of the present invention.
Figure 9J:
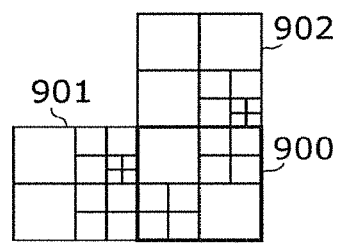
FIG. 9J is a schematic view showing an example of prediction of a partitioning pattern according to the embodiment 3 of the present invention.
Figure 9K:
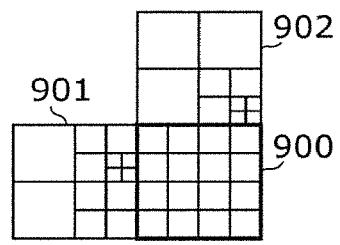
FIG. 9K is a schematic view showing an example of prediction of a partitioning pattern according to the embodiment 3 of the present invention.
Figure 9L:
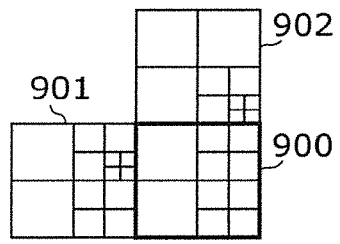
FIG. 9L is a schematic view showing an example of prediction of a partitioning pattern according to the embodiment 3 of the present invention.

FIG. 9A to FIG. 9L shows examples where a current block 900 is predicted using adjacent blocks 901 and 902. Herein, FIG. 9A, FIG. 9E, and FIG. 9I each show a case where a left adjacent block to the current block 900 is prioritized when an adjacent block in the current block 900 is not used for prediction. FIG. 9B, FIG. 9F, and FIG. 9J each show a case where a top adjacent block to the current block 900 is prioritized when an adjacent block in the current block 900 are not used for prediction. FIG. 9C, FIG. 9G, and FIG. 9K each show a case where a left adjacent block is prioritized when an adjacent block in the current block 900 is used for prediction. FIG. 9D, FIG. 9H, and FIG. 9L each show a case where a top adjacent block is prioritized when an adjacent block in the current block 900 is used for prediction.

FIG. 9A to FIG. 9H show cases where no restrictions of prediction is particularly imposed. FIG. 9I to FIG. 9L show cases where predicted maximum hierarchical block (Depth=2 in this case) is specified.

Figure 10:
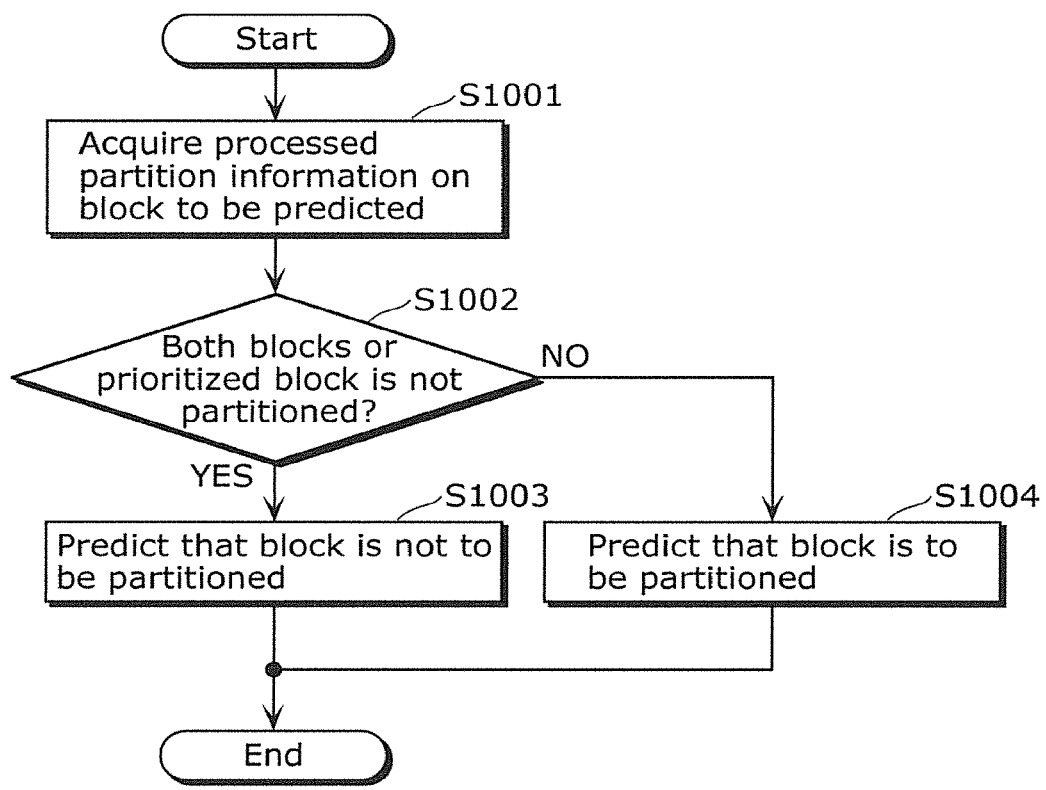
FIG. 10 is a flowchart showing a procedure for predicting a partitioning method, using partition information on surrounding blocks according to the embodiment 3 of the present invention.

FIG. 10 is a flowchart illustrating a procedure for predicting the partitioning pattern according to the present embodiment.

Herein, the partition information description unit 112 performs the prediction processing in the same order as the processing for determining the partitioning pattern (for example, in order in a zigzag fashion from top to bottom), and, with respect to the hierarchy (Depth), the prediction processing is performed in order from top (Depth=0) to bottom (Depth=a hierarchy depth of the smallest block-size).

First, the partition information description unit 112 acquires, for the current block, partition information of an adjacent processed block which is adjacent to the current block (step S1001). The partition information acquired here is of an adjacent block at the same hierarchy depth as the current block. When there is no partition information of an adjacent block at the same hierarchy depth, the partition information description unit 112 determines the partition information of the current block to be "unpartitioned block."

When the partition information of both the top adjacent block and the left adjacent block or the partition information of an adjacent block, which is the top adjacent block or the left adjacent block that is prioritized over the other, indicates "unpartitioned block" (YES in step S1002), the partition information description unit 112 predicts that the current block is not to be partitioned (step S1003). On the other hand, when the partition information of an adjacent block, which is the top adjacent block or the left adjacent block that is prioritized over the other, indicates "partitioned block" (NO in step S1002), the partition information description unit 112 predicts that the current block is to be partitioned (step S1004). If the partition information description unit 112 predicts that the current block is to be partitioned, the same processing is performed for the next hierarchy depth.

Information indicating which one of the top adjacent block and the left adjacent block is prioritized may be transmitted in header information described below, or may be predetermined when encoding and decoding.

As in FIG. 9A, FIG. 9B, FIG. 9E, FIG. 9F, FIG. 9I, and FIG. 9J, when the partition information of the adjacent block is acquired, adjacent blocks in the largest block-size (the size indicated by Depth=0) to be predicted may not be considered processed. In other words, when a partitioned block included in the current block 900 that has the largest block-size is the current block, the partition information description unit 112 uses only the adjacent block partition information included in the adjacent blocks 901 and 902 for prediction, without using partition information of an adjacent block included in the current block 900. In this case, the partition prediction may be made using only the partition information of the top adjacent block and the left adjacent block. Thus, the processing speed can be increased.

On the other hand, since the prediction is performed in the same order as the processing order (for example, in order in the zigzag fashion from top to bottom), partition prediction information of an adjacent block in the largest block-size can also be used as in FIG. 9C, FIG. 9D, FIG. 9G, FIG. 9H, FIG. 9K, and FIG. 9L. In this case, the prediction accuracy can be enhanced, and thereby the reduction of a greater amount of coding can be expected.

Furthermore, since the prediction is performed in the same order as the processing order, determined partition information can also be utilized. In this case, the prediction accuracy can be further enhanced, and thereby the reduction of a greater amount of coding can be expected.

It should be noted that at least either information as to whether the processed partition prediction information in the largest block-size is to be used or whether processed partition information is to be used may be transmitted in the header information described below or may be predetermined when encoding and decoding.

Next, a method for predicting the partitioning pattern of a current block from the partitioning pattern of a block in other encoded and decoded frame will be described with reference to FIG. 11A and FIG. 11B. FIG. 11A and FIG. 11B are schematic views illustrating the case where the partitioning pattern of the current block is predicted from the partitioning pattern of the block in the encoded and decoded frame. FIG. 11A is a schematic view showing the predicted result of partitioning blocks in a processed frame 1101 that has been encoded and decoded, and the partition prediction on the current block in a current frame 1102 to be encoded and decoded.

Herein, partitioned shape relative position information shown in FIG. 11A is information indicating which block in which predictive frame is to be used for prediction. It should be noted that as shown in FIG. 11B, the use of partitioning result of a processed frame 1104 earlier in time than a current frame 1103 or a processed frame 1105 later in time than the current frame 1103 allows for efficient prediction.

It should be noted that the partition information description unit 112 may determine the partitioned shape relative position information of a block to be partitioned (the largest block-size), based on representative motion vector information among pieces of motion vector information used for intra prediction calculated by a predetermined method. For example, the partition information description unit 112 calculates a median value of a motion vector of an adjacent block and also calculates a median value of a motion vector of a reference frame in the same manner. Then, the partition information description unit 112 may use as the partitioned shape relative position information the motion vector based on the calculated median values.

Alternatively, if a block to be partitioned includes motion vectors, the partition information description unit 112 may use, as the partitioned shape relative position information, information on the leading motion vector and the reference frame as they are. In these cases, there is no need to transmit additional information for prediction, and thus the amount of coding can be reduced. It should be noted that in this case also, the image coding device 100 may separately transmit the partitioned shape relative position information. For example, the image coding device 100 first derives the partition information of a block to be partitioned. Then, from coded frame, the image coding device 100 calculates, as the partitioned shape relative position information, relative position information between a block to be partitioned and a block that has the same or the closest partition information as the block to be partitioned. Then, the image coding device 100 encodes and decodes the partitioned shape relative position information in the same manner as, for example, the motion vector information that is used by the prediction unit 107 for the intra prediction.

Next, how the coded partition information is transmitted (FIG. 12A) and reconstructed (FIG. 12B), using the predicted partition information will be described with reference to FIG. 12A and FIG. 12B, respectively.

The partition information description unit 112 calculates a difference between the partitioning pattern and the predicted partitioning pattern, and generates the partition information 131 which includes the difference. Hereinafter, the details will be described.

Figure 12A:
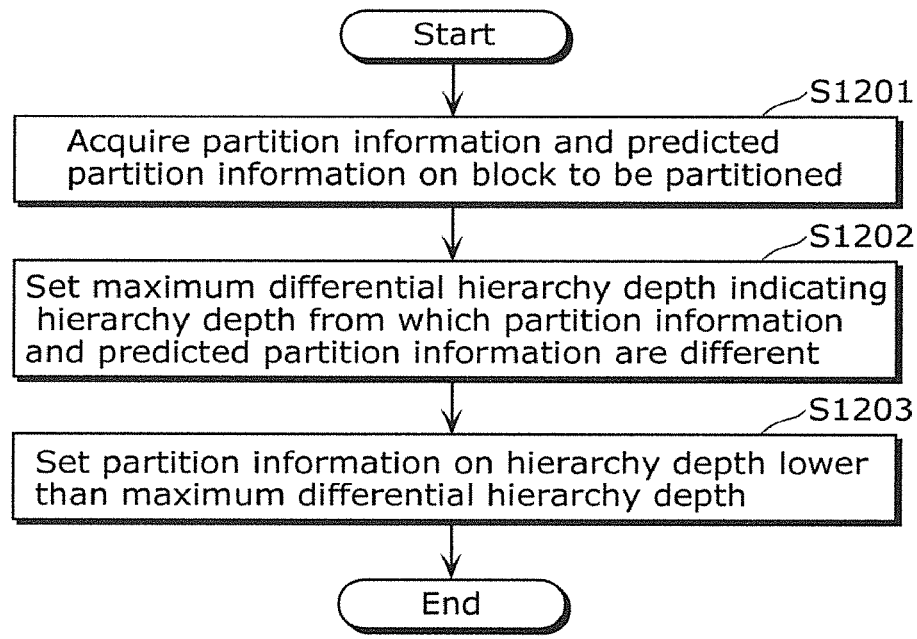
FIG. 12A is a flowchart illustrating operation of the partition information description unit according to the embodiment 3 of the present invention.

FIG. 12A is a flowchart illustrating operation of the partition information description unit 112 according to the embodiment 3. It should be noted that the partition information description unit 112 performs the description processing in the same order as the processing of determining the partitioning pattern (for example, in order in the zigzag fashion from top to bottom), and, with respect to the hierarchy (Depth), the description processing is performed in order from top (Depth=0) to bottom (a hierarchy depth satisfying Depth=the smallest block-size).

First, the partition information description unit 112 acquires the partition information and predicted partition information (hereinafter, the predicted partition information) on the current block (step S1201). Next, the partition information description unit 112 derives a maximum differential hierarchy depth (step S1202) in the same manner as the processing that derives the maximum used hierarchy depth (used_max_depth) in the embodiment 1. Herein, the maximum differential hierarchy depth is information indicating a hierarchy depth from which the partition information and the predicted partition information are different. In other words, the maximum differential hierarchy depth is information indicating the top hierarchy depth from which the partition information and the predicted partition information are different. For example, the derivation method uses 0 for the predicted partition information and the partition information being the same and 1 for the predicted partition information and the partition information being different, and performs the processing illustrated in the flowchart of FIG. 5, thereby deriving the maximum used hierarchy depth. Alternatively, if a hierarchy depth (smaller block) that is lower than the maximum differential hierarchy depth is present, the partition information description unit 112 sets the partition information on the hierarchy depth (step S1203).

It should be noted that the description method is by way of example, and the description method is not limited thereto insofar as the prediction method according to the present invention is employed.

Figure 12B:
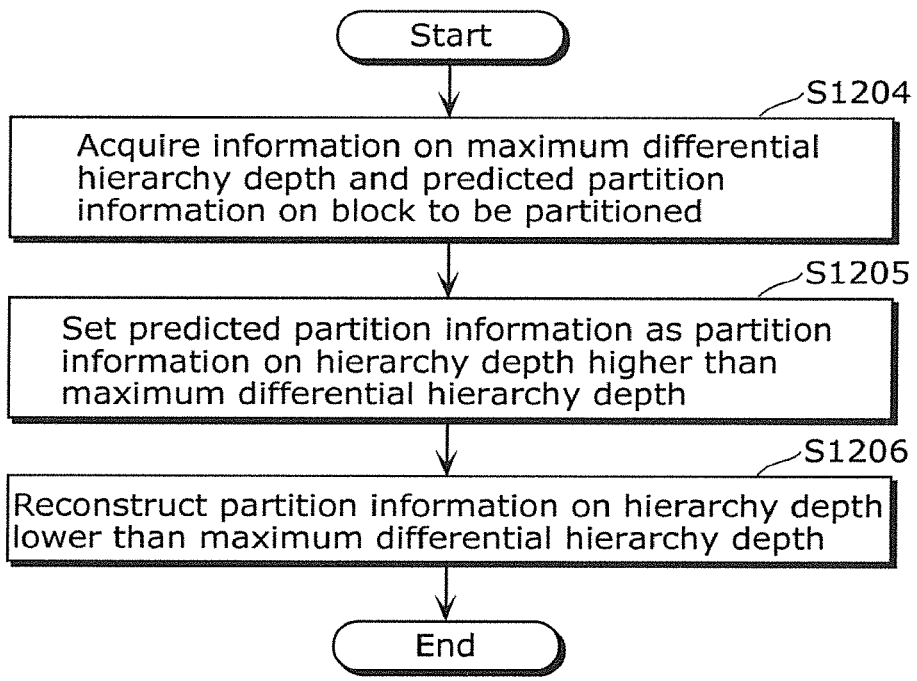
FIG. 12B is a flowchart illustrating operation of the partition information reconstruction unit according to the embodiment 3 of the present invention.

FIG. 12B is a flowchart illustrating operation of reconstructing the partition information that is coded in the procedure illustrated in FIG. 12A.

First, a partition information reconstruction unit 207 acquires information on the maximum differential hierarchy depth and the predicted partition information on the block to be partitioned (step S1204). Herein, the information on the maximum differential hierarchy depth is information indicative of the maximum differential hierarchy depth and included in the code sequence 140 generated by the image coding device 100. The predicted partition information is generated by the image decoding device 200 performing the same processing as the processing performed by the image coding device 100 described above.

Next, the partition information reconstruction unit 207 sets the predicted partition information as the partition information on a hierarchy depth (information regarded the same as the prediction) higher than the maximum differential hierarchy depth (step S1205).

Last, the partition information reconstruction unit 207 reconstructs the partition information on a hierarchy depth lower than the maximum differential hierarchy depth (step S1206). Thus, the partition information on the current block is reconstructed. Herein, the partition information on a hierarchy depth lower than the maximum differential hierarchy depth is included in the code sequence 140 generated by the image coding device 100.

Embodiment 4

In the present embodiment, a method in which the partition information description unit 112 records the partition-related information as the header information of a stream, and encodes and decodes the header information will be described.

FIG. 13 is a diagram showing a configuration of the code sequence 140 in the image coding method according to the present embodiment. Part (a) of FIG. 13 indicates a coded signal corresponding to a video sequence formed of at least one screen. As shown in (a) of FIG. 13, the code sequence 140 includes sequence data SegData which is data for the entire screen, and a sequence header SeqHdr which is data common to all the data for the entire screen. The sequence header SeqHdr includes partition-related information SepInfo.

The partition-related information SepInfo is a flag for switching, for example, whether the method described with reference to the embodiment 1 is used and coding only the partition information (Dn_type information). It should be noted that the partition-related information SepInfo may be information related to the prediction of the partitioning pattern described with reference to the embodiment 3.

Part (b) of FIG. 13 shows a structure of the sequence data SeqData. The sequence data SeqData includes a plurality of picture signals PicStr. Each picture signal PicStr is a coded signal corresponding to one screen. In other words, each picture signal PicStr is a coded signal of a picture.

Part (c) of FIG. 13 shows a structure of the picture signal PicStr. The picture signal PicStr includes picture data PicData which is data for one screen, and a picture header PicHdr which is data common to the entirety of one screen. For example, the picture header PicHdr may include the partition-related information SepInfo.

Part (d) of FIG. 13 shows a structure of the picture data PicData. The picture data PicData includes a plurality of slice signals SliceStr. Each slice signal SliceStr is a coded signal, which is a set of a plurality of block units, of a slice.

Part (e) of FIG. 13 shows a structure of the slice signal SliceStr. The slice signal SliceStr includes slice data SliceData which is data of one slice, and a slice header SliceHdr which is data common to all the data of one slice. The slice header SliceHdr may include the partition-related information SepInfo. This allows the image decoding device 200 to correctly decode the received coded signal even when the processing method is appropriately switched by the image coding device 100 in slice data SliceData units.

It should be noted that when the sequence data SeqData includes a plurality of the picture signals PicStr, some of the picture headers PicHdr may include the partition-related information SepInfo, rather than all the picture headers PicHdr includes the partition-related information SepInfo.

Likewise, when the picture data PicData includes a plurality of slice signals SliceStr, only some of the slice headers SliceHdr may include the partition-related information SepInfo rather than all the slice headers SliceHdr includes the partition-related information SepInfo. If the content of the partition-related information SepInfo is common to the slices and if the partition-related information SepInfo is not in the slice header SliceHdr as shown in (e) of FIG. 13, the image decoding device 200 substitutes the partition-related information SepInfo included in the slice header SliceHdr of other slice for the partition-related information on a current slice. This can suppress an increase of the number of bits due to the partition-related information SepInfo being repeatedly included in the code sequence 140.

As shown in (e) of FIG. 13, the slice data SliceData includes a plural pieces of largest-block-size data LCTB. Each largest-block-size data LCTB is information on the largest block-size in block units. Each largest-block-size data LCTB includes a largest-block-size header LCTBHdr and a block signal CTBs. The block signal CTBs includes plural pieces of block data CTB in a hierarchical format.

Herein, the largest-block-size header LCTBHdr includes the maximum used hierarchy depth, the minimum used hierarchy depth or the maximum differential hierarchy depth. It should be noted that the partition information on all the blocks may be included in the largest-block-size header LCTBHdr or the partition information on a corresponding block may be included in each block data CTB.

Part (f) of FIG. 13 shows a structure of the block data CTB. A portion of the block data CTB includes a transform block header TUHdr, which is header information on the transform structure, and a transform block TUs. Similarly to the block (CUs) described above, the transform block TUs can also be partitioned. In other words, the present invention may be applied to the transform blocks. In this case, various size transform can be performed and the amount of coding for transmitting the shapes can be reduced.

Alternatively, when the code sequence 140 is transmitted in packets which are nonconsecutive data units rather than a consecutive bitstream, the header portion and the data portion other than the header may separately be transmitted. In this case, the header portion and data portion are not included in a bitstream as shown in FIG. 13. When packets are employed, however, the header portion and the data portions are not transmitted in consecutive order, and a corresponding data portion and a corresponding header portion are merely transmitted in different packets. In other words, although the code sequence 140 is not a bitstream, the concept is the same as the case of bitstream described with reference to FIG. 13.

In the decoding method according to the present invention, the code sequence 140 coded by the above method is decoded by the following procedure. First, the image decoding device 200 acquires the partition-related information SepInfo included in the sequence header SeqHdr, and stores the acquired partition-related information. Next, the image decoding device 200 acquires the partition-related information SepInfo included in the picture header PicHdr, and updates the stored partition-related information by the acquired partition-related information. Herein, if the partition-related information SepInfo or a portion thereof is not present, the image decoding device 200 stores, as it is, the partition-related information included in the sequence header SeqHdr. Likewise, the image decoding device 200 acquires the partition-related information SepInfo included in the slice header SliceHdr, and updates the stored partition-related information by the acquired partition-related information. Next, the image decoding device 200 acquires the largest-block-size data LCTB to acquire information necessary for partition (the maximum used hierarchy depth, the minimum used hierarchy depth or the maximum differential hierarchy depth, and the partition information) included in the largest-block-size header LCTBHdr. Then, the image decoding device 200 uses the acquired information to determine the partitioned shape of the subsequent blocks.

This allows the image decoding device 200 correctly decode the code sequence 140.

Embodiment 5

In the present embodiment, yet another variation of the coding method and the decoding method according to the embodiments 1 to 4 of the present invention will be described.

Figure 14A:
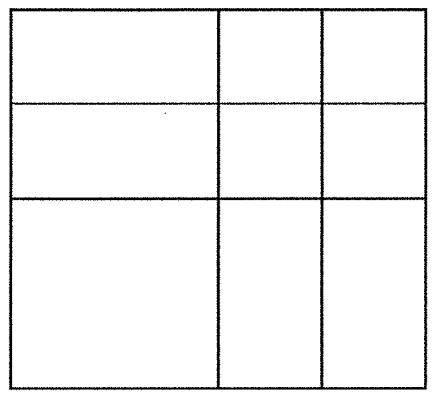
FIG. 14A is a schematic view showing an example of a partitioning pattern using a plurality of block shapes according to an embodiment 5 of the present invention.
Figure 14B:
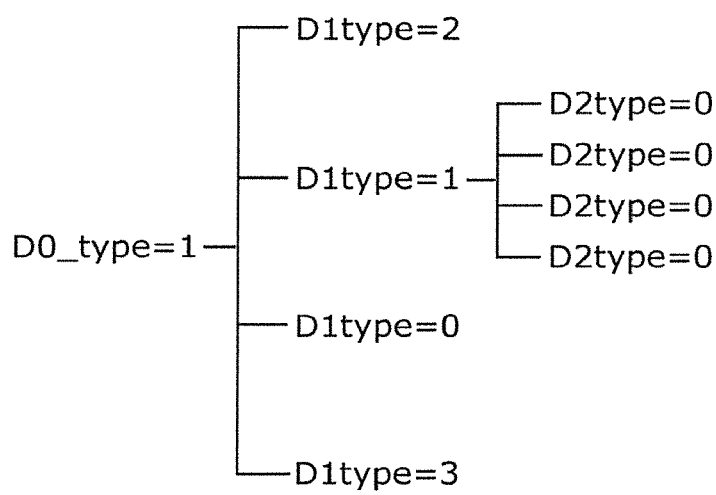
FIG. 14B is a schematic view showing an example of partition information according to the embodiment 5 of the present invention when the plurality of block shapes are used.
Figure 14C:
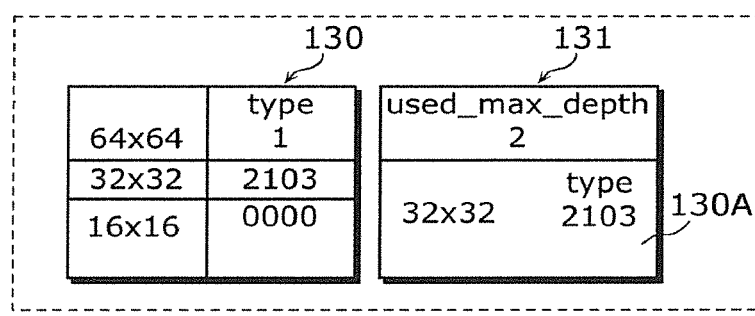
FIG. 14C a schematic view showing an example of the partition information according to the embodiment 5 of the present invention when the plurality of block shapes is used.

FIG. 14A to FIG. 14C are schematic views illustrating the partitioning method using a plurality of blocks.

The foregoing has given the description, for purposes of simplicity, when a block is partitioned into four squared blocks. However, additionally, a block may be partitioned into two rectangular blocks. It should be noted that in this case, blocks partitioned into shapes other than square shape are not to be further partitioned.

For example, as shown in FIG. 14A to FIG. 14C, the partition mode information indicated by Dn_type changes from the binary information 0 (unpartitioned block) and 1 (partitioned block) to quaternary information of 0 (unpartitioned block), 1 (block partitioned into four blocks), (block partitioned into two blocks in the horizontal direction), and 3 (block partitioned into two blocks in the vertical direction). Even when the partition mode information is described by such quaternary information, the method according to the present invention allows for coding the partition information using a small amount of coding.

Specifically, an example will be described where the partition information description unit 112 describes block partitioned shapes shown in FIG. 14A as the partition information. The block partitioned shapes shown in FIG. 14A represented by the aforementioned parameters are shown in FIG. 14B. In such a manner, respective partition mode information is set to Dn_type. In this case, according to the method of the embodiment 1, the maximum used hierarchy depth is 2. The partition information description unit 112 describes the maximum used hierarchy depth and the partition mode information 130A on Depth=1 (horizontal 32 pixels×vertical 32 pixels blocks) as the partition information 131 to be coded. This allows the partition information to be coded using a small amount of coding. The image decoding device 200 decodes the partition information having Dn_type, using the same shape rule as when coding, thereby reconstructing the partitioned shape.

Figure 15A:
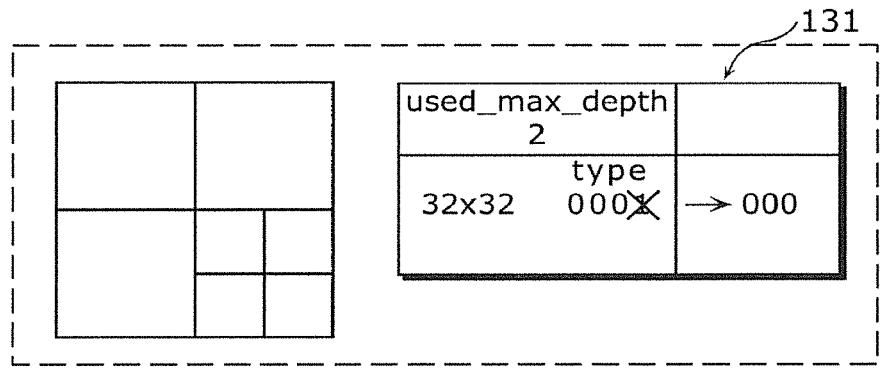
FIG. 15A a schematic view illustrating a method according to the embodiment 5 of the present invention to reduce an amount of redundant partition information.
Figure 15B:
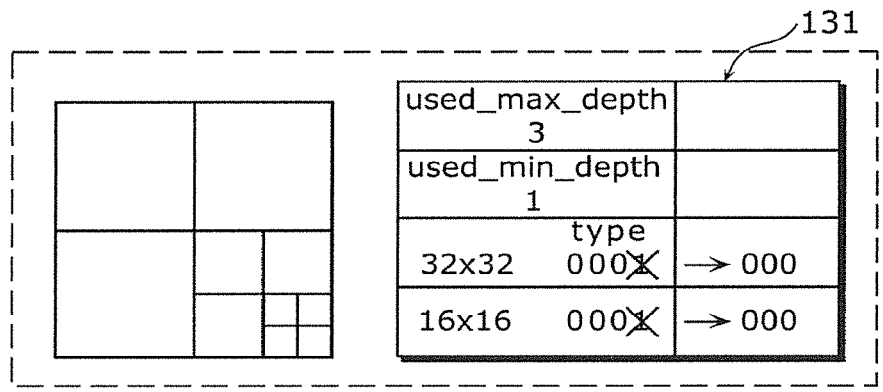
FIG. 15B is a schematic view illustrating the method according to the embodiment 5 of the present invention to reduce an amount of redundant partition information.
Figure 15C:
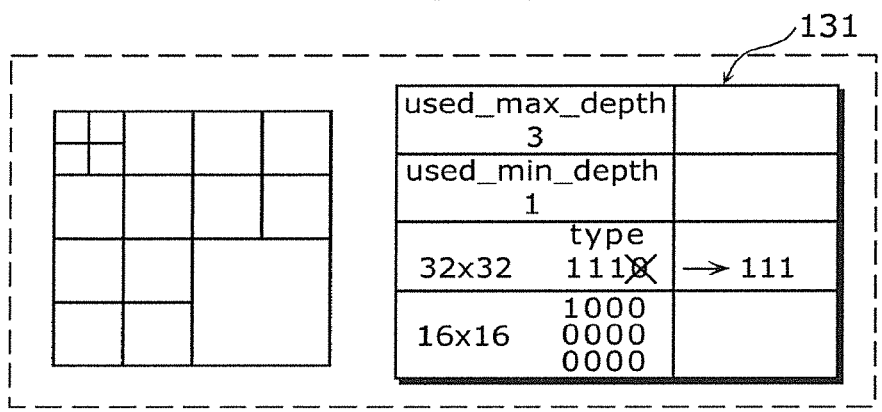
FIG. 15C is a schematic view illustrating the method according to the embodiment 5 of the present invention to reduce an amount of redundant partition information.

FIG. 15A to FIG. 15C are schematic views illustrating that more partition information can be reduced. For example, in the example of the block shape shown in FIG. 15A, the maximum used hierarchy depth is 2 and the partition mode information on Depth=1 (horizontal 32 pixels×vertical 32 pixels blocks) is (0, 0, 0, 1) as described above. Herein, since the maximum used hierarchy depth is 2, at least one partitioned block is considered included in blocks at Depth=1 (horizontal 32 pixels×vertical 32 pixels blocks).

Thus, once the partition mode information (0, 0, 0) has been described, the partition information on blocks at Depth=1 is encoded and decoded, without the partition mode information, which is 1, being described. Thus, it can be found that the last partition mode information is 1. In other words, when the current hierarchy depth is shallower than the maximum used hierarchy depth and only the last block is to be partitioned in coding order (partitioning processing order), the partition information description unit 112 generates the partition information 131 that does not include the partition mode information on the last block.

As described above, when the partition information description unit 112 can define for each block, using the maximum used hierarchy depth, whether the block is to be further partitioned, the partition information description unit 112 removes information on the partitioning pattern of the block from the partition information 130. Then, the variable-length coding unit 109 codes the partition information 131 from which the above information has been removed. The processing can reduce a greater amount of coding.

Likewise, in the example of the block shape shown in FIG. 15B, the maximum used hierarchy depth is 3 and the minimum used hierarchy depth is 1, and the partition mode information on blocks at Depth=1 (horizontal 32 pixels×vertical 32 pixels blocks) and Depth=2 (horizontal 16 pixels×vertical 16 pixels blocks) are both (0, 0, 0, 1). As described above, the partition information can be decoded even if the partition information is (0, 0, 0). Thus, the partition information that is 1 may not be coded. This obviates the need of coding two pieces of the partition mode information, and can further enhance the coding efficiency.

Likewise, in the example of the block shape shown in FIG. 15C, the maximum used hierarchy depth is 3 and the minimum used hierarchy depth is 1. Since it has been found that the minimum used hierarchy depth is 1, it is considered that at least one block at Depth=1 (horizontal 32 pixels×vertical 32 pixels blocks) is not to be partitioned. Thus, it is found that the last block in the partition mode information (1, 1, 1, 0) on the blocks at Depth=1 (horizontal 32 pixels×vertical 32 pixels blocks) is 0. Thus, as in FIG. 15A and FIG. 15B, the information may not be coded. In other words, when the current hierarchy depth is the minimum used hierarchy depth and only the last block in coding order (partitioning processing order) is not to be partitioned, the partition information description unit 112 generates the partition information 131 that does not include the partition mode information on the last block.

As described above, if the partition information description unit 112 can define for each block, using the minimum used hierarchy depth, whether the block is to be further partitioned, the partition information description unit 112 removes the information indicative of the partitioning pattern of the block from the partition information 130. Then, the variable-length coding unit 109 variable-length codes the partition information 131 from which the above information has been removed. This can enhance the coding efficiency.

Embodiment 6

The processing described in each of embodiments can be simply implemented in an independent computer system, by recording, in a recording medium, a program for implementing the configurations of the moving picture coding method (image coding method) and the moving picture decoding method (image decoding method) described in each of embodiments. The recording media may be any recording media as long as the program can be recorded, such as a magnetic disk, an optical disk, a magnetic optical disk, an IC card, and a semiconductor memory.

Hereinafter, the applications to the moving picture coding method (image coding method) and the moving picture decoding method (image decoding method) described in each of embodiments and systems using thereof will be described. The system has a feature of having an image coding and decoding apparatus that includes an image coding apparatus using the image coding method and an image decoding apparatus using the image decoding method. Other configurations in the system can be changed as appropriate depending on the cases.

Figure 16:
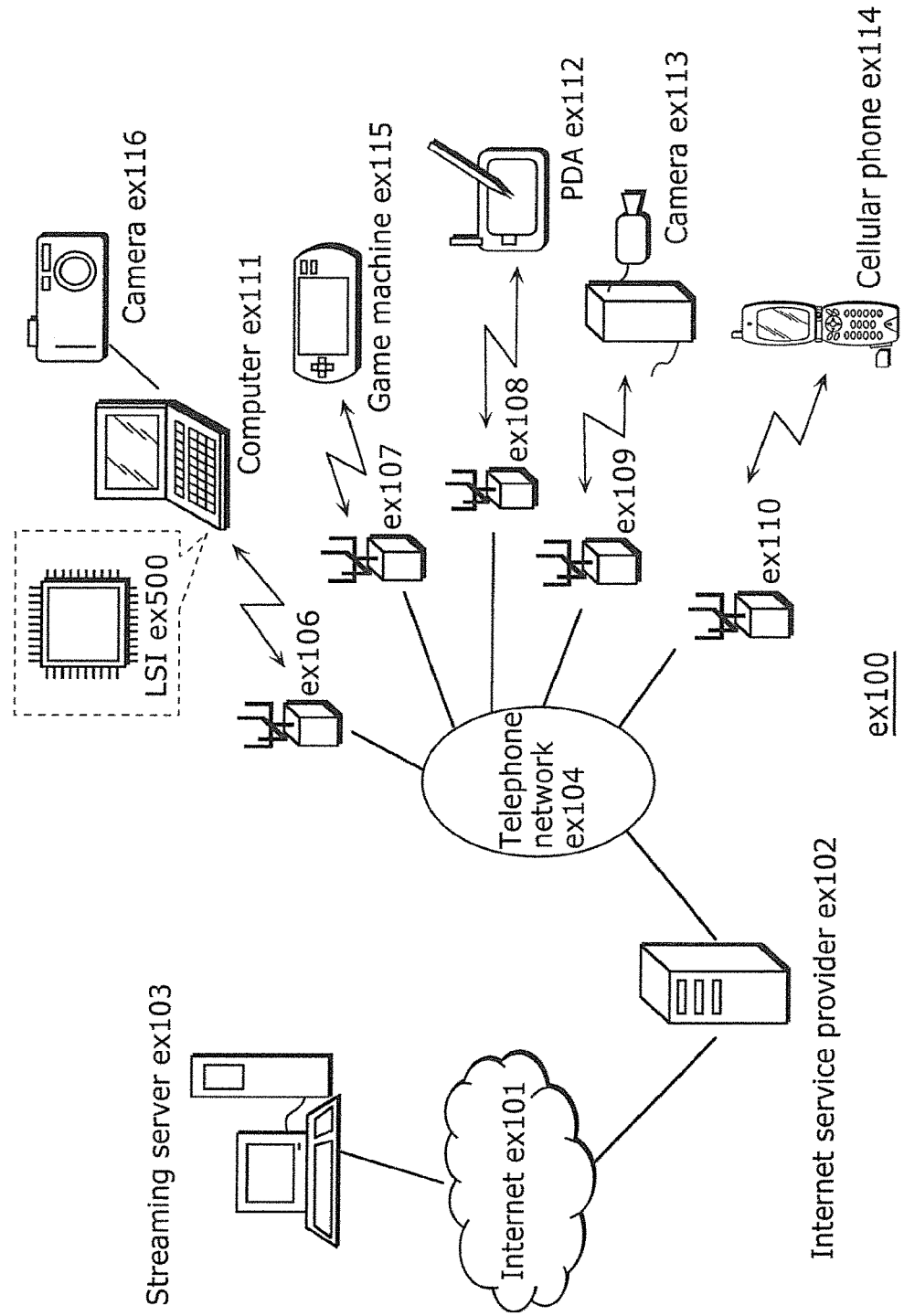
FIG. 16 shows an overall configuration of a content providing system for implementing content distribution services.

FIG. 16 illustrates an overall configuration of a content providing system ex100 for implementing content distribution services. The area for providing communication services is divided into cells of desired size, and base stations ex106, ex107, ex108, ex109, and ex110 which are fixed wireless stations are placed in each of the cells.

The content providing system ex100 is connected to devices, such as a computer ex111, a personal digital assistant (PDA) ex112, a camera ex113, a cellular phone ex114 and a game machine ex115, via the Internet ex101, an Internet service provider ex102, a telephone network ex104, as well as the base stations ex106 to ex110, respectively.

However, the configuration of the content providing system ex100 is not limited to the configuration shown in FIG. 16, and a combination in which any of the elements are connected is acceptable. In addition, each device may be directly connected to the telephone network ex104, rather than via the base stations ex106 to ex110 which are the fixed wireless stations. Furthermore, the devices may be interconnected to each other via a short distance wireless communication and others.

The camera ex113, such as a digital video camera, is capable of capturing video. A camera ex116, such as a digital camera, is capable of capturing both still images and video. Furthermore, the cellular phone ex114 may be the one that meets any of the standards such as Global System for Mobile Communications (GSM) (registered trademark), Code Division Multiple Access (CDMA), Wideband-Code Division Multiple Access (W-CDMA), Long Term Evolution (LTE), and High Speed Packet Access (HSPA). Alternatively, the cellular phone ex114 may be a Personal Handyphone System (PHS).

In the content providing system ex100, a streaming server ex103 is connected to the camera ex113 and others via the telephone network ex104 and the base station ex109, which enables distribution of images of a live show and others. In such a distribution, a content (for example, video of a music live show) captured by the user using the camera ex113 is coded as described above in each of embodiments (i.e., the camera functions as the image coding apparatus according to the present invention), and the coded content is transmitted to the streaming server ex103. On the other hand, the streaming server ex103 carries out stream distribution of the transmitted content data to the clients upon their requests. The clients include the computer ex111, the PDA ex112, the camera ex113, the cellular phone ex114, and the game machine ex115 that are capable of decoding the above-mentioned coded data. Each of the devices that have received the distributed data decodes and reproduces the coded data (i.e., functions as the image decoding apparatus according to the present invention).

The captured data may be coded by the camera ex113 or the streaming server ex103 that transmits the data, or the coding processes may be shared between the camera ex113 and the streaming server ex103. Similarly, the distributed data may be decoded by the clients or the streaming server ex103, or the decoding processes may be shared between the clients and the streaming server ex103. Furthermore, the data of the still images and video captured by not only the camera ex113 but also the camera ex116 may be transmitted to the streaming server ex103 through the computer ex111. The coding processes may be performed by the camera ex116, the computer ex111, or the streaming server ex103, or shared among them.

Furthermore, the coding and decoding processes may be performed by an LSI ex500 generally included in each of the computer ex111 and the devices. The LSI ex500 may be configured of a single chip or a plurality of chips. Software for encoding and decoding video may be integrated into some type of a recording medium (such as a CD-ROM, a flexible disk, and a hard disk) that is readable by the computer ex111 and others, and the coding and decoding processes may be performed using the software. Furthermore, when the cellular phone ex114 is equipped with a camera, the video data obtained by the camera may be transmitted. The video data is data coded by the LSI ex500 included in the cellular phone ex114.

Furthermore, the streaming server ex103 may be composed of servers and computers, and may decentralize data and process the decentralized data, record, or distribute data.

As described above, the clients may receive and reproduce the coded data in the content providing system ex100. In other words, the clients can receive and decode information transmitted by the user, and reproduce the decoded data in real time in the content providing system ex100, so that the user who does not have any particular right and equipment can implement personal broadcasting.

Figure 17:
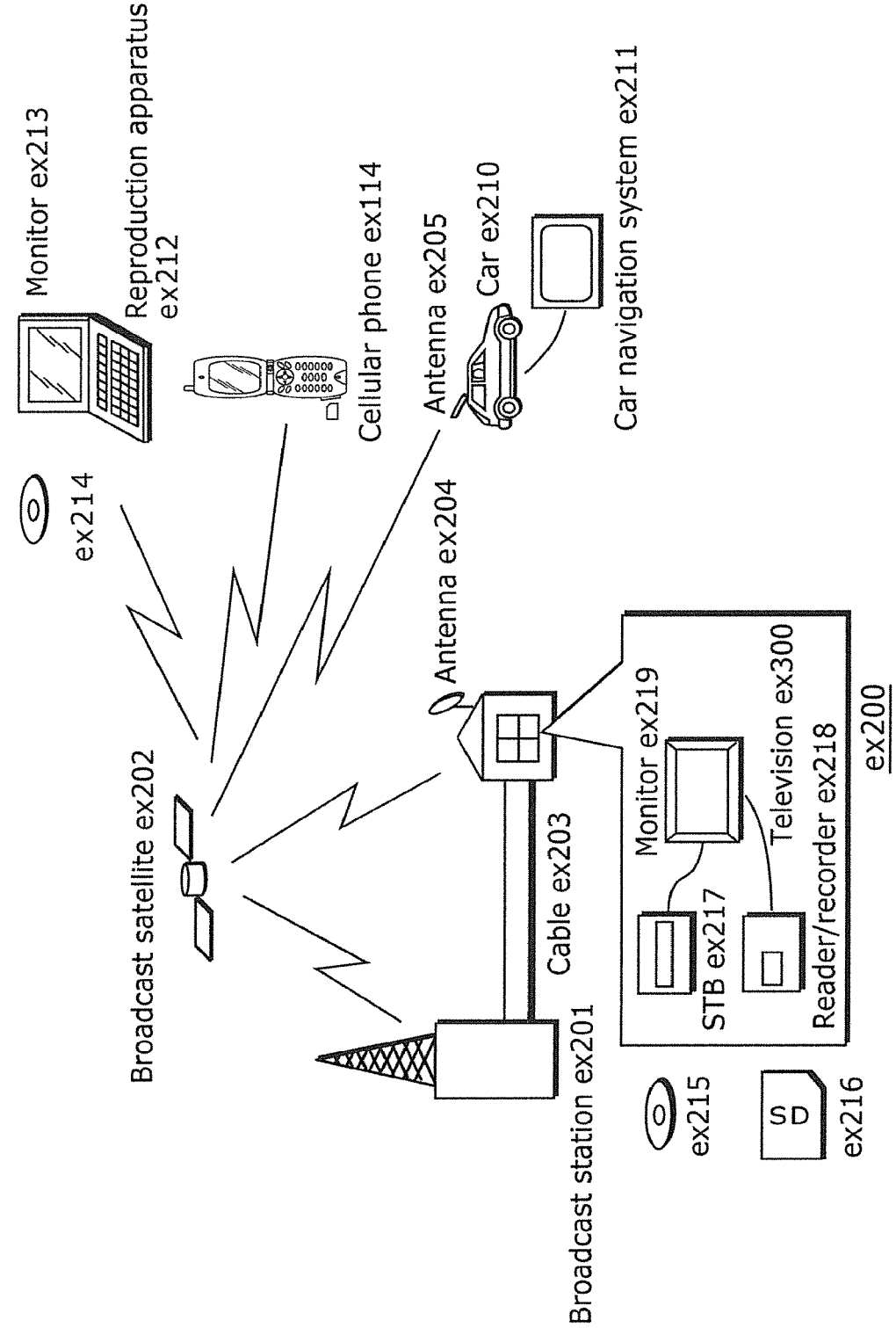
FIG. 17 shows an overall configuration of a digital broadcasting system.

Aside from the example of the content providing system ex100, at least one of the moving picture coding apparatus (image coding apparatus) and the moving picture decoding apparatus (image decoding apparatus) described in each of embodiments may be implemented in a digital broadcasting system ex200 illustrated in FIG. 17. More specifically, a broadcast station ex201 communicates or transmits, via radio waves to a broadcast satellite ex202, multiplexed data obtained by multiplexing audio data and others onto video data. The video data is data coded by the moving picture coding method described in each of embodiments (i.e., data coded by the image coding apparatus according to the present invention). Upon receipt of the multiplexed data, the broadcast satellite ex202 transmits radio waves for broadcasting. Then, a home-use antenna ex204 with a satellite broadcast reception function receives the radio waves. Next, a device such as a television (receiver) ex300 and a set top box (STB) ex217 decodes the received multiplexed data, and reproduces the decoded data (i.e., functions as the image decoding apparatus according to the present invention).

Furthermore, a reader/recorder ex218 (*i*) reads and decodes the multiplexed data recorded on a recording medium ex215 (ex216), such as a DVD and a BD (such as an SD card), or (i) codes video signals in the recording medium ex215 (ex216), and in some cases, writes data obtained by multiplexing an audio signal on the coded data. The reader/recorder ex218 can include the moving picture decoding apparatus or the moving picture coding apparatus as shown in each of embodiments. In this case, the reproduced video signals are displayed on the monitor ex219, and can be reproduced by another device or system using the recording medium ex215 (ex216) on which the multiplexed data is recorded. It is also possible to implement the moving picture decoding apparatus in the set top box ex217 connected to the cable ex203 for a cable television or to the antenna ex204 for satellite and/or terrestrial broadcasting, so as to display the video signals on the monitor ex219 of the television ex300. The moving picture decoding apparatus may be implemented not in the set top box but in the television ex300.

Figure 18:
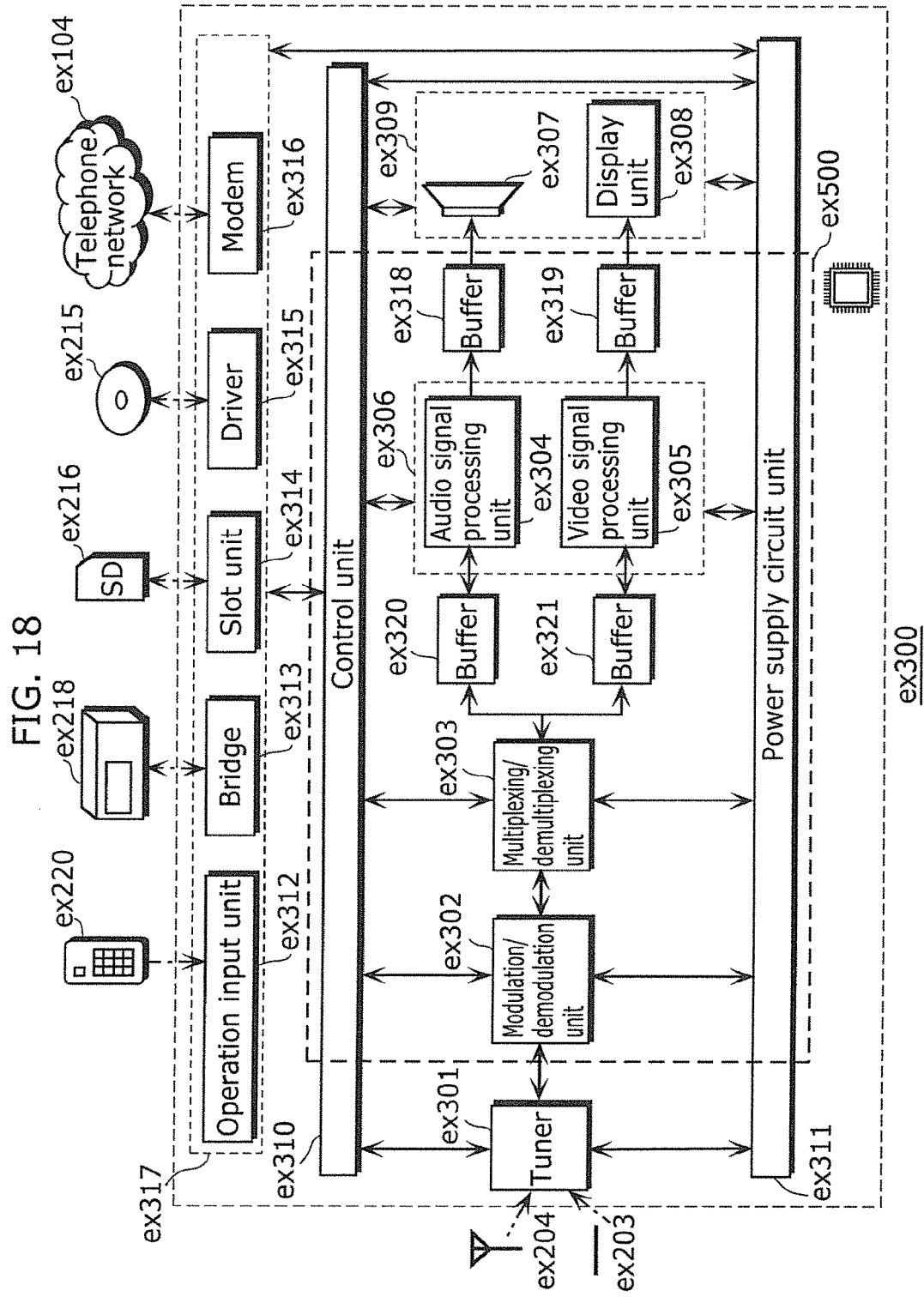
FIG. 18 shows a block diagram illustrating an example of a configuration of a television.

FIG. 18 illustrates the television (receiver) ex300 that uses the moving picture coding method and the moving picture decoding method described in each of embodiments. The television ex300 includes: a tuner ex301 that obtains or provides multiplexed data obtained by multiplexing audio data onto video data, through the antenna ex204 or the cable ex203, etc. that receives a broadcast; a modulation/demodulation unit ex302 that demodulates the received multiplexed data or modulates data into multiplexed data to be supplied outside; and a multiplexing/demultiplexing unit ex303 that demultiplexes the modulated multiplexed data into video data and audio data, or multiplexes video data and audio data coded by a signal processing unit ex306 into data.

The television ex300 further includes: a signal processing unit ex306 including an audio signal processing unit ex304 and a video signal processing unit ex305 that decode audio data and video data and code audio data and video data, respectively (which function as the image coding apparatus and the image decoding apparatus according to the present invention); and an output unit ex309 including a speaker ex307 that provides the decoded audio signal, and a display unit ex308 that displays the decoded video signal, such as a display. Furthermore, the television ex300 includes an interface unit ex317 including an operation input unit ex312 that receives an input of a user operation. Furthermore, the television ex300 includes a control unit ex310 that controls overall each constituent element of the television ex300, and a power supply circuit unit ex311 that supplies power to each of the elements. Other than the operation input unit ex312, the interface unit ex317 may include: a bridge ex313 that is connected to an external device, such as the reader/recorder ex218; a slot unit ex314 for enabling attachment of the recording medium ex216, such as an SD card; a driver ex315 to be connected to an external recording medium ex215, such as a hard disk; and a modem ex316 to be connected to a telephone network. Here, the recording medium ex216 can electrically record information using a non-volatile/volatile semiconductor memory element for storage. The constituent elements of the television ex300 are connected to each other through a synchronous bus.

First, the configuration in which the television ex300 decodes multiplexed data obtained from outside through the antenna ex204 and others and reproduces the decoded data will be described. In the television ex300, upon a user operation through a remote controller ex220 and others, the multiplexing/demultiplexing unit ex303 demultiplexes the multiplexed data demodulated by the modulation/demodulation unit ex302, under control of the control unit ex310 including a CPU. Furthermore, the audio signal processing unit ex304 decodes the demultiplexed audio data, and the video signal processing unit ex305 decodes the demultiplexed video data, using the decoding method described in each of embodiments, in the television ex300. The output unit ex309 provides the decoded video signal and audio signal outside, respectively. When the output unit ex309 provides the video signal and the audio signal, the signals may be temporarily stored in buffers ex318 and ex319, and others so that the signals are reproduced in synchronization with each other. Furthermore, the television ex300 may read multiplexed data not through a broadcast and others but from the recording media ex215 and ex216, such as a magnetic disk, an optical disk, and a SD card. Next, a configuration in which the television ex300 codes an audio signal and a video signal, and transmits the data outside or writes the data on a recording medium will be described. In the television ex300, upon a user operation through the remote controller ex220 and others, the audio signal processing unit ex304 codes an audio signal, and the video signal processing unit ex305 codes a video signal, under control of the control unit ex310 using the coding method described in each of embodiments. The multiplexing/demultiplexing unit ex303 multiplexes the coded video signal and audio signal, and provides the resulting signal outside. When the multiplexing/demultiplexing unit ex303 multiplexes the video signal and the audio signal, the signals may be temporarily stored in the buffers ex320 and ex321, and others so that the signals are reproduced in synchronization with each other. Here, the buffers ex318, ex319, ex320, and ex321 may be plural as illustrated, or at least one buffer may be shared in the television ex300. Furthermore, data may be stored in a buffer so that the system overflow and underflow may be avoided between the modulation/demodulation unit ex302 and the multiplexing/demultiplexing unit ex303, for example.

Furthermore, the television ex300 may include a configuration for receiving an AV input from a microphone or a camera other than the configuration for obtaining audio and video data from a broadcast or a recording medium, and may code the obtained data. Although the television ex300 can code, multiplex, and provide outside data in the description, it may be capable of only receiving, decoding, and providing outside data but not the coding, multiplexing, and providing outside data.

Furthermore, when the reader/recorder ex218 reads or writes multiplexed data from or on a recording medium, one of the television ex300 and the reader/recorder ex218 may decode or encode the multiplexed data, and the television ex300 and the reader/recorder ex218 may share the decoding or encoding.

Figure 19:
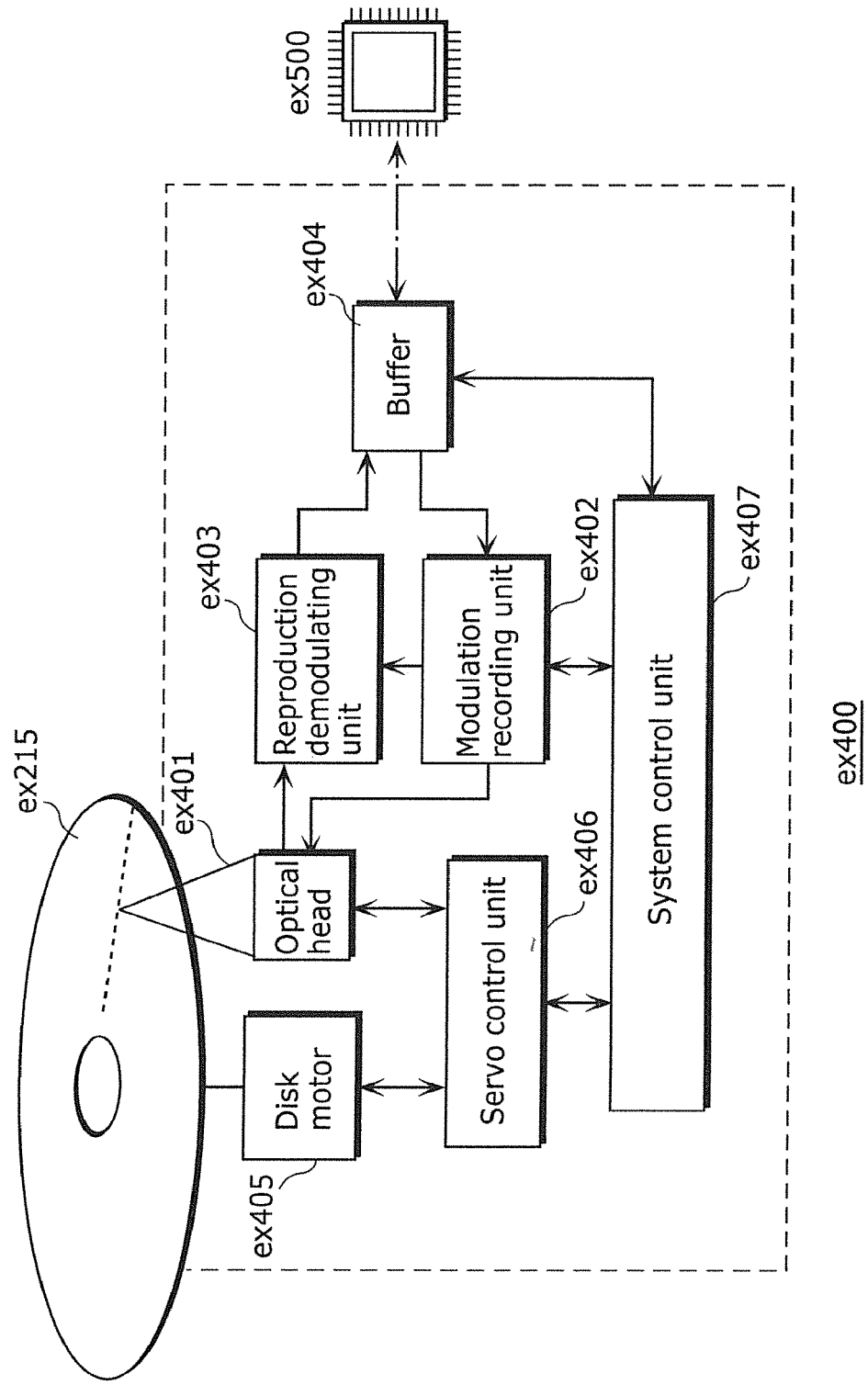
FIG. 19 shows a block diagram illustrating an example of a configuration of an information reproducing/recording unit that reads and writes information from and on a recording medium that is an optical disk.

As an example, FIG. 19 illustrates a configuration of an information reproducing/recording unit ex400 when data is read or written from or on an optical disk. The information reproducing/recording unit ex400 includes constituent elements ex401, ex402, ex403, ex404, ex405, ex406, and ex407 to be described hereinafter. The optical head ex401 irradiates a laser spot in a recording surface of the recording medium ex215 that is an optical disk to write information, and detects reflected light from the recording surface of the recording medium ex215 to read the information. The modulation recording unit ex402 electrically drives a semiconductor laser included in the optical head ex401, and modulates the laser light according to recorded data. The reproduction demodulating unit ex403 amplifies a reproduction signal obtained by electrically detecting the reflected light from the recording surface using a photo detector included in the optical head ex401, and demodulates the reproduction signal by separating a signal component recorded on the recording medium ex215 to reproduce the necessary information. The buffer ex404 temporarily holds the information to be recorded on the recording medium ex215 and the information reproduced from the recording medium ex215. The disk motor ex405 rotates the recording medium ex215. The servo control unit ex406 moves the optical head ex401 to a predetermined information track while controlling the rotation drive of the disk motor ex405 so as to follow the laser spot. The system control unit ex407 controls overall the information reproducing/recording unit ex400. The reading and writing processes can be implemented by the system control unit ex407 using various information stored in the buffer ex404 and generating and adding new information as necessary, and by the modulation recording unit ex402, the reproduction demodulating unit ex403, and the servo control unit ex406 that record and reproduce information through the optical head ex401 while being operated in a coordinated manner. The system control unit ex407 includes, for example, a microprocessor, and executes processing by causing a computer to execute a program for read and write.

Although the optical head ex401 irradiates a laser spot in the description, it may perform high-density recording using near field light.

Figure 20:
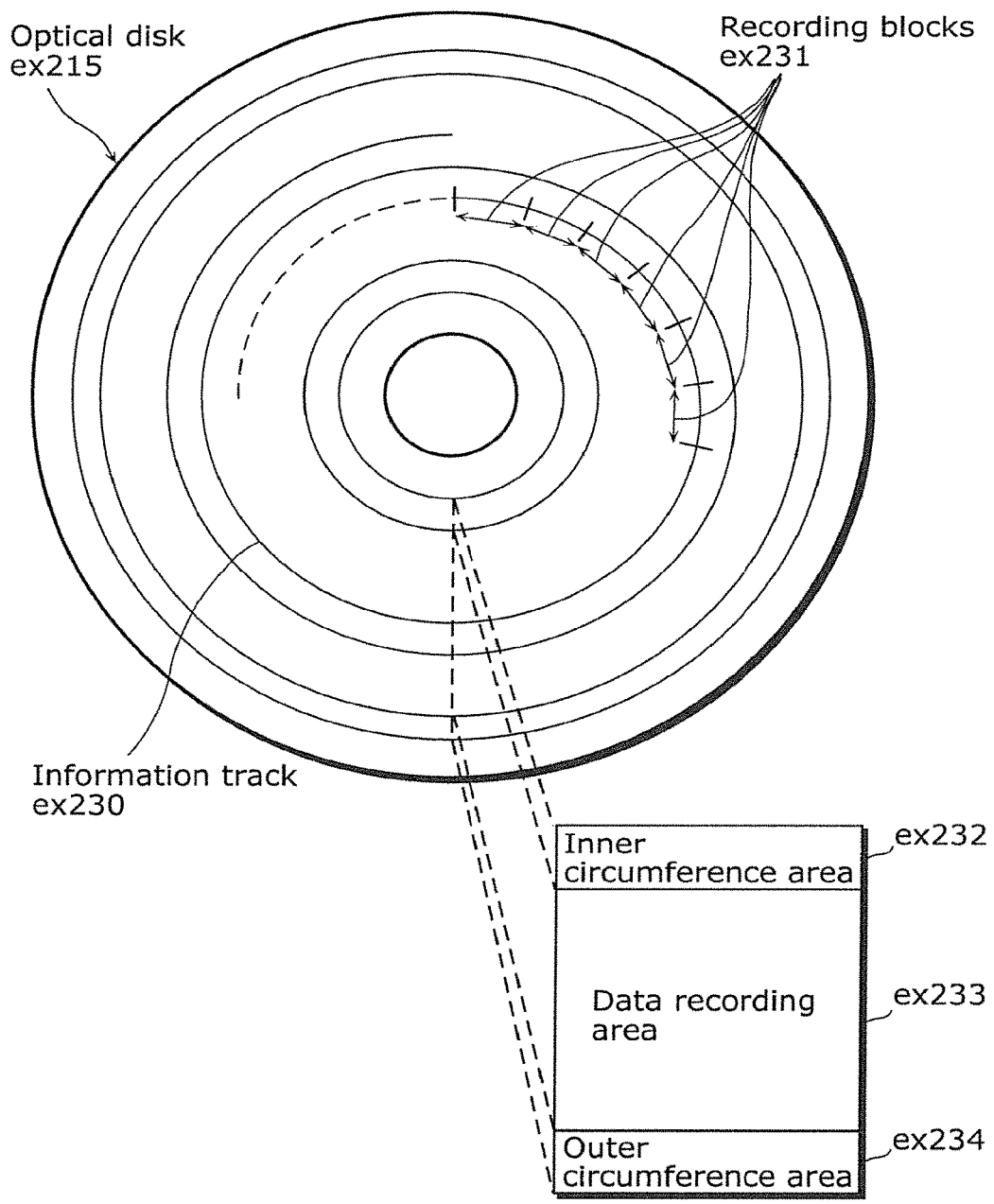
FIG. 20 shows an example of a configuration of a recording medium that is an optical disk.

FIG. 20 illustrates the recording medium ex215 that is the optical disk. On the recording surface of the recording medium ex215, guide grooves are spirally formed, and an information track ex230 records, in advance, address information indicating an absolute position on the disk according to change in a shape of the guide grooves. The address information includes information for determining positions of recording blocks ex231 that are a unit for recording data. Reproducing the information track ex230 and reading the address information in an apparatus that records and reproduces data can lead to determination of the positions of the recording blocks. Furthermore, the recording medium ex215 includes a data recording area ex233, an inner circumference area ex232, and an outer circumference area ex234. The data recording area ex233 is an area for use in recording the user data. The inner circumference area ex232 and the outer circumference area ex234 that are inside and outside of the data recording area ex233, respectively are for specific use except for recording the user data. The information reproducing/recording unit 400 reads and writes coded audio, coded video data, or multiplexed data obtained by multiplexing the coded audio and video data, from and on the data recording area ex233 of the recording medium ex215.

Although an optical disk having a layer, such as a DVD and a BD is described as an example in the description, the optical disk is not limited to such, and may be an optical disk having a multilayer structure and capable of being recorded on a part other than the surface. Furthermore, the optical disk may have a structure for multidimensional recording/reproduction, such as recording of information using light of colors with different wavelengths in the same portion of the optical disk and for recording information having different layers from various angles.

Furthermore, a car ex210 having an antenna ex205 can receive data from the satellite ex202 and others, and reproduce video on a display device such as a car navigation system ex211 set in the car ex210, in the digital broadcasting system ex200. Here, a configuration of the car navigation system ex211 will be a configuration, for example, including a GPS receiving unit from the configuration illustrated in FIG. 18. The same will be true for the configuration of the computer ex111, the cellular phone ex114, and others.

Figure 21A:
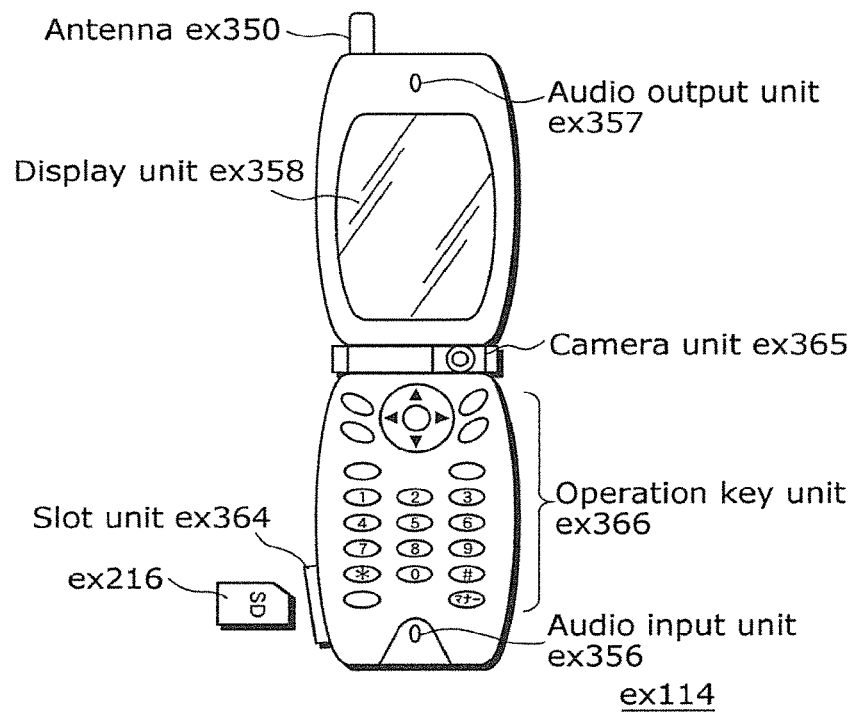
FIG. 21A shows an example of a cellular phone.

FIG. 21A illustrates the cellular phone ex114 that uses the moving picture coding method and the moving picture decoding method described in embodiments. The cellular phone ex114 includes: an antenna ex350 for transmitting and receiving radio waves through the base station ex110; a camera unit ex365 capable of capturing moving and still images; and a display unit ex358 such as a liquid crystal display for displaying the data such as decoded video captured by the camera unit ex365 or received by the antenna ex350. The cellular phone ex114 further includes: a main body unit including an operation key unit ex366; an audio output unit ex357 such as a speaker for output of audio; an audio input unit ex356 such as a microphone for input of audio; a memory unit ex367 for storing captured video or still pictures, recorded audio, encoded or decoded data of the received video, the still pictures, e-mails, or others; and a slot unit ex364 that is an interface unit for a recording medium ex216, such as an SD card, that stores data in the same manner as the memory unit ex367.

Figure 21B:
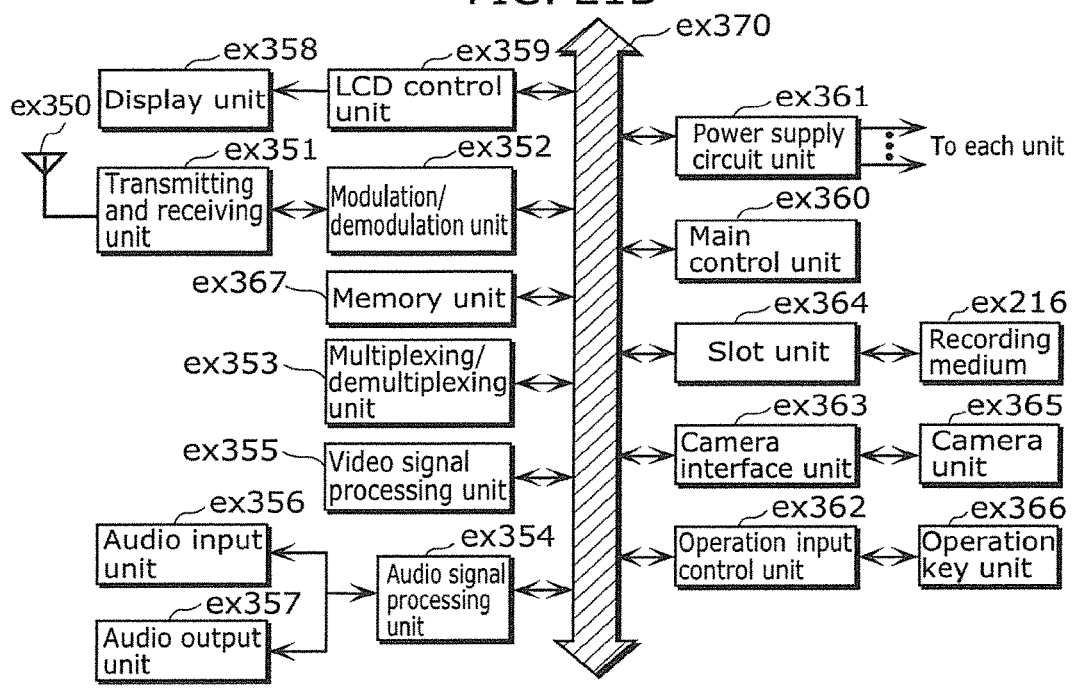
FIG. 21B is a block diagram showing an example of a configuration of a cellular phone.

Next, an example of a configuration of the cellular phone ex114 will be described with reference to FIG. 21B. In the cellular phone ex114, a main control unit ex360 designed to control overall each unit of the main body including the display unit ex358 as well as the operation key unit ex366 is connected mutually, via a synchronous bus ex370, to a power supply circuit unit ex361, an operation input control unit ex362, a video signal processing unit ex355, a camera interface unit ex363, a liquid crystal display (LCD) control unit ex359, a modulation/demodulation unit ex352, a multiplexing/demultiplexing unit ex353, an audio signal processing unit ex354, the slot unit ex364, and the memory unit ex367.

When a call-end key or a power key is turned ON by a user's operation, the power supply circuit unit ex361 supplies the respective units with power from a battery pack so as to activate the cell phone ex114.

In the cellular phone ex114, the audio signal processing unit ex354 converts the audio signals collected by the audio input unit ex356 in voice conversation mode into digital audio signals under the control of the main control unit ex360 including a CPU, ROM, and RAM. Then, the modulation/demodulation unit ex352 performs spread spectrum processing on the digital audio signals, and the transmitting and receiving unit ex351 performs digital-to-analog conversion and frequency conversion on the data, so as to transmit the resulting data via the antenna ex350. Also, in the cellular phone ex114, the transmitting and receiving unit ex351 amplifies the data received by the antenna ex350 in voice conversation mode and performs frequency conversion and the analog-to-digital conversion on the data. Then, the modulation/demodulation unit ex352 performs inverse spread spectrum processing on the data, and the audio signal processing unit ex354 converts it into analog audio signals, so as to output them via the audio output unit ex357.

Furthermore, when an e-mail in data communication mode is transmitted, text data of the e-mail inputted by operating the operation key unit ex366 and others of the main body is sent out to the main control unit ex360 via the operation input control unit ex362. The main control unit ex360 causes the modulation/demodulation unit ex352 to perform spread spectrum processing on the text data, and the transmitting and receiving unit ex351 performs the digital-to-analog conversion and the frequency conversion on the resulting data to transmit the data to the base station ex110 via the antenna ex350. When an e-mail is received, processing that is approximately inverse to the processing for transmitting an e-mail is performed on the received data, and the resulting data is provided to the display unit ex358.

When video, still images, or video and audio in data communication mode is or are transmitted, the video signal processing unit ex355 compresses and codes video signals supplied from the camera unit ex365 using the moving picture coding method shown in each of embodiments (i.e., functions as the image coding apparatus according to the present invention), and transmits the coded video data to the multiplexing/demultiplexing unit ex353. In contrast, during when the camera unit ex365 captures video, still images, and others, the audio signal processing unit ex354 codes audio signals collected by the audio input unit ex356, and transmits the coded audio data to the multiplexing/demultiplexing unit ex353.

The multiplexing/demultiplexing unit ex353 multiplexes the coded video data supplied from the video signal processing unit ex355 and the coded audio data supplied from the audio signal processing unit ex354, using a predetermined method. Then, the modulation/demodulation unit (modulation/demodulation circuit unit) ex352 performs spread spectrum processing on the multiplexed data, and the transmitting and receiving unit ex351 performs digital-to-analog conversion and frequency conversion on the data so as to transmit the resulting data via the antenna ex350.

When receiving data of a video file which is linked to a Web page and others in data communication mode or when receiving an e-mail with video and/or audio attached, in order to decode the multiplexed data received via the antenna ex350, the multiplexing/demultiplexing unit ex353 demultiplexes the multiplexed data into a video data bit stream and an audio data bit stream, and supplies the video signal processing unit ex355 with the coded video data and the audio signal processing unit ex354 with the coded audio data, through the synchronous bus ex370. The video signal processing unit ex355 decodes the video signal using a moving picture decoding method corresponding to the moving picture coding method shown in each of embodiments (i.e., functions as the image decoding apparatus according to the present invention), and then the display unit ex358 displays, for instance, the video and still images included in the video file linked to the Web page via the LCD control unit ex359. Furthermore, the audio signal processing unit ex354 decodes the audio signal, and the audio output unit ex357 provides the audio.

Furthermore, similarly to the television ex300, a terminal such as the cellular phone ex114 probably have 3 types of implementation configurations including not only (i) a transmitting and receiving terminal including both a coding apparatus and a decoding apparatus, but also (ii) a transmitting terminal including only a coding apparatus and (iii) a receiving terminal including only a decoding apparatus. Although the digital broadcasting system ex200 receives and transmits the multiplexed data obtained by multiplexing audio data onto video data in the description, the multiplexed data may be data obtained by multiplexing not audio data but character data related to video onto video data, and may be not multiplexed data but video data itself.

As such, the moving picture coding method and the moving picture decoding method in each of embodiments can be used in any of the devices and systems described. Thus, the advantages described in each of embodiments can be obtained.

Furthermore, the present invention is not limited to embodiments, and various modifications and revisions are possible without departing from the scope of the present invention.

Embodiment 7

Video data can be generated by switching, as necessary, between (i) the moving picture coding method or the moving picture coding apparatus shown in each of embodiments and (ii) a moving picture coding method or a moving picture coding apparatus in conformity with a different standard, such as MPEG-2, MPEG-4 AVC, and VC-1.

Here, when a plurality of video data that conforms to the different standards is generated and is then decoded, the decoding methods need to be selected to conform to the different standards. However, since to which standard each of the plurality of the video data to be decoded conform cannot be detected, there is a problem that an appropriate decoding method cannot be selected.

In order to solve the problem, multiplexed data obtained by multiplexing audio data and others onto video data has a structure including identification information indicating to which standard the video data conforms. The specific structure of the multiplexed data including the video data generated in the moving picture coding method and by the moving picture coding apparatus shown in each of embodiments will be hereinafter described. The multiplexed data is a digital stream in the MPEG-2 Transport Stream format.

FIG. 22 illustrates a structure of the multiplexed data. As illustrated in FIG. 22, the multiplexed data can be obtained by multiplexing at least one of a video stream, an audio stream, a presentation graphics stream (PG), and an interactive graphics stream. The video stream represents primary video and secondary video of a movie, the audio stream (IG) represents a primary audio part and a secondary audio part to be mixed with the primary audio part, and the presentation graphics stream represents subtitles of the movie. Here, the primary video is normal video to be displayed on a screen, and the secondary video is video to be displayed on a smaller window in the primary video. Furthermore, the interactive graphics stream represents an interactive screen to be generated by arranging the GUI components on a screen. The video stream is coded in the moving picture coding method or by the moving picture coding apparatus shown in each of embodiments, or in a moving picture coding method or by a moving picture coding apparatus in conformity with a conventional standard, such as MPEG-2, MPEG-4 AVC, and VC-1. The audio stream is coded in accordance with a standard, such as Dolby-AC-3, Dolby Digital Plus, MLP, DTS, DTS-HD, and linear PCM.

Each stream included in the multiplexed data is identified by a packet identifier (PID). For example, 0x1011 is allocated to the video stream to be used for video of a movie, 0x1100 to 0x111F are allocated to the audio streams, 0x1200 to 0x121F are allocated to the presentation graphics streams, 0x1400 to 0x141F are allocated to the interactive graphics streams, 0x1B00 to 0x1B1F are allocated to the video streams to be used for secondary video of the movie, and 0x1A00 to 0x1A1F are allocated to the audio streams to be used for the secondary audio to be mixed with the primary audio.

Figure 23:
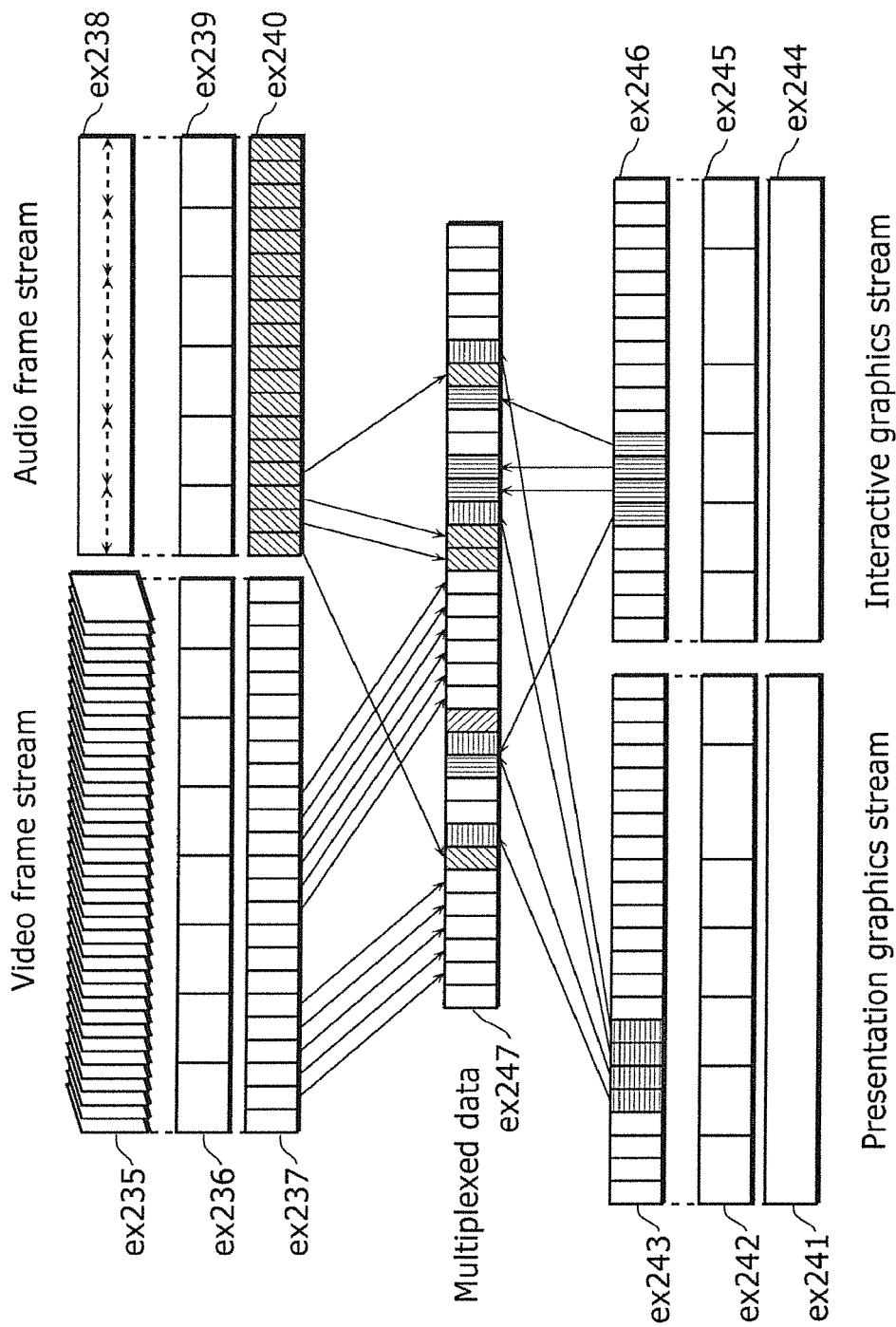
FIG. 23 schematically shows how each stream is multiplexed in multiplexed data.

FIG. 23 schematically illustrates how data is multiplexed. First, a video stream ex235 composed of video frames and an audio stream ex238 composed of audio frames are transformed into a stream of Packetized Element System (PES) packets ex236 and a stream of PES packets ex239, and further into Transport Stream (TS) packets ex237 and TS packets ex240, respectively. Similarly, data of a presentation graphics stream ex241 and data of an interactive graphics stream ex244 are transformed into a stream of PES packets ex242 and a stream of PES packets ex245, and further into TS packets ex243 and TS packets ex246, respectively. These TS packets are multiplexed into a stream to obtain multiplexed data ex247.

Figure 24:
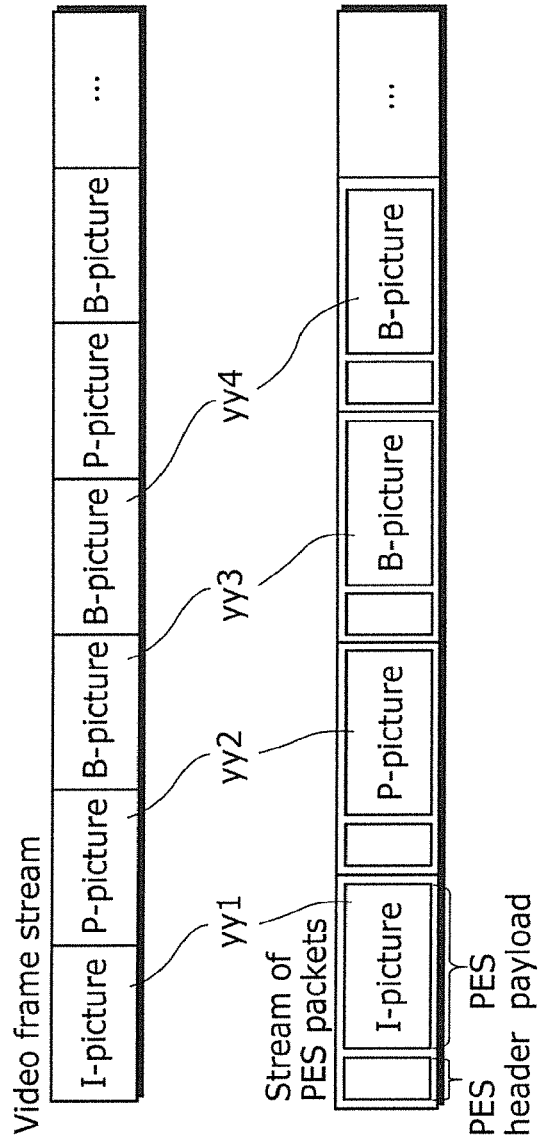
FIG. 24 shows how a video stream is stored in a stream of PES packets in more detail.

FIG. 24 illustrates how a video stream is stored in a stream of PES packets in more detail. The first bar in FIG. 24 shows a video frame stream in a video stream. The second bar shows the stream of PES packets. As indicated by arrows denoted as yy1, yy2, yy3, and yy4 in FIG. 24, the video stream is divided into pictures as I pictures, B pictures, and P pictures each of which is a video presentation unit, and the pictures are stored in a payload of each of the PES packets. Each of the PES packets has a PES header, and the PES header stores a Presentation Time-Stamp (PTS) indicating a display time of the picture, and a Decoding Time-Stamp (DTS) indicating a decoding time of the picture.

FIG. 25 illustrates a format of TS packets to be finally written on the multiplexed data. Each of the TS packets is a 188-byte fixed length packet including a 4-byte TS header having information, such as a PID for identifying a stream and a 184-byte TS payload for storing data. The PES packets are divided, and stored in the TS payloads, respectively. When a BD ROM is used, each of the TS packets is given a 4-byte TP_Extra_Header, thus resulting in 192-byte source packets. The source packets are written on the multiplexed data. The TP_Extra_Header stores information such as an Arrival_Time_Stamp (ATS). The ATS shows a transfer start time at which each of the TS packets is to be transferred to a PID filter. The source packets are arranged in the multiplexed data as shown at the bottom of FIG. 25. The numbers incrementing from the head of the multiplexed data are called source packet numbers (SPNs).

Each of the TS packets included in the multiplexed data includes not only streams of audio, video, subtitles and others, but also a Program Association Table (PAT), a Program Map Table (PMT), and a Program Clock Reference (PCR). The PAT shows what a PID in a PMT used in the multiplexed data indicates, and a PID of the PAT itself is registered as zero. The PMT stores PIDs of the streams of video, audio, subtitles and others included in the multiplexed data, and attribute information of the streams corresponding to the PIDs. The PMT also has various descriptors relating to the multiplexed data. The descriptors have information such as copy control information showing whether copying of the multiplexed data is permitted or not. The PCR stores STC time information corresponding to an ATS showing when the PCR packet is transferred to a decoder, in order to achieve synchronization between an Arrival Time Clock (ATC) that is a time axis of ATSs, and an System Time Clock (STC) that is a time axis of PTSs and DTSs.

Figure 26:
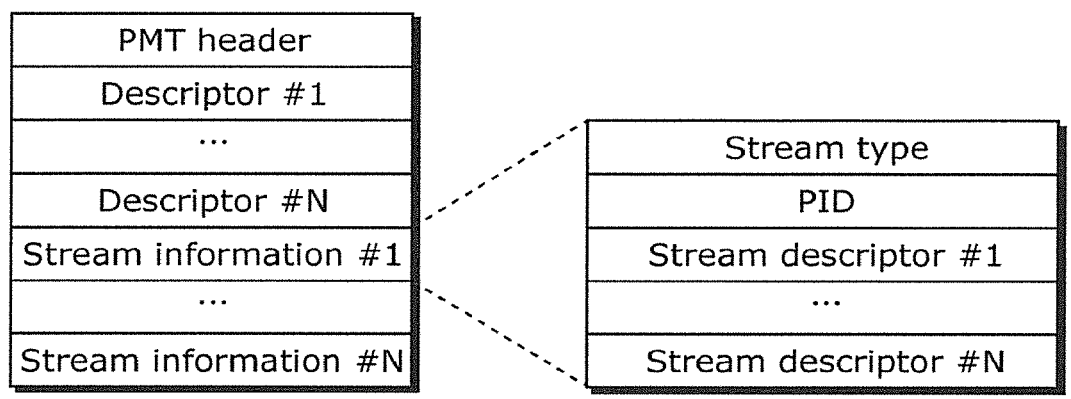
FIG. 26 shows a data structure of a PMT.

FIG. 26 illustrates the data structure of the PMT in detail. A PMT header is disposed at the top of the PMT. The PMT header describes the length of data included in the PMT and others. A plurality of descriptors relating to the multiplexed data is disposed after the PMT header. Information such as the copy control information is described in the descriptors. After the descriptors, a plurality of pieces of stream information relating to the streams included in the multiplexed data is disposed. Each piece of stream information includes stream descriptors each describing information, such as a stream type for identifying a compression codec of a stream, a stream PID, and stream attribute information (such as a frame rate or an aspect ratio). The stream descriptors are equal in number to the number of streams in the multiplexed data.

When the multiplexed data is recorded on a recording medium and others, it is recorded together with multiplexed data information files.

Figure 27:
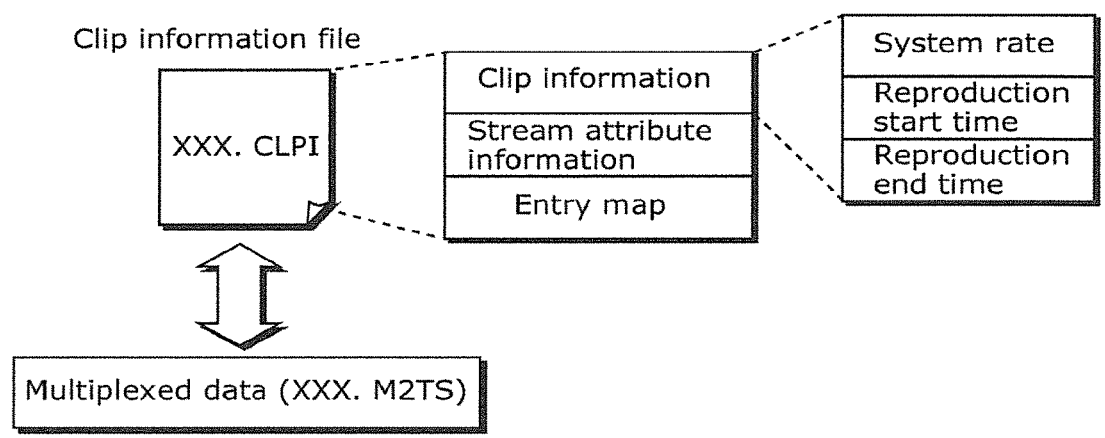
FIG. 27 shows an internal structure of multiplexed data information.

Each of the multiplexed data information files is management information of the multiplexed data as shown in FIG. 27. The multiplexed data information files are in one to one correspondence with the multiplexed data, and each of the files includes multiplexed data information, stream attribute information, and an entry map.

As illustrated in FIG. 27, the multiplexed data information includes a system rate, a reproduction start time, and a reproduction end time. The system rate indicates the maximum transfer rate at which a system target decoder to be described later transfers the multiplexed data to a PID filter. The intervals of the ATSs included in the multiplexed data are set to not higher than a system rate. The reproduction start time indicates a PTS in a video frame at the head of the multiplexed data. An interval of one frame is added to a PTS in a video frame at the end of the multiplexed data, and the PTS is set to the reproduction end time.

Figure 28:
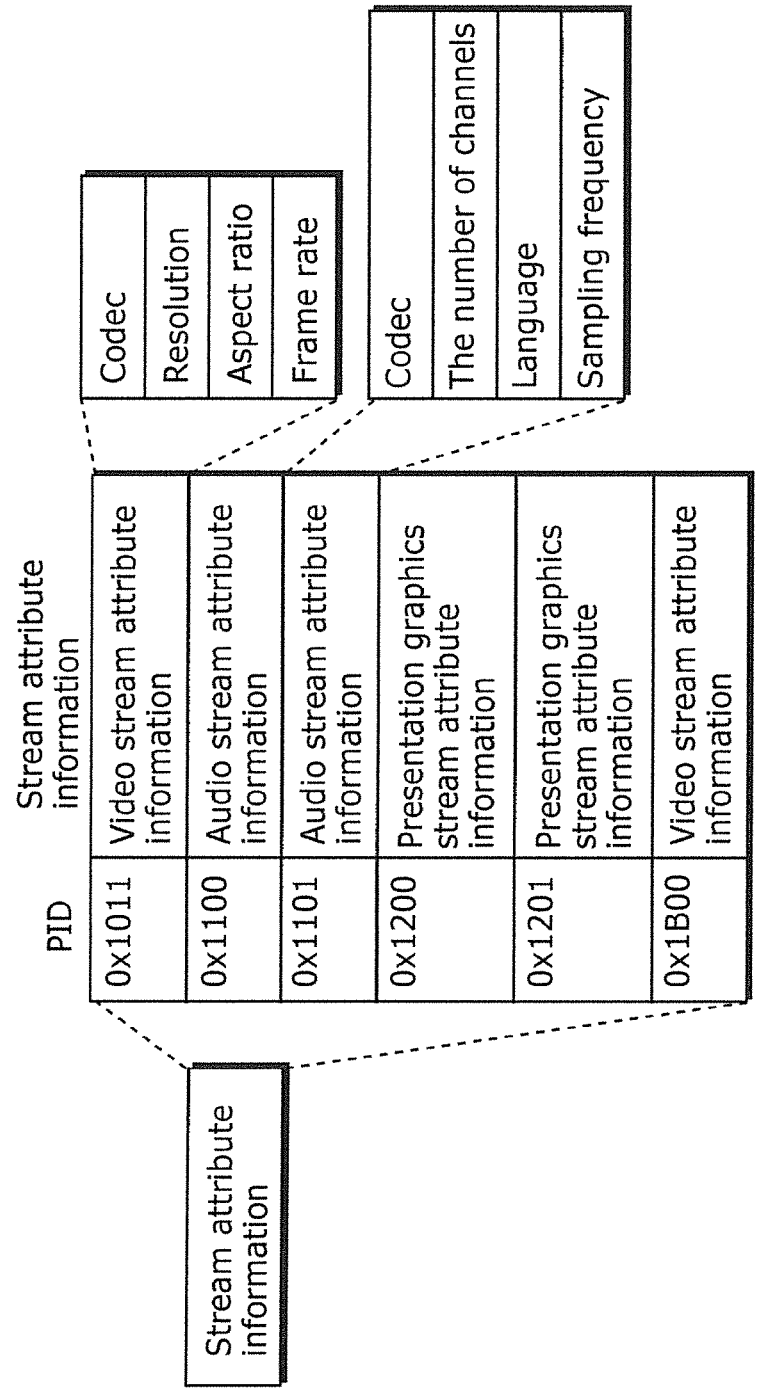
FIG. 28 shows an internal structure of stream attribute information.

As shown in FIG. 28, a piece of attribute information is registered in the stream attribute information, for each PID of each stream included in the multiplexed data. Each piece of attribute information has different information depending on whether the corresponding stream is a video stream, an audio stream, a presentation graphics stream, or an interactive graphics stream. Each piece of video stream attribute information carries information including what kind of compression codec is used for compressing the video stream, and the resolution, aspect ratio and frame rate of the pieces of picture data that is included in the video stream. Each piece of audio stream attribute information carries information including what kind of compression codec is used for compressing the audio stream, how many channels are included in the audio stream, which language the audio stream supports, and how high the sampling frequency is. The video stream attribute information and the audio stream attribute information are used for initialization of a decoder before the player plays back the information.

In the present embodiment, the multiplexed data to be used is of a stream type included in the PMT. Furthermore, when the multiplexed data is recorded on a recording medium, the video stream attribute information included in the multiplexed data information is used. More specifically, the moving picture coding method or the moving picture coding apparatus described in each of embodiments includes a step or a unit for allocating unique information indicating video data generated by the moving picture coding method or the moving picture coding apparatus in each of embodiments, to the stream type included in the PMT or the video stream attribute information. With the configuration, the video data generated by the moving picture coding method or the moving picture coding apparatus described in each of embodiments can be distinguished from video data that conforms to another standard.

Figure 29:
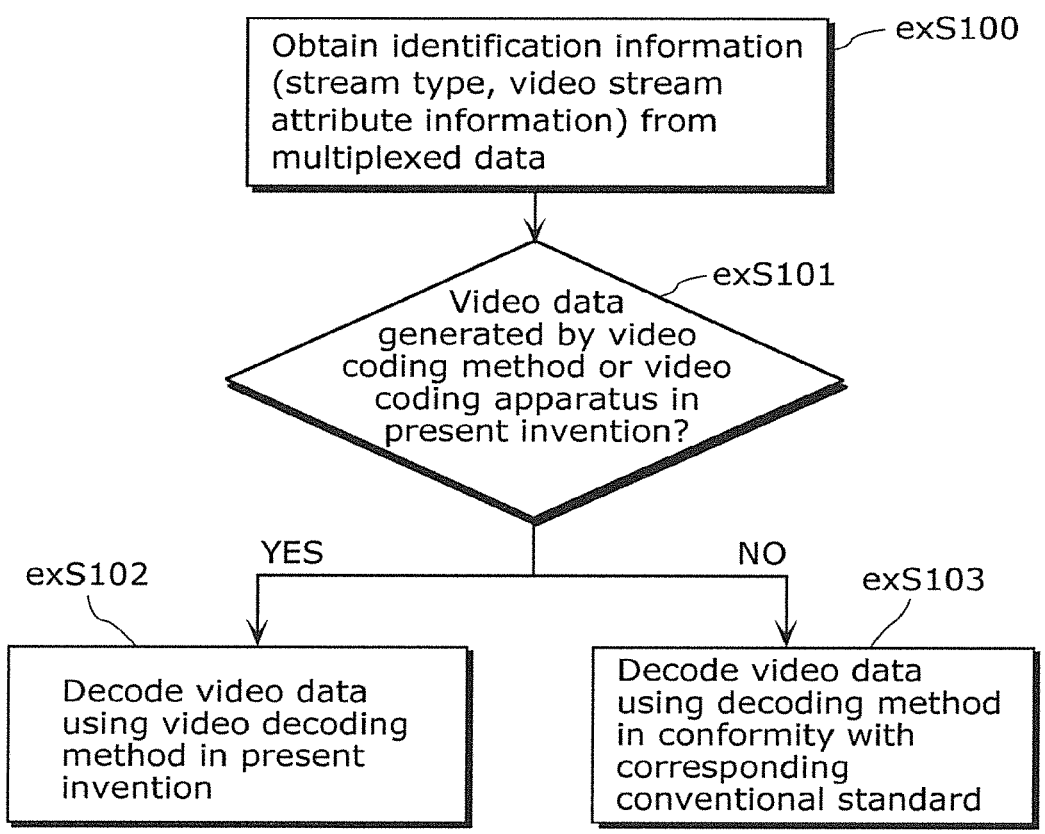
FIG. 29 shows steps for identifying video data.

Furthermore, FIG. 29 illustrates steps of the moving picture decoding method according to the present embodiment. In Step exS100, the stream type included in the PMT or the video stream attribute information included in the multiplexed data information is obtained from the multiplexed data. Next, in Step exS101, it is determined whether or not the stream type or the video stream attribute information indicates that the multiplexed data is generated by the moving picture coding method or the moving picture coding apparatus in each of embodiments. When it is determined that the stream type or the video stream attribute information indicates that the multiplexed data is generated by the moving picture coding method or the moving picture coding apparatus in each of embodiments ("YES" as a result of step exS101), in Step exS102, decoding is performed by the moving picture decoding method in each of embodiments. Furthermore, when the stream type or the video stream attribute information indicates conformance to the conventional standards ("NO" as a result of step exS101), such as MPEG-2, MPEG-4 AVC, and VC-1, in Step exS103, decoding is performed by a moving picture decoding method in conformity with the conventional standards.

As such, allocating a new unique value to the stream type or the video stream attribute information enables determination whether or not the moving picture decoding method or the moving picture decoding apparatus that is described in each of embodiments can perform decoding. Even when multiplexed data that conforms to a different standard is input, an appropriate decoding method or apparatus can be selected. Thus, it becomes possible to decode information without any error. Furthermore, the moving picture coding method or apparatus, or the moving picture decoding method or apparatus in the present embodiment can be used in the devices and systems described above.

Embodiment 8

Figure 30:
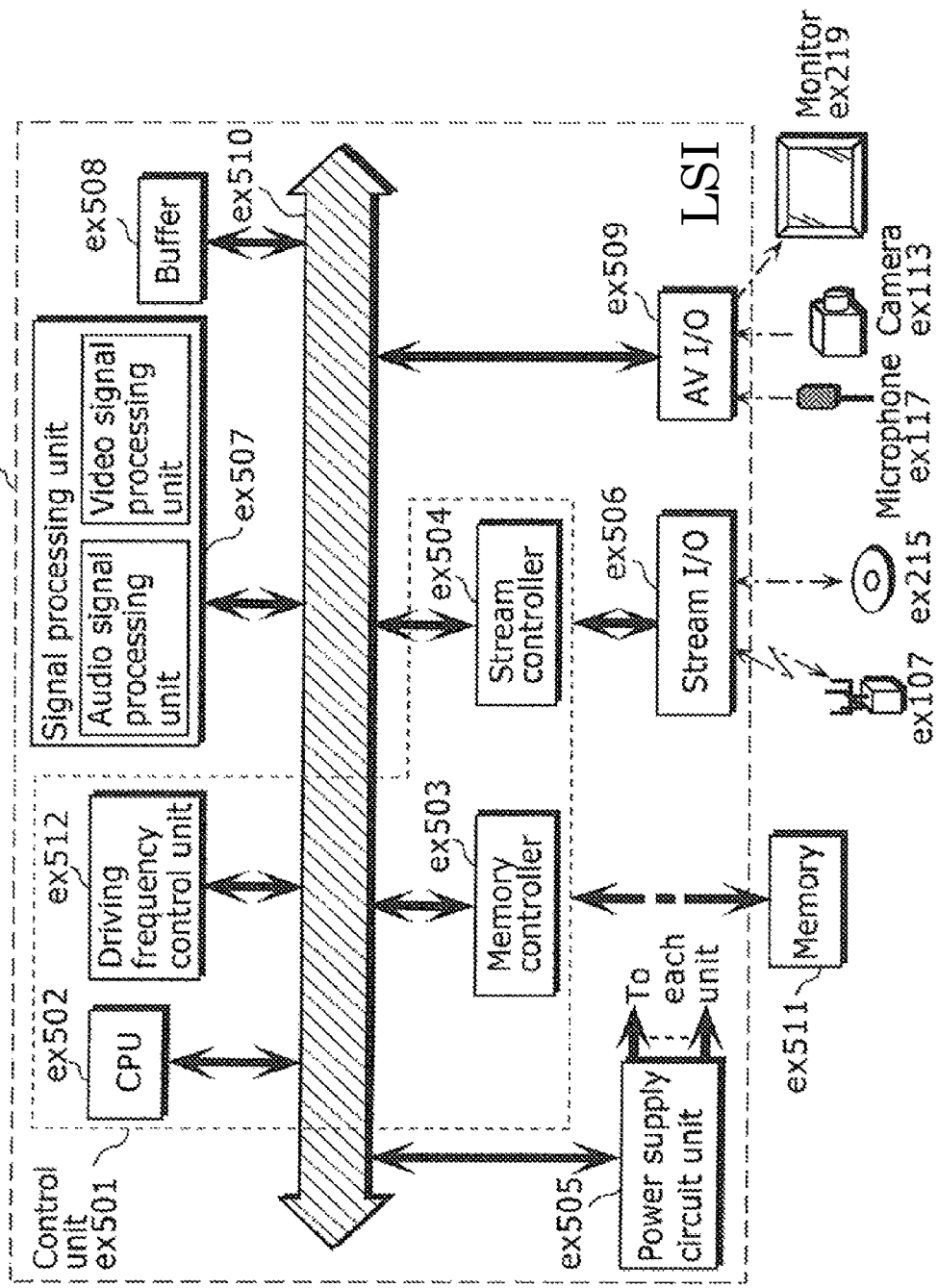
FIG. 30 shows an example of a configuration of an integrated circuit for implementing the moving picture coding method and the moving picture decoding method according to each of embodiments.

Each of the moving picture coding method, the moving picture coding apparatus, the moving picture decoding method, and the moving picture decoding apparatus in each of embodiments is typically achieved in the form of an integrated circuit or a Large Scale Integrated (LSI) circuit. As an example of the LSI, FIG. 30 illustrates a configuration of the LSI ex500 that is made into one chip. The LSI ex500 includes elements ex501, ex502, ex503, ex504, ex505, ex506, ex507, ex508, and ex509 to be described below, and the elements are connected to each other through a bus ex510. The power supply circuit unit ex505 is activated by supplying each of the elements with power when the power supply circuit unit ex505 is turned on.

For example, when coding is performed, the LSI ex500 receives an AV signal from a microphone ex117, a camera ex113, a monitor ex219, and others through an AV IO ex509 under control of a control unit ex501 including a CPU ex502, a memory controller ex503, a stream controller ex504, and a driving frequency control unit ex512. The received AV signal is temporarily stored in an external memory ex511, such as an SDRAM. Under control of the control unit ex501, the stored data is segmented into data portions according to the processing amount and speed to be transmitted to a signal processing unit ex507. Then, the signal processing unit ex507 codes an audio signal and/or a video signal. Here, the coding of the video signal is the coding described in each of embodiments. Furthermore, the signal processing unit ex507 sometimes multiplexes the coded audio data and the coded video data, and a stream JO ex506 provides the multiplexed data outside. The provided multiplexed data is transmitted to the base station ex107, or written on the recording medium ex215. When data sets are multiplexed, the data should be temporarily stored in the buffer ex508 so that the data sets are synchronized with each other.

Although the memory ex511 is an element outside the LSI ex500, it may be included in the LSI ex500. The buffer ex508 is not limited to one buffer, but may be composed of buffers. Furthermore, the LSI ex500 may be made into one chip or a plurality of chips.

Furthermore, although the control unit ex501 includes the CPU ex502, the memory controller ex503, the stream controller ex504, the driving frequency control unit ex512, the configuration of the control unit ex501 is not limited to such. For example, the signal processing unit ex507 may further include a CPU. Inclusion of another CPU in the signal processing unit ex507 can improve the processing speed. Furthermore, as another example, the CPU ex502 may serve as or be a part of the signal processing unit ex507, and, for example, may include an audio signal processing unit. In such a case, the control unit ex501 includes the signal processing unit ex507 or the CPU ex502 including a part of the signal processing unit ex507.

The name used here is LSI, but it may also be called IC, system LSI, super LSI, or ultra LSI depending on the degree of integration.

Moreover, ways to achieve integration are not limited to the LSI, and a special circuit or a general purpose processor and so forth can also achieve the integration. Field Programmable Gate Array (FPGA) that can be programmed after manufacturing LSIs or a reconfigurable processor that allows re-configuration of the connection or configuration of an LSI can be used for the same purpose.

In the future, with advancement in semiconductor technology, a brand-new technology may replace LSI. The functional blocks can be integrated using such a technology. The possibility is that the present invention is applied to biotechnology.

Embodiment 9

When video data generated in the moving picture coding method or by the moving picture coding apparatus described in each of embodiments is decoded, compared to when video data that conforms to a conventional standard, such as MPEG-2, MPEG-4 AVC, and VC-1 is decoded, the processing amount probably increases. Thus, the LSI ex500 needs to be set to a driving frequency higher than that of the CPU ex502 to be used when video data in conformity with the conventional standard is decoded. However, when the driving frequency is set higher, there is a problem that the power consumption increases.

Figure 31:
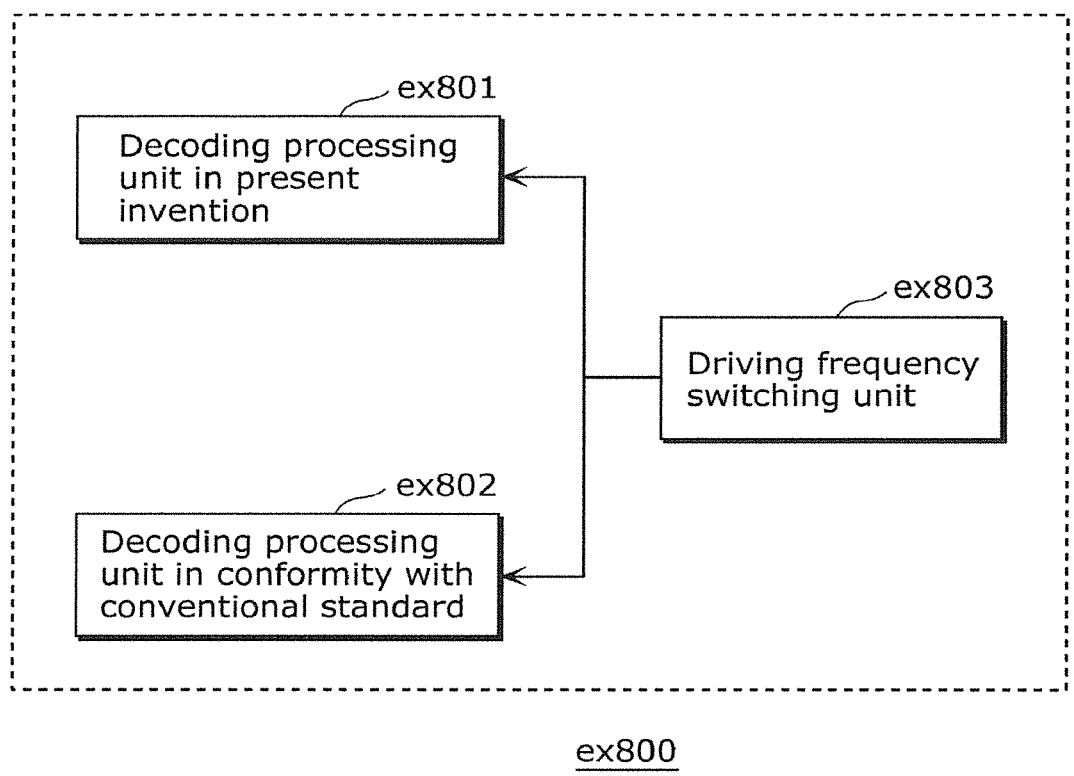
FIG. 31 shows a configuration for switching between driving frequencies.

In order to solve the problem, the moving picture decoding apparatus, such as the television ex300 and the LSI ex500 is configured to determine to which standard the video data conforms, and switch between the driving frequencies according to the determined standard. FIG. 31 illustrates a configuration ex800 in the present embodiment. A driving frequency switching unit ex803 sets a driving frequency to a higher driving frequency when video data is generated by the moving picture coding method or the moving picture coding apparatus described in each of embodiments. Then, the driving frequency switching unit ex803 instructs a decoding processing unit ex801 that executes the moving picture decoding method described in each of embodiments to decode the video data. When the video data conforms to the conventional standard, the driving frequency switching unit ex803 sets a driving frequency to a lower driving frequency than that of the video data generated by the moving picture coding method or the moving picture coding apparatus described in each of embodiments. Then, the driving frequency switching unit ex803 instructs the decoding processing unit ex802 that conforms to the conventional standard to decode the video data.

More specifically, the driving frequency switching unit ex803 includes the CPU ex502 and the driving frequency control unit ex512 in FIG. 30. Here, each of the decoding processing unit ex801 that executes the moving picture decoding method described in each of embodiments and the decoding processing unit ex802 that conforms to the conventional standard corresponds to the signal processing unit ex507 in FIG. 30. The CPU ex502 determines to which standard the video data conforms. Then, the driving frequency control unit ex512 determines a driving frequency based on a signal from the CPU ex502. Furthermore, the signal processing unit ex507 decodes the video data based on the signal from the CPU ex502. For example, the identification information described in Embodiment 7 is probably used for identifying the video data. The identification information is not limited to the one described in Embodiment 7 but may be any information as long as the information indicates to which standard the video data conforms. For example, when which standard video data conforms to can be determined based on an external signal for determining that the video data is used for a television or a disk, etc., the determination may be made based on such an external signal. Furthermore, the CPU ex502 selects a driving frequency based on, for example, a look-up table in which the standards of the video data are associated with the driving frequencies as shown in FIG. 33. The driving frequency can be selected by storing the look-up table in the buffer ex508 and in an internal memory of an LSI, and with reference to the look-up table by the CPU ex502.

Figure 32:
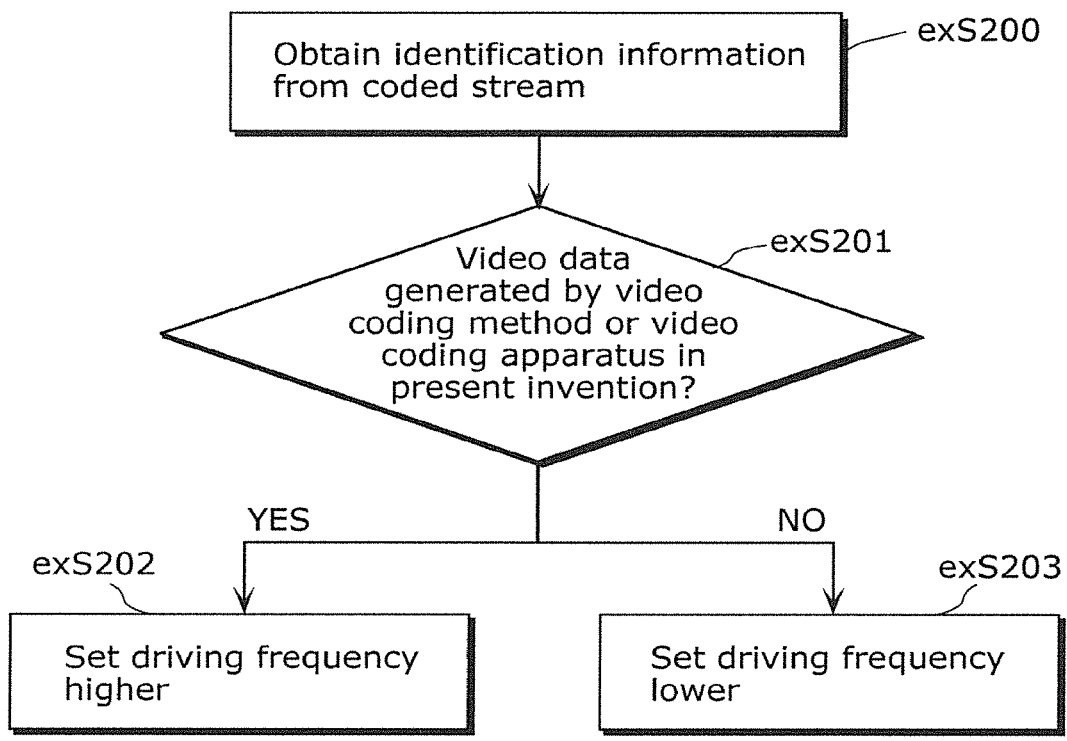
FIG. 32 shows steps for identifying video data and switching between driving frequencies.

FIG. 32 illustrates steps for executing a method in the present embodiment. First, in Step exS200, the signal processing unit ex507 obtains identification information from the multiplexed data. Next, in Step exS201, the CPU ex502 determines whether or not the video data is generated by the coding method and the coding apparatus described in each of embodiments, based on the identification information. When the video data is generated by the moving picture coding method and the moving picture coding apparatus described in each of embodiments ("YES" as a result of step exS201), in Step exS202, the CPU ex502 transmits a signal for setting the driving frequency to a higher driving frequency to the driving frequency control unit ex512. Then, the driving frequency control unit ex512 sets the driving frequency to the higher driving frequency. On the other hand, when the identification information indicates that the video data conforms to the conventional standard ("NO" as a result of step exS101), such as MPEG-2, MPEG-4 AVC, and VC-1, in Step exS203, the CPU ex502 transmits a signal for setting the driving frequency to a lower driving frequency to the driving frequency control unit ex512. Then, the driving frequency control unit ex512 sets the driving frequency to the lower driving frequency than that in the case where the video data is generated by the moving picture coding method and the moving picture coding apparatus described in each of embodiment.

Furthermore, along with the switching of the driving frequencies, the power conservation effect can be improved by changing the voltage to be applied to the LSI ex500 or an apparatus including the LSI ex500. For example, when the driving frequency is set lower, the voltage to be applied to the LSI ex500 or the apparatus including the LSI ex500 is probably set to a voltage lower than that in the case where the driving frequency is set higher.

Furthermore, when the processing amount for decoding is larger, the driving frequency may be set higher, and when the processing amount for decoding is smaller, the driving frequency may be set lower as the method for setting the driving frequency. Thus, the setting method is not limited to the ones described above. For example, when the processing amount for decoding video data in conformity with MPEG-4 AVC is larger than the processing amount for decoding video data generated by the moving picture coding method and the moving picture coding apparatus described in each of embodiments, the driving frequency is probably set in reverse order to the setting described above.

Furthermore, the method for setting the driving frequency is not limited to the method for setting the driving frequency lower. For example, when the identification information indicates that the video data is generated by the moving picture coding method and the moving picture coding apparatus described in each of embodiments, the voltage to be applied to the LSI ex500 or the apparatus including the LSI ex500 is probably set higher. When the identification information indicates that the video data conforms to the conventional standard, such as MPEG-2, MPEG-4 AVC, and VC-1, the voltage to be applied to the LSI ex500 or the apparatus including the LSI ex500 is probably set lower. As another example, when the identification information indicates that the video data is generated by the moving picture coding method and the moving picture coding apparatus described in each of embodiments, the driving of the CPU ex502 does not probably have to be suspended. When the identification information indicates that the video data conforms to the conventional standard, such as MPEG-2, MPEG-4 AVC, and VC-1, the driving of the CPU ex502 is probably suspended at a given time because the CPU ex502 has extra processing capacity. Even when the identification information indicates that the video data is generated by the moving picture coding method and the moving picture coding apparatus described in each of embodiments, in the case where the CPU ex502 has extra processing capacity, the driving of the CPU ex502 is probably suspended at a given time. In such a case, the suspending time is probably set shorter than that in the case where when the identification information indicates that the video data conforms to the conventional standard, such as MPEG-2, MPEG-4 AVC, and VC-1.

Accordingly, the power conservation effect can be improved by switching between the driving frequencies in accordance with the standard to which the video data conforms. Furthermore, when the LSI ex500 or the apparatus including the LSI ex500 is driven using a battery, the battery life can be extended with the power conservation effect.

Embodiment 10

There are cases where a plurality of video data that conforms to different standards, is provided to the devices and systems, such as a television and a cellular phone. In order to enable decoding the plurality of video data that conforms to the different standards, the signal processing unit ex507 of the LSI ex500 needs to conform to the different standards. However, the problems of increase in the scale of the circuit of the LSI ex500 and increase in the cost arise with the individual use of the signal processing units ex507 that conform to the respective standards.

Figure 34A:
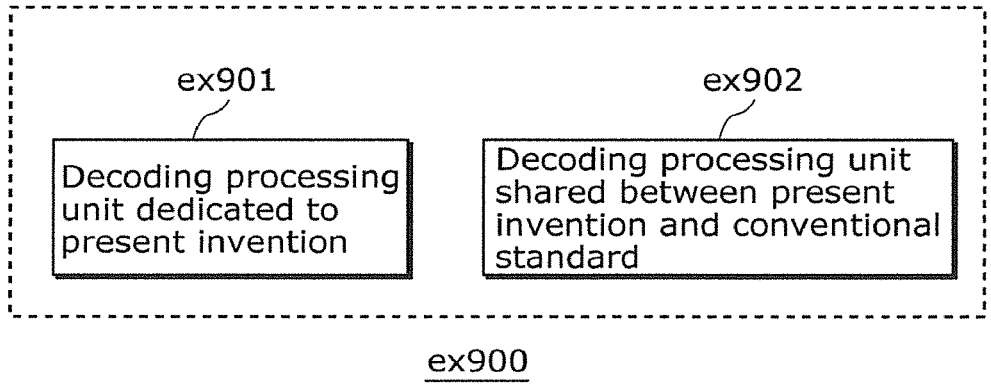
FIG. 34A is a diagram showing an example of a configuration for sharing a module of a signal processing unit.

In order to solve the problem, what is conceived is a configuration in which the decoding processing unit for implementing the moving picture decoding method described in each of embodiments and the decoding processing unit that conforms to the conventional standard, such as MPEG-2, MPEG-4 AVC, and VC-1 are partly shared. Ex900 in FIG. 34A shows an example of the configuration. For example, the moving picture decoding method described in each of embodiments and the moving picture decoding method that conforms to MPEG-4 AVC have, partly in common, the details of processing, such as entropy coding, inverse quantization, deblocking filtering, and motion compensated prediction. The details of processing to be shared probably include use of a decoding processing unit ex902 that conforms to MPEG-4 AVC. In contrast, a dedicated decoding processing unit ex901 is probably used for other processing unique to the present invention. Since the present invention is characterized by the partitioning processing in particular, for example, the dedicated decoding processing unit ex901 is used for the partitioning processing. Otherwise, the decoding processing unit is probably shared for one of the entropy decoding, inverse quantization, deblocking filtering, and motion compensation, or all of the processing. The decoding processing unit for implementing the moving picture decoding method described in each of embodiments may be shared for the processing to be shared, and a dedicated decoding processing unit may be used for processing unique to that of MPEG-4 AVC.

Figure 34B:
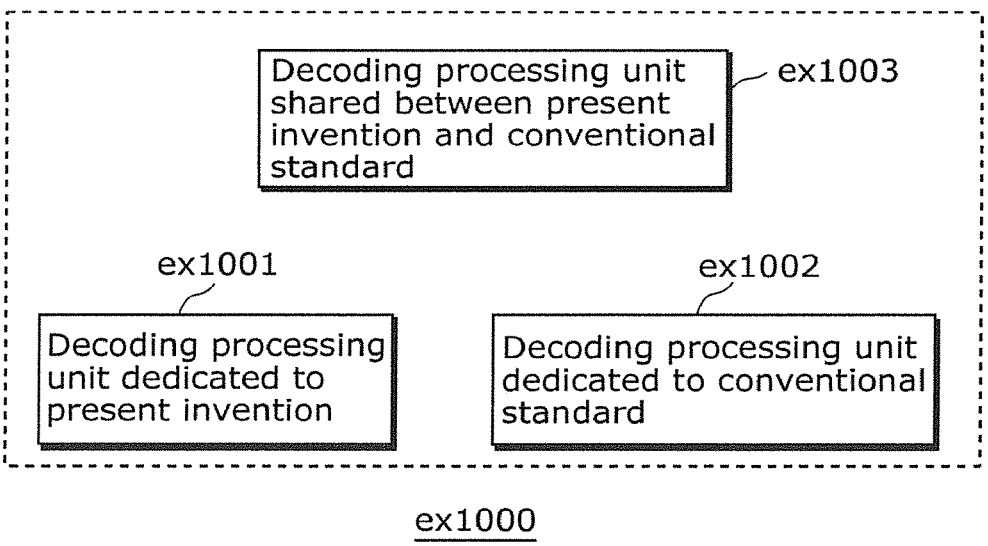
FIG. 34B is a diagram showing another example of a configuration for sharing a module of the signal processing unit.

Furthermore, ex1000 in FIG. 34B shows another example in that processing is partly shared. This example uses a configuration including a dedicated decoding processing unit ex1001 that supports the processing unique to the present invention, a dedicated decoding processing unit ex1002 that supports the processing unique to another conventional standard, and a decoding processing unit ex1003 that supports processing to be shared between the moving picture decoding method according to the present invention and the conventional moving picture decoding method. Here, the dedicated decoding processing units ex1001 and ex1002 are not necessarily specialized for the processing according to the present invention and the processing of the conventional standard, respectively, and may be the ones capable of implementing general processing. Furthermore, the configuration of the present embodiment can be implemented by the LSI ex500.

As such, reducing the scale of the circuit of an LSI and reducing the cost are possible by sharing the decoding processing unit for the processing to be shared between the moving picture decoding method according to the present invention and the moving picture decoding method in conformity with the conventional standard.

INDUSTRIAL APPLICABILITY

An image coding method and an image decoding method according to the present invention allow for efficient description and reconstruction of a block partitioning method which has not been supported by conventional variable-length coding method and decoding methods. Due to this, the image coding method and the image decoding method have advantages of reducing a great amount of coding, and thus can be utilized in various applications such as storages, transmissions, and communications. For example, the present invention can be utilized in high resolution information display devices and imaging devices such as TVs, digital video recorders, car navigation systems, mobile phones, digital cameras, and digital video cameras.

REFERENCE SIGNS LIST

100 Image coding device
101 Difference unit
102 Transform unit
103 Quantization unit
104 Inverse quantization unit
105 Inverse transform unit
106 Adder
107 Prediction unit
108 Encoding control unit
109 Variable-length coding unit
110 Partitioning unit
111 Partitioning control unit
112 Partition information description unit
120 Input image signal
121 Divided image signal
122 Differential signal
123, 125 Transform coefficient
124 Quantized transform coefficients information
126 Decoded residual image signal
127 Decoded image signal
128 Predicted image signal
129 Divide control signal
130, 131 Partition information
130A Partition mode information
132 Encoding control signal
140 Code sequence
200 Image decoding device
201 Variable-length decoding unit
202 Decoding control unit
203 Inverse quantization unit
204 Inverse transform unit
205 Prediction unit
206 Adder
207 Partition information reconstruction unit
221 Decoded signal
222 Transform coefficients
223 Decoded residual image signal
224 Predicted image signal
225 Predicted image generation-related information
226 Partition information
240 Output image signal
900 Current block
901, 902 Adjacent block
1101, 1104, 1105 Processed frame
1102, 1103 Current frame
CTB Block data
CTBs Block signal
LCTB Largest block-size data
LCTBHdr Largest block-size header
PicHdr Picture header
PicStr Picture signal
PicData Picture data
SepInfo Partition-related information
SeqData Sequence data
SeqHdr Sequence header
SliceData Slice data
SliceHdr Slice header
SliceStr Slice signal
TUHdr Transform block header
TUs Transform block

The invention claimed is:

1. An image decoding method for decoding a code sequence generated by an image coding method, wherein the image coding method is performed using processing circuitry, for partitioning an image into processing units, and coding the partitioned image to generate the code sequence, the image coding method comprising: determining a partitioning pattern for hierarchically partitioning the image in order starting from a largest processing unit which is 64 pixels by 64 pixels, the largest processing unit corresponding to a hierarchy depth value of 0; defining the partitioning pattern only by (i) a maximum hierarchy depth value of N indicating a deepest processing unit which the largest processing unit is partitioned down to, (ii) a minimum hierarchy depth value of K indicating a shallowest processing unit which the largest processing unit is partitioned down to, and (iii) one bit indicating whether or not to partition each of the partitioning units corresponding to the minimum hierarchy depth value of K, when it is determined that the minimum hierarchy depth value of K is greater than 0 and the maximum hierarchy depth value of N is (K+1); and coding the defined partitioning pattern, the image decoding method comprising:
decoding the defined partitioning pattern included in the code sequence; and
determining the partitioning pattern from the decoded defined partitioning pattern.

2. An image decoding method for decoding a code sequence generated by an image coding method, wherein the image coding method is performed using processing circuitry, for partitioning an image into processing units, and coding the partitioned image to generate the code sequence, the image coding method comprising: determining a partitioning pattern for hierarchically partitioning the image in order starting from a largest processing unit which is 64 pixels by 64 pixels, the largest processing unit corresponding to a hierarchy depth value of 0; defining the partitioning pattern only by (i) a maximum hierarchy depth value of N indicating a deepest processing unit which the largest processing unit is partitioned down to, (ii) a minimum hierarchy depth value of K indicating a shallowest processing unit which the largest processing unit is partitioned down to, and (iii) one bit indicating whether or not to partition each of partitioning units corresponding to the minimum hierarchy depth value of K, when it is determined that the minimum hierarchy depth value of K is 2 and the maximum hierarchy depth value of N is 3; and coding the defined partitioning pattern, the image decoding method comprising:
decoding the defined partitioning pattern included in the code sequence; and
determining the partitioning pattern from the decoded defined partitioning pattern.

3. An image decoding method for decoding a code sequence generated by an image coding method, wherein the image coding method is performed using processing circuitry, for partitioning an image into processing units, and coding the partitioned image to generate the code sequence, the image coding method comprising: determining a partitioning pattern for hierarchically partitioning the image in order starting from a largest processing unit which is 64 pixels by 64 pixels, the largest processing unit corresponding to a hierarchy depth value of 0; defining the partitioning pattern only by (i) a maximum hierarchy depth value of N indicating a deepest processing unit which the largest processing unit is partitioned down to, (ii) a minimum hierarchy depth value of K indicating a shallowest processing unit which the largest processing unit is partitioned down to, and (iii) one bit indicating whether or not to partition each of partitioning units corresponding to a hierarchy depth value of M; and coding the defined partitioning pattern, wherein the minimum hierarchy depth value of K is greater than 0, the hierarchy depth value of M is equal to the minimum hierarchy depth value of K or is greater than the minimum hierarchy depth value of K, and the hierarchy depth value of M is less than the maximum hierarchy depth value of N, the image decoding method comprising:
decoding the defined partitioning pattern included in the code sequence; and
determining the partitioning pattern from the decoded defined partitioning pattern.

* * * * *